United States Patent

Ogawa et al.

[11] Patent Number: 5,910,862
[45] Date of Patent: Jun. 8, 1999

[54] MAGNETIC DISK APPARATUS

[75] Inventors: Yoshinori Ogawa; Yuji Sasaki; Mitsuaki Yoshida, all of Kawasaki; Kazunori Shikano; Masato Ishikawa, both of Higashine, all of Japan

[73] Assignee: Fujitsu Limited, Kawasaki, Japan

[21] Appl. No.: 08/829,783

[22] Filed: Mar. 31, 1997

Related U.S. Application Data

[60] Continuation of application No. 08/451,863, May 26, 1995, abandoned, which is a division of application No. 08/306,014, Sep. 14, 1994, abandoned.

[30] Foreign Application Priority Data

Dec. 7, 1993 [JP] Japan .................................... 5-340667
Feb. 18, 1994 [JP] Japan .................................... 6-021218

[51] Int. Cl.⁶ .......................... G11B 33/02; G11B 5/012
[52] U.S. Cl. ..................................... 360/97.01; 360/98.01
[58] Field of Search ........................... 360/97.01, 97.02, 360/97.03, 98.01, 98.07, 99.08, 99.12; 369/75.1

[56] References Cited

U.S. PATENT DOCUMENTS

| | | | |
|---|---|---|---|
| 4,295,711 | 10/1981 | Tanaka | 350/334 |
| 4,388,655 | 6/1983 | Zenzefilis | 360/19.1 |
| 4,645,280 | 2/1987 | Gordon et al. | 339/17 F |
| 4,670,804 | 6/1987 | Kant et al. | 360/102 |
| 4,689,703 | 8/1987 | Olbrich et al. | 360/104 |
| 4,692,827 | 9/1987 | Biermeier et al. | 360/97 |
| 4,761,699 | 8/1988 | Ainslie et al. | 360/103 |
| 4,799,129 | 1/1989 | Izumino | 361/428 |
| 4,819,100 | 4/1989 | Asano | 360/97.01 |
| 4,899,237 | 2/1990 | Tochiyama et al. | 360/98.02 |

(List continued on next page.)

FOREIGN PATENT DOCUMENTS

| | | |
|---|---|---|
| 0479703 | 4/1992 | European Pat. Off. . |
| 3404231 | 8/1985 | Germany . |
| 60-101781 | 6/1985 | Japan . |
| 63-288485 | 11/1985 | Japan . |
| 61-172210 | 8/1986 | Japan . |
| 1-46279 | 2/1989 | Japan .................................... 360/137 |
| 2281495 | 11/1990 | Japan . |
| 2310876 | 12/1990 | Japan . |
| 3141085 | 6/1991 | Japan . |
| 3254480 | 11/1991 | Japan . |
| 467477 | 3/1992 | Japan . |
| 4-358366 | 12/1992 | Japan . |
| 567380 | 3/1993 | Japan . |
| 9409489 | 4/1994 | WIPO . |

OTHER PUBLICATIONS

Dunman et al., "Actuator Assembly for a Disk File", *IBM Technical Disclosure Bulletin*, vol. 20, No. 5, Oct. 1977, pp. 1984–1985.

*Primary Examiner*—William J. Klimowicz
*Attorney, Agent, or Firm*—Greer, Burns, & Crain, Ltd.

[57] ABSTRACT

Disclosed is a magnetic disk apparatus constructed to reduce a track positional deviation of a magnetic head. This magnetic disk apparatus includes a rotary mechanism for rotating the magnetic disk and a rotary type actuator, provided with the magnetic head at its front end, which magnetic head has a write head and a read head, for moving the magnetic head in such a direction as to traverse tracks of the magnetic disk by making rotations about a rotary shaft. A distance A from the center of rotation of the rotary type actuator to the magnetic head is set equal to or larger than a distance B from the center of rotation of the rotary type actuator to the center of rotation of the magnetic disk. Even when separating a write element and a read element, the track positional deviation of the magnetic head can be reduced. This magnetic disk apparatus includes an enclosure accommodating both of a rotary mechanism and the rotary type actuator and having a base taking such a configuration that one side surface thereof is opened and a cover fitted in the base, wherein a side for separating the base and the cover is formed at a slant to a long side of the apparatus. This construction makes it possible to enhance a rigidity of the enclosure and reduce the track positional deviation of the magnetic head.

10 Claims, 55 Drawing Sheets

U.S. PATENT DOCUMENTS

| | | | |
|---|---|---|---|
| 4,985,793 | 1/1991 | Anderson | 360/105 |
| 5,014,146 | 5/1991 | Takatsuka et al. | 360/106 |
| 5,034,837 | 7/1991 | Schmitz | 360/105 |
| 5,073,833 | 12/1991 | Best et al. | 360/77.05 |
| 5,103,359 | 4/1992 | Marazzo | 360/104 |
| 5,121,273 | 6/1992 | Slezak | 360/104 |
| 5,150,512 | 9/1992 | Hatchett et al. | 360/98.08 X |
| 5,170,300 | 12/1992 | Stefansky | 360/105 |
| 5,212,607 | 5/1993 | Elsing et al. | 360/99.08 |
| 5,218,497 | 6/1993 | Tanabe et al. | 360/113 |
| 5,260,846 | 11/1993 | Iriko et al. | 360/106 |
| 5,300,815 | 4/1994 | Rostoker | 257/786 |
| 5,305,169 | 4/1994 | Anderson et al. | 360/105 |
| 5,400,195 | 3/1995 | Morii et al. | 360/97.01 |
| 5,422,764 | 6/1995 | McIlvanie | 360/97.01 |
| 5,426,549 | 6/1995 | Sakai | 360/106 |

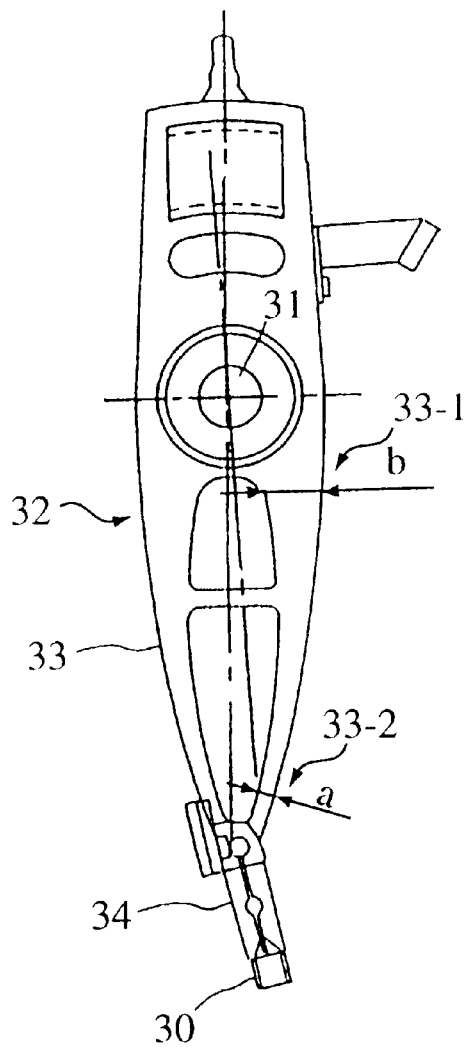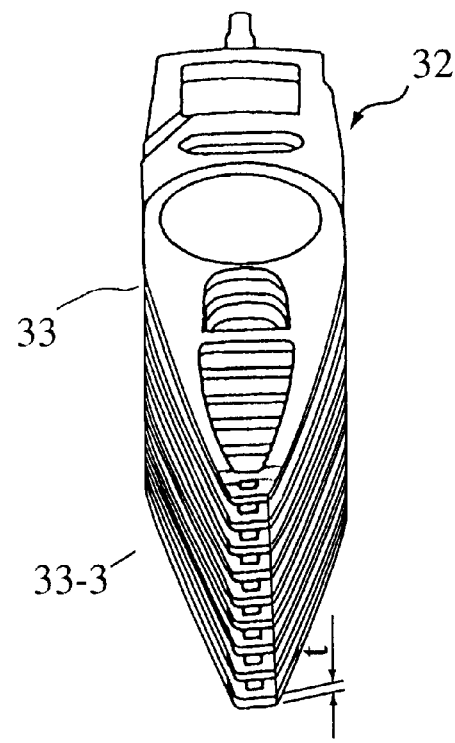
FIG. 23A
FIG. 23B

MAGNETIC DISK APPARATUS

This is a continuation of application Ser. No. 08/451,863 filed on May 26, 1995, now abandoned, which was a divisional of application Ser. No. 08/306,014, filed Sep. 14, 1994, now abandoned.

BACKGROUND OF THE INVENTION

1. Field of the Invention

The present invention relates to a magnetic disk apparatus for performing records on a magnetic disk with a high density.

2. Description of the Related Art

A magnetic disk apparatus in recent years has a tendency of becoming smaller in size but larger in capacity. For this reason, there is made an attempt to improve a recording density of the magnetic disk, i.e., a track density and a bit density. For improving this bit density, in place of a conventional readable/writable inductive head, a magnetic reluctance head (MR head) capable of taking a larger level of a regenerative signal is utilized as a reading head. Hence, the magnetic head involves the use of two heads, i.e., the inductive head for writing and the MR head for reading.

Such two heads are different from each other in terms of their positions in a track direction, and, therefore, a problem is a decline of a follow-up capability along the tracks due to a skew of a shaft and an angle of rotation relative to a rotary actuator.

FIG. 57 is a view illustrating a construction of a magnetic disk apparatus in the prior art. FIG. 58 is a characteristic diagram of a head position versus a yaw angle in the prior art. FIGS. 59A, 59B, 59C and 59D are diagrams of assistance in explaining the yaw angle in the prior art.

As depicted in FIG. 57, an actuator 92 moves a magnetic head 93 in its radial direction with respect to a magnetic disk 90 rotating about a center-of-rotation 91. This actuator 92 involves the use of a rotary actuator rotating about a center-of-rotation 94, thereby attaining down-sizing of the apparatus.

An MR head capable of enhancing the bit density is used as a read head of this magnetic head 93. As shown in FIGS. 59B and 59D, if this MR head is used as a read head 93-2, it is required that a write head 93-1 be provided separately. For example, the inductive head is employed as the write head 93-1. Thus, it follows that a gap position between the individual heads 93-1 and 93-2 of the magnetic head 93 differs.

This rotary actuator 92 rotates about the center-of-rotation 94 and thereby moves the magnetic head 93 in the radial direction of the magnetic disk 90, and, hence, a locus thereof depicts a circular arc. Accordingly, an angle (head skew angle or yaw angle) with respect to the track (cylinder) direction of the magnetic head 93 is not 0°. Besides, a yaw angle on the inner side of the magnetic disk 90 becomes as shown in FIGS. 59A and 59B. On the other hand, a yaw angle on the outer side of the magnetic disk 90 turns to be an angle as illustrated in FIGS. 59C and 59D. Consequently, the yaw angle changes on the inner and outer sides of the magnetic disk 90.

Take the construction of FIG. 57A for example, a distance Rcg from the center-of-rotation 94 of the actuator 92 up to the gap position of the magnetic head 93 is set 0.85 times as small as a distance Rsc from the center-of-rotation 94 of the actuator 92 up to the center-of-rotation 91 of the magnetic disk 90. As illustrated in FIG. 58, the variation in the yaw angle at this time amounts to a value as large as 24°.

This yaw angle causes a deviation between the write head 93-1 and the read head 93-2 with respect to a cylinder locus. This results in a narrowed effective gap width of the read head 93-2 and, consequently, a decline in terms of a read characteristic. For this reason, it is desirable that both the yaw angle and the variation in the yaw angle be small.

As a method of reducing an absolute value of this yaw angle, Japanese Patent Laid-Open Publication No.4-232610 proposes a method of shifting the positions of the heads 93-1, 93-2. Further, there is proposed another method of decreasing the yaw angle by using an actuator having a fan-shaped bearing (see Japanese Patent Laid-Open Publication No.2-126497).

Also, there are some configurations of a conventional disk enclosure, wherein a base and a cover are separated up and down, and the base and the cover are separated right and left (see Japanese Patent Laid-Open Publication No. 4-232610).

The conventional apparatus which effects the read/write processes through the same element presents no problem because of causing no track deviation due to the yaw angle. As shown in FIGS. 59B and 59D, however, when the head is provided with the write inductive head 83-1 and the read MR head 93-2, the gap position between the inductive head 93-1 and the MR head 93-2 differs. Hence, the variation in the yaw angle brings about especially a deviation of the track position of the MR head 93-2. Thus, it follows that a degree of mixing of adjacent track signal components among reading signals fluctuates depending on the respective tracks. A resolution of read data is thereby decreased.

For preventing this decline, a read output level is reduced by decreasing the gap width of the MR head 93 so that the gaps of the MR head 93-2 extends over the adjacent track in any tracks. For this reason, there arises a problem in which an S/N ratio increases, correspondingly. Further, according to the conventional method using the fan-shaped bearing, the actuator is a special one. Therefore, its structure becomes complicated, and, besides, the costs also increase.

Further, in such a construction of the disk enclosure that the base and the cover are separated up and down in the prior art, it is possible to support both ends of shafts of a spindle motor and the rotary actuator, and, therefore, a rigidity is comparatively high. However, since a degree of deformation due to variations in temperatures of upper and lower members is different, the shaft of the rotary actuator is easy to skew, with the result that an off-track readily takes place.

Similarly, as disclosed in Japanese Patent Laid-Open Publication No.4-232610, in the construction where the base and the cover are separated right and left, the base is formed with two openings, and hence the rigidity of the enclosure is low. Accordingly, the shaft of the rotary actuator is easy to skew, and therefore the off-track is readily produced.

SUMMARY OF THE INVENTION

It is a primary object of the present invention to provide a magnetic disk apparatus capable of reducing, even when separating a write head and a read head, a track deviation of the head and performing a record with a high density.

It is another object of the present invention to provide a magnetic disk apparatus capable of reducing, even when separating the write head and the read head, fluctuations in terms of yaw angle with a simple construction and performing the record with the high density.

It is still another object of the present invention to provide a magnetic disk apparatus capable of keeping a high rigidity of a disk enclosure, preventing an occurrence of the off-track and performing the record with the high density.

To accomplish the above objects, according to one aspect of the present invention, there is provided a magnetic disk apparatus comprising: at least one magnetic disk; a rotating mechanism for rotating the magnetic disk; a magnetic disk including a write head and a read head; and a rotary type actuator, equipped with the magnetic head at its front end, for moving the magnetic head in such a direction as to traverse tracks of the magnetic disk by making rotations about a rotary shaft, wherein a distance from the center of rotation of the rotary type actuator to the magnetic head is set equal to or larger than a distance from the center of rotation of the rotary type actuator to the center of rotation of the magnetic disk.

According to this aspect, the distance A from the center of rotation of the rotary type actuator to the magnetic head is set equal to or larger than the distance B from the center of rotation of the rotary type actuator to the center of rotation of the magnetic disk, and, therefore, the variations in the yaw angle can be reduced.

According to another aspect of the present invention, there is provided a magnetic disk apparatus comprising: at least one magnetic disk; a rotating mechanism for rotating the magnetic disk; a magnetic head having a write head and a read head; a rotary type actuator, equipped with the magnetic head at its front end, for moving the magnetic head in such a direction as to traverse tracks of the magnetic disk by making rotations about a rotary shaft; and an enclosure including: a base, to which both ends of fixing shafts of both of the rotating mechanism and the rotary type actuator are fixed, taking such a configuration that one side surface thereof is opened; and a cover fitted in the base, the enclosure having a side for separating the base and the cover, which separating side is formed at a slant to a long side of the apparatus.

According to this aspect, the side for separating the base and the cover is skewed, and the base is formed with one opening. Hence, the rigidity increases. It is therefore possible to prevent a skew of the actuator shaft and also a track positional deviation of the magnetic head. Further, the opening is inclined, and hence this facilitates the operation of mounting the magnetic disk and the actuator in the base.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIGS. 23A and 23B are views showing a construction of the actuator of FIG. 22B;

DETAILED DESCRIPTION OF THE PREFERRED EMBODIMENTS

Figure 1:
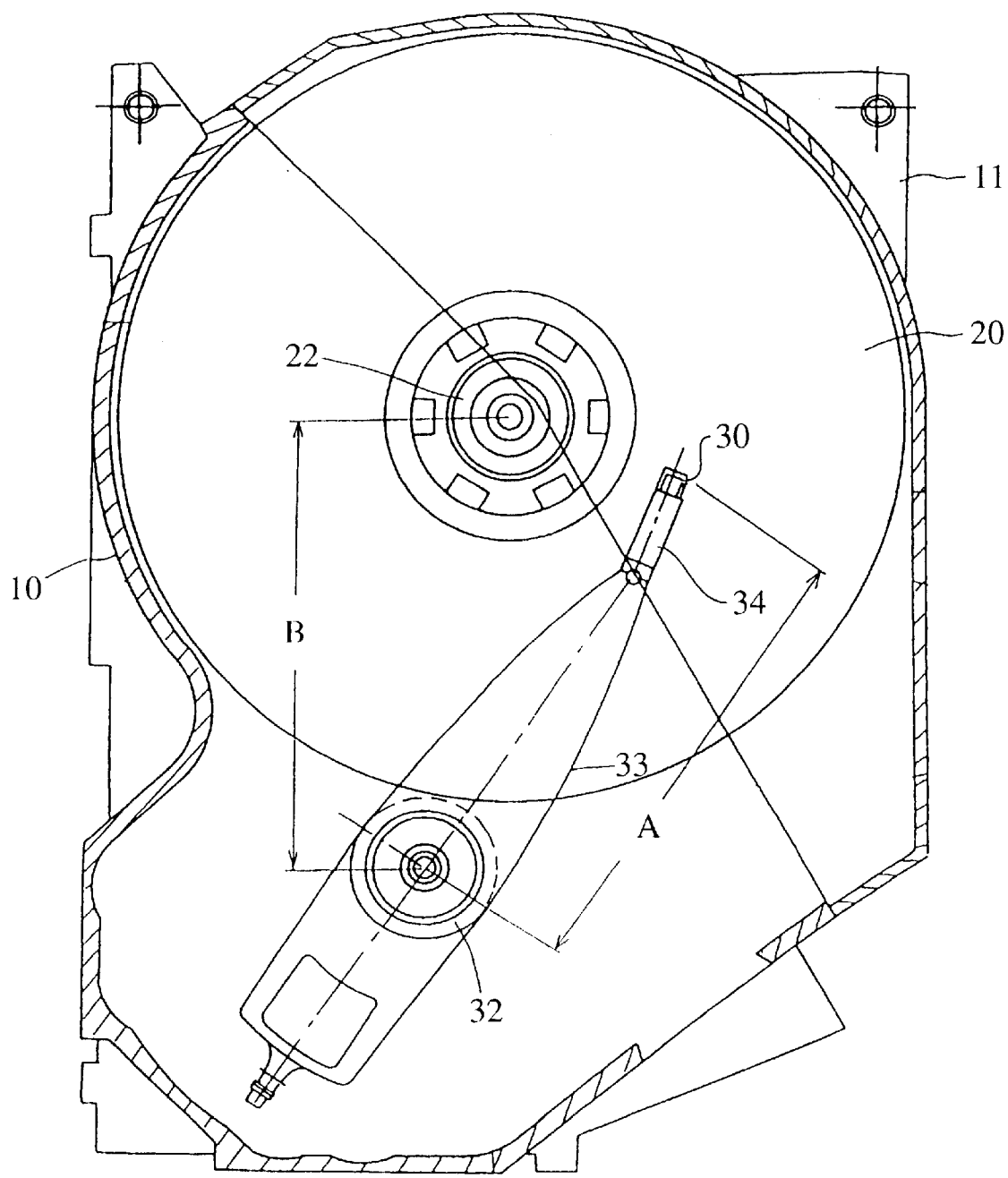
FIG. 1 is a view showing the principle of the present invention.

FIG. 1 is a view illustrating a principle of the present invention. As shown in FIG. 1, a magnetic disk 20 is supported on a spindle motor 22 but rotated by this spindle motor 22. A suspension 34 is attached to its front end of an arm 33 of a rotary actuator 32. A magnetic head 30 is fitted to this suspension 34. Herein, a distance A from the center of rotation of the rotary actuator 32 up to the magnetic head 30 is set equal to or larger than a distance B from the center of rotation of the rotary actuator 32 up to the center of rotation of the magnetic disk 20.

In this way, by increasing a length of the rotary actuator 32, it is possible to reduce the variations in the yaw angle of the magnetic head 30 with respect to the cylinder of the magnetic disk 20. For this reason, the read characteristic of the magnetic head 30, particularly, of the read head becomes uniform on each track.

Further, the enclosure for housing the magnetic disk 20, the spindle motor 22 and the rotary actuator 32 is constructed of a base 10 and a cover 11. This base 10 supports both ends of a fixed shaft serving as a rotary shaft of the spindle motor 22 and of a fixed shaft serving as a rotary shaft of the rotary actuator 32 Then, the base 10 takes such a configuration that one side surface is opened. A separating side for separating this base from the cover 11 is formed at a slant to a long side of the enclosure.

With this formation, the base 10 assumes the configuration in which one side surface is opened and is therefore high in terms of its rigidity. Then, the separating side between the base 10 and the cover 11 is formed obliquely, and it is therefore feasible to mount the spindle motor 22 and the rotary actuator 32 on the base exhibiting a high rigidity. As a result, there decrease axial inclinations of the fixed shafts of the spindle motor 22 and of the rotary actuator 32. Accordingly, a deviation quantity of the track position of the magnetic head can be reduced.

Figure 2:
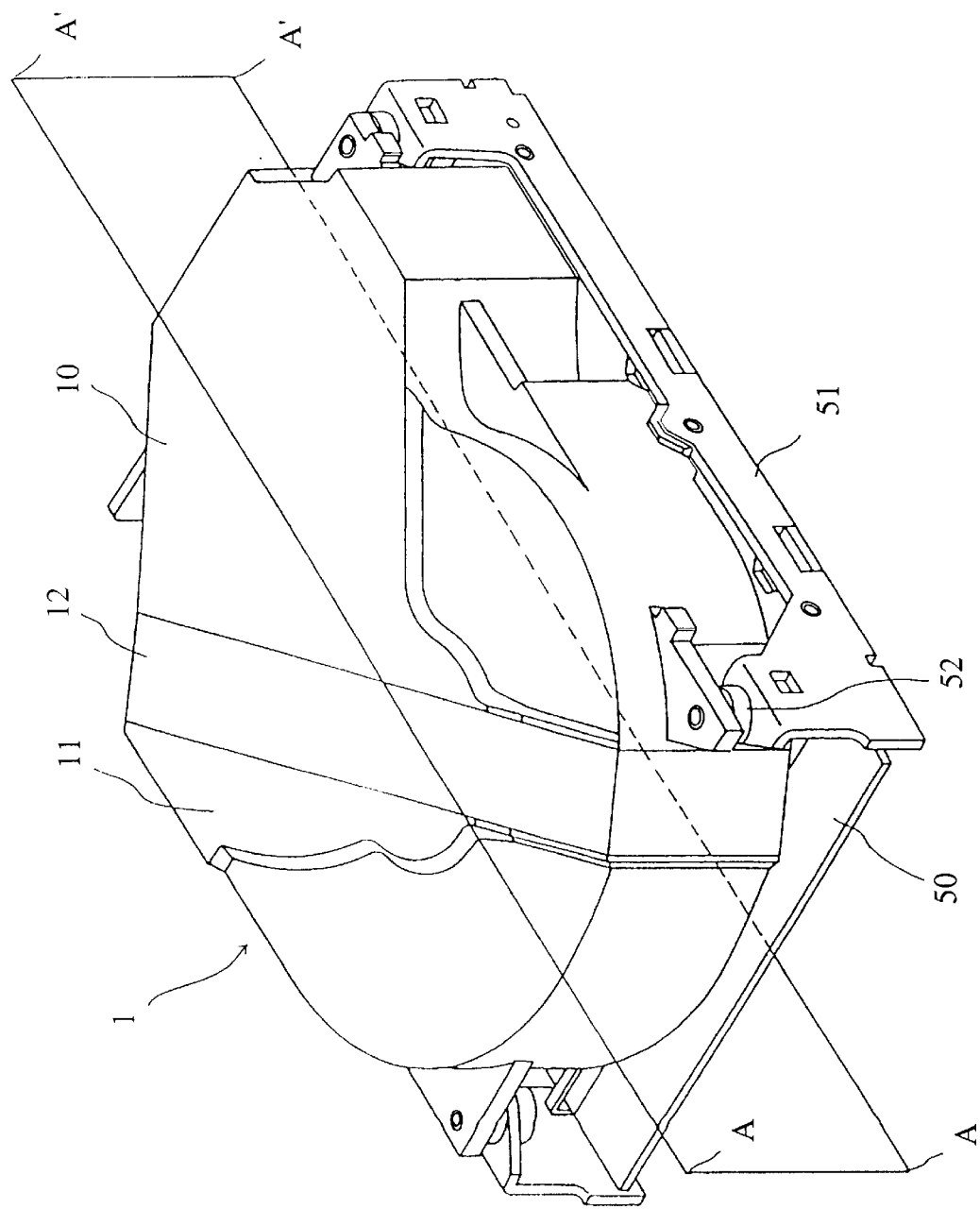
FIG. 2 is a view illustrating an external appearance of a magnetic disk apparatus in one embodiment of the present invention.
Figure 3:
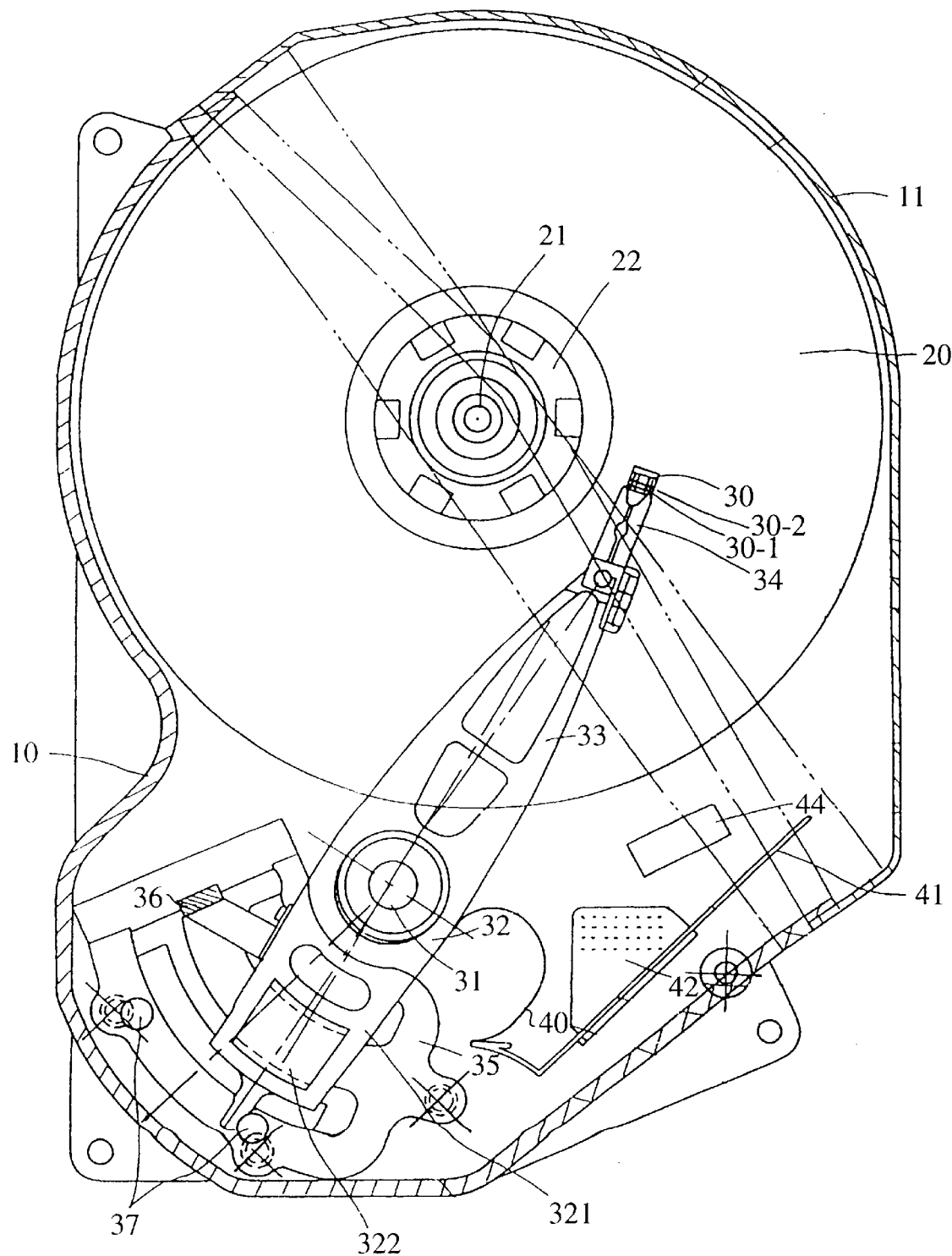
FIG. 3 is a top sectional view of the magnetic disk apparatus of FIG. 2.
Figure 4:
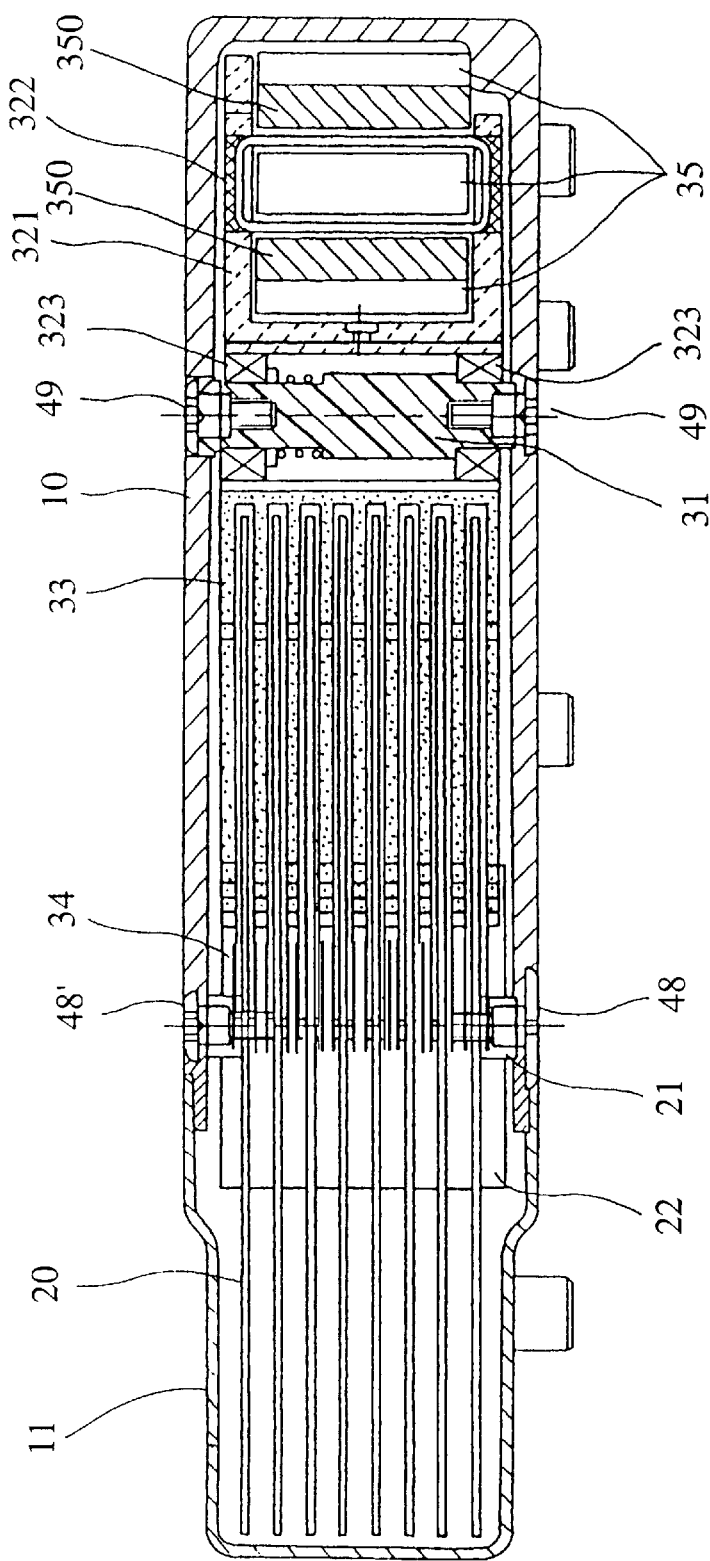
FIG. 4 is a cross-sectional view of the magnetic disk apparatus of FIG. 2.
Figure 5:
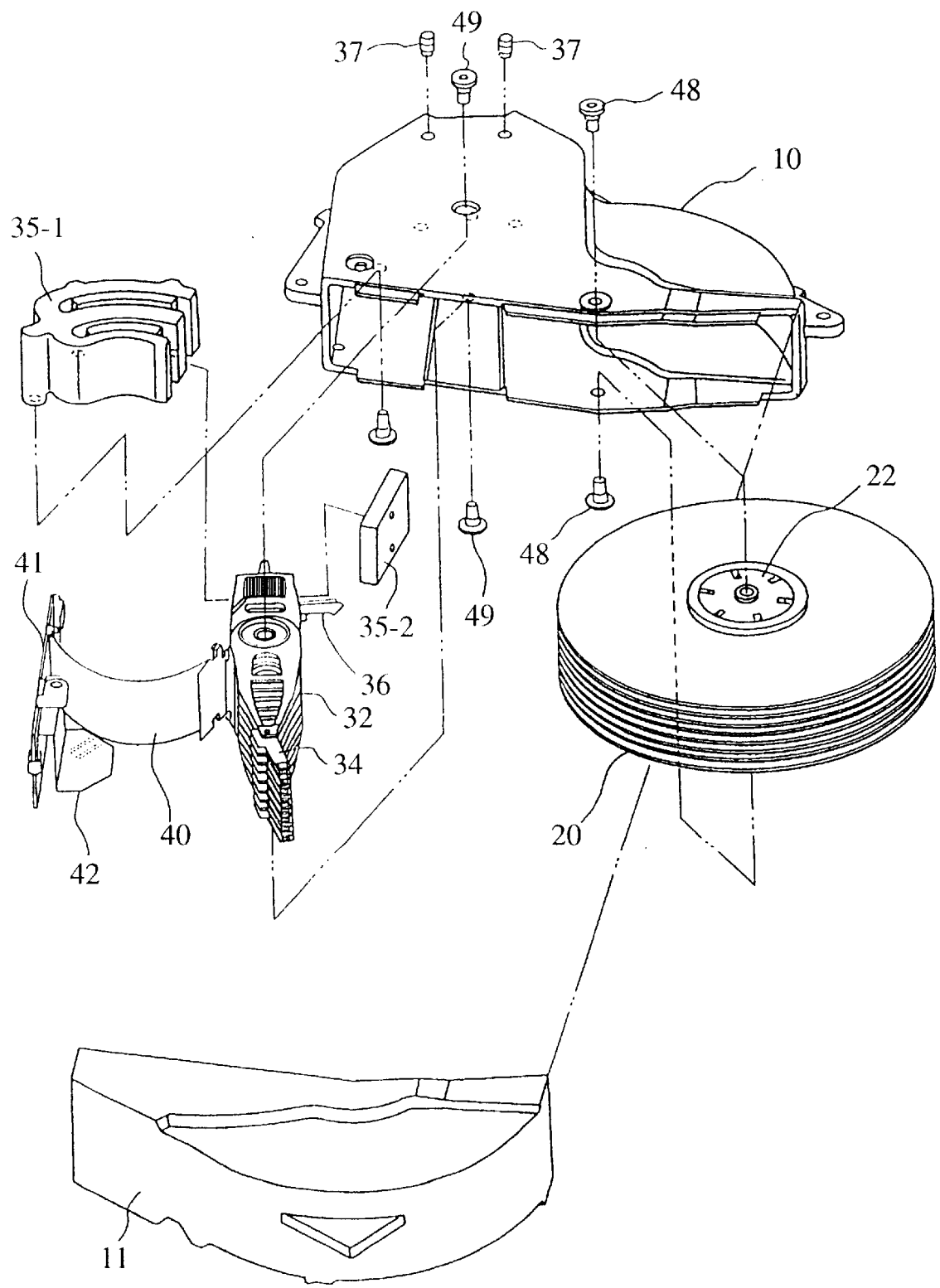
FIG. 5 is a fragmentary view of the magnetic disk apparatus of FIG. 2.

FIG. 2 is a perspective view illustrating an external appearance of the magnetic disk apparatus in one embodiment of the present invention. FIG. 3 is a top sectional view of the apparatus of FIG. 2. FIG. 4 is a sectional view taken along the line A–A' of FIG. 2. FIG. 5 is a fragmentary view of the apparatus of FIG. 2.

As depicted in FIG. 2, a magnetic disk drive 1 is mounted via a vibration preventive rubber 52 in a mounting frame 51. A printed circuit board 50 is attached to this mounting frame 51. The printed circuit board 50 is mounted with a connector for an external connection and a control circuit of the magnetic disk drive 1.

The enclosure of this magnetic disk drive 1 is, as also shown in FIG. 4, constructed of the cover 11 and the base 10 taking such the sectional configuration that one side surface is opened. That is, the base 10 and the cover 11 have upper surfaces, lower surfaces and one side surfaces in section.

As also illustrated in FIG. 3, the separating side for separating the base 10 and the cover 11 from each other is formed obliquely to the long side of the magnetic disk drive 1. A length of this separating side, i.e., an opening side of the base 10, is shorter than the long side of the magnetic disk drive 1. Then, the base 10 is covered with the cover 11, and their overlapped portions are wound with an adhesive tape 12, thus hermetically closing the interior thereof.

As shown in FIGS. 3 and 4, in a housing space defined by the base 10 having the sectional configuration with its one side surface opened, on the left side (upper side in FIG. 3) in FIG. 4, there is provided the spindle motor 22 rotating about a shaft 21, both ends of which are supported on the base 10. Eight sheets of magnetic disks 20 are attached to this spindle motor 22.

Also, on the right side (lower side in FIG. 3) of the housing space, there is provided a rotary actuator 32 rotating about a shaft 31 having its both ends supported on the base 10. A spring arm (suspension) 34 having its front end fitted with the magnetic head 30 is secured to the front end of the arm 33 of this rotary actuator 32.

Next, the rotary actuator 32 will be explained. As shown in FIG. 4, a lower portion of the shaft 31 is screw-fastened to the base through a screw 49, and an upper portion thereof is likewise screw-fastened to the base 10 with a screw 49. A bearing 323 is provided along the periphery of this shaft 31. The actuator 32 is provided through this bearing 323.

The actuator 32 is formed with nine lengths of arms 33 about the shaft 31 on the left side in the Figure. Each of these arms 33 is provided with the above-mentioned spring arm 34. The magnetic head 30 is secured to the front end of this spring arm 34. This magnetic head 30 is constructed such that a slider disclosed in Japanese Patent Laid-Open Publication No.60-101781 is mounted with an magnetic reluctance element serving as a read head 30-2 and an inductive element serving as a write head 30-1.

Also, in the actuator 32, a pair of coil support blocks 321 are provided about the shaft 31 on the right side (lower side in FIG. 3) in FIG. 4. As depicted in FIG. 4, drive coils 322 are provided on this one pair of coil support blocks 321. Three pieces of yokes 35 fixed to the base 10 are located rightward and leftward of this drive coil 322 and further therebetween. Magnets 350 are attached to the surfaces, disposed in face-to-face relationship with the drive coil 322, of the right and left blocks of these yokes 35.

Hence, when en electric current flows across the drive coil 322, the actuator 32 rotates about the shaft 31, whereby the magnetic head 30 is moved in the radial direction (in such a direction as to traverse the tracks) of the magnetic disk 20.

Figure 42:
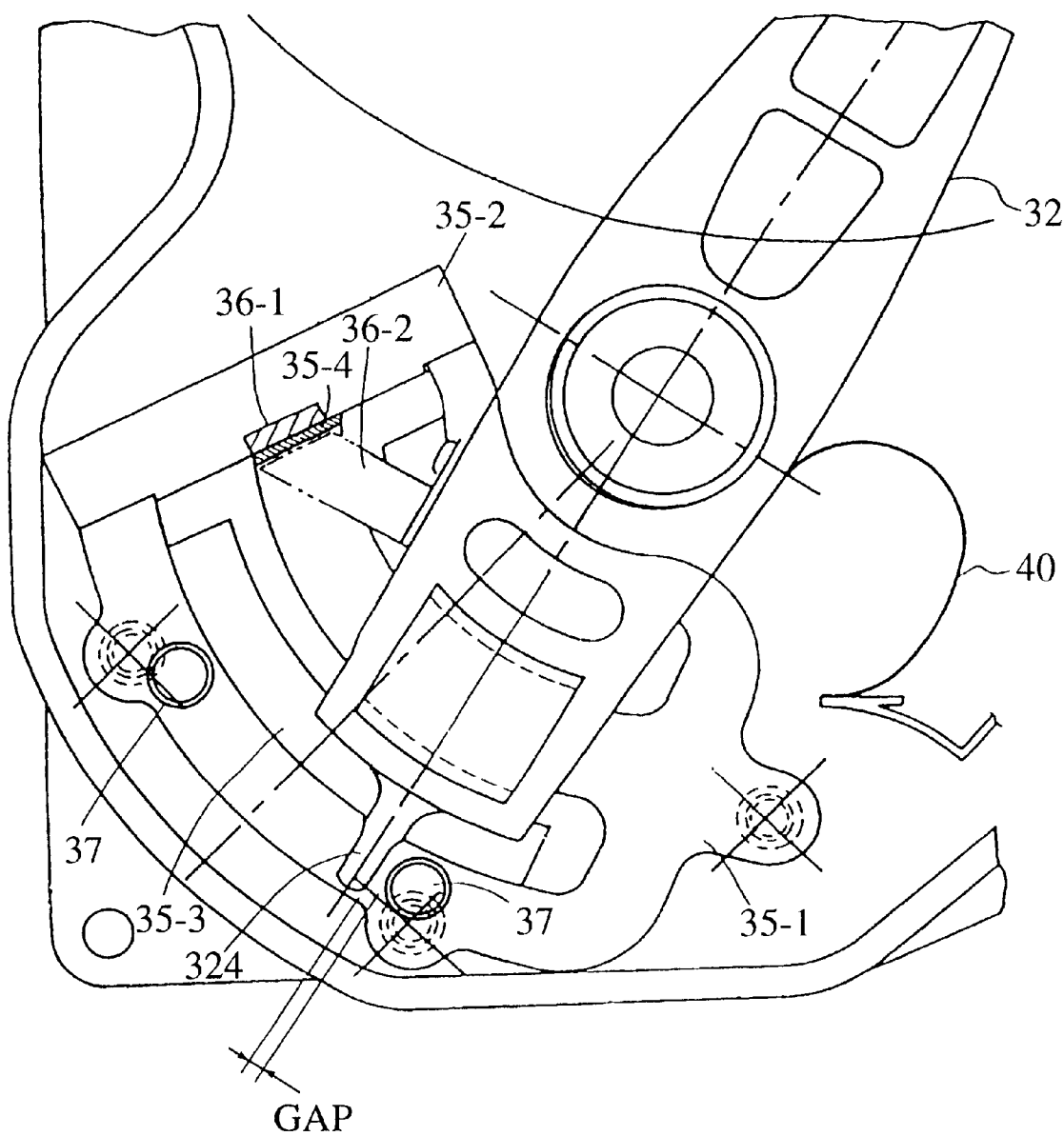
FIG. 42 is a top view of an actuator lock mechanism of FIG. 3.

Referring to FIG. 3, an actuator lock mechanism 36, as will be stated in FIG. 42, serves to lock the actuator 32 during a carrying process of the magnetic disk drive 1. A stopper 37 mounted on the base 10 works to regulate right-and-left rotational positions of the actuator 32. A main FPC (Flexible Print Cable) 40 is, as will be explained in FIG. 35, intended to connect the magnetic head 30 and the drive coil 322 to the outside (printed circuit board 50).

A cable fixing plate 41 fixes the other end of the main FPC 40 but will be explained in FIG. 35. An external connector 42 serves to connect the main FPC 40 to the outside (printed circuit board 50) but will be explained in FIG. 39. A circulation filter 44 works to clean the air in the interior of the magnetic disk drive 1.

Given next is an explanation about an operation of assembling this magnetic disk drive 1 with reference to FIG. 5. As illustrated in the fragmentary view of FIG. 5, an actuator stopper 37 is press-fitted in the base 10. Subsequently, a magnetic circuit (yoke) 35-1 is inserted in the coil 322 of the actuator 32, and a side yoke 35-2 is attached. The side yoke 35-2 is attracted to the yoke 35-1 by a magnetic force.

Inserted next in the base 10 is the actuator 32 fitted with the FPC fixing plate 41, the main FPC 40 and the yoke 35. Then, the actuator 32 is, as discussed above, screw-fastened to the base 10 with the screw 49. Similarly, the FPC fixing plate 41 and the yoke 35 are screw-fastened to the base 10.

Next, the spindle motor 22 fitted with the magnetic disk 20 is inserted in the base 10 up to such a position that the slider of the magnetic head 30 attached to the magnetic head 30 is inserted in between the respective magnetic disks 20. Then, in this state, an unillustrated head grip for fixing the magnetic head is removed, and the magnetic head 30 is loaded in the magnetic disk 20.

Further, the spindle motor 22 is moved up to a predetermined position of the base 10, and the shaft 21 of the spindle motor 22 is screw-fastened to the base 10 by use of a screw 48. Subsequently, the cover 11 is aligned with a guide portion of the base 10 and then fitted therein. Thereafter, a hermetically-closed fixation thereof is attained with the adhesive tape 12.

Thus, the separating side between the base 10 and the cover 11 is inclined to the long side of the magnetic disk drive 1 and is set shorter than the long side. With this arrangement, the separating side is shorter than the long side, and the single opening surface is provided, resulting in an enhanced rigidity of the base 10. Also, the actuator 32 and the spindle motor 22 are mounted in the same base 10. The shaft 31 of the actuator 32 is thereby hard to skew, and, hence, the off-track of the magnetic head 30 can be prevented. For this reason, high-density recording in the track direction can be achieved. Also, the separating side of the base 10 is formed obliquely, thereby facilitating the operation of mounting the actuator and other elements disposed on the inner side.

Figure 6:
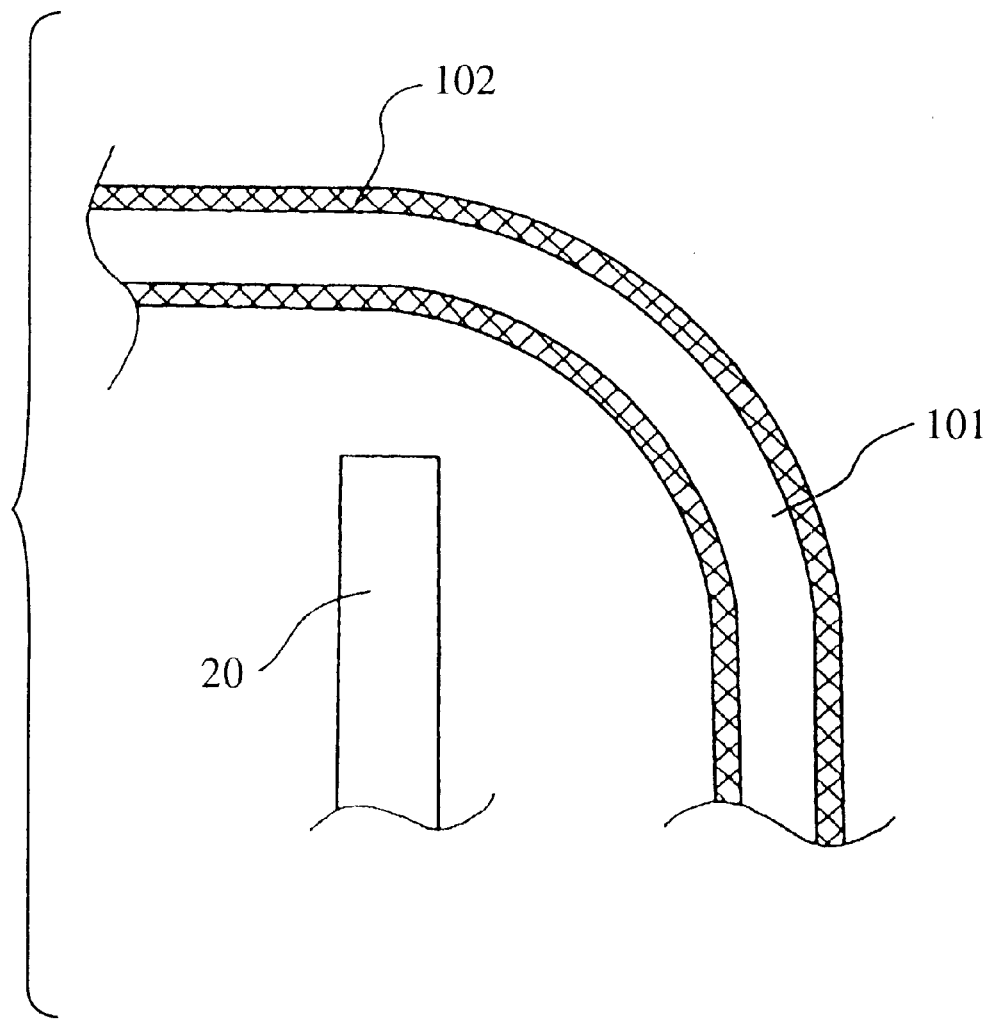
FIG. 6 is a view illustrating a structure of a base of the magnetic disk apparatus of FIG. 2.
Figure 7:
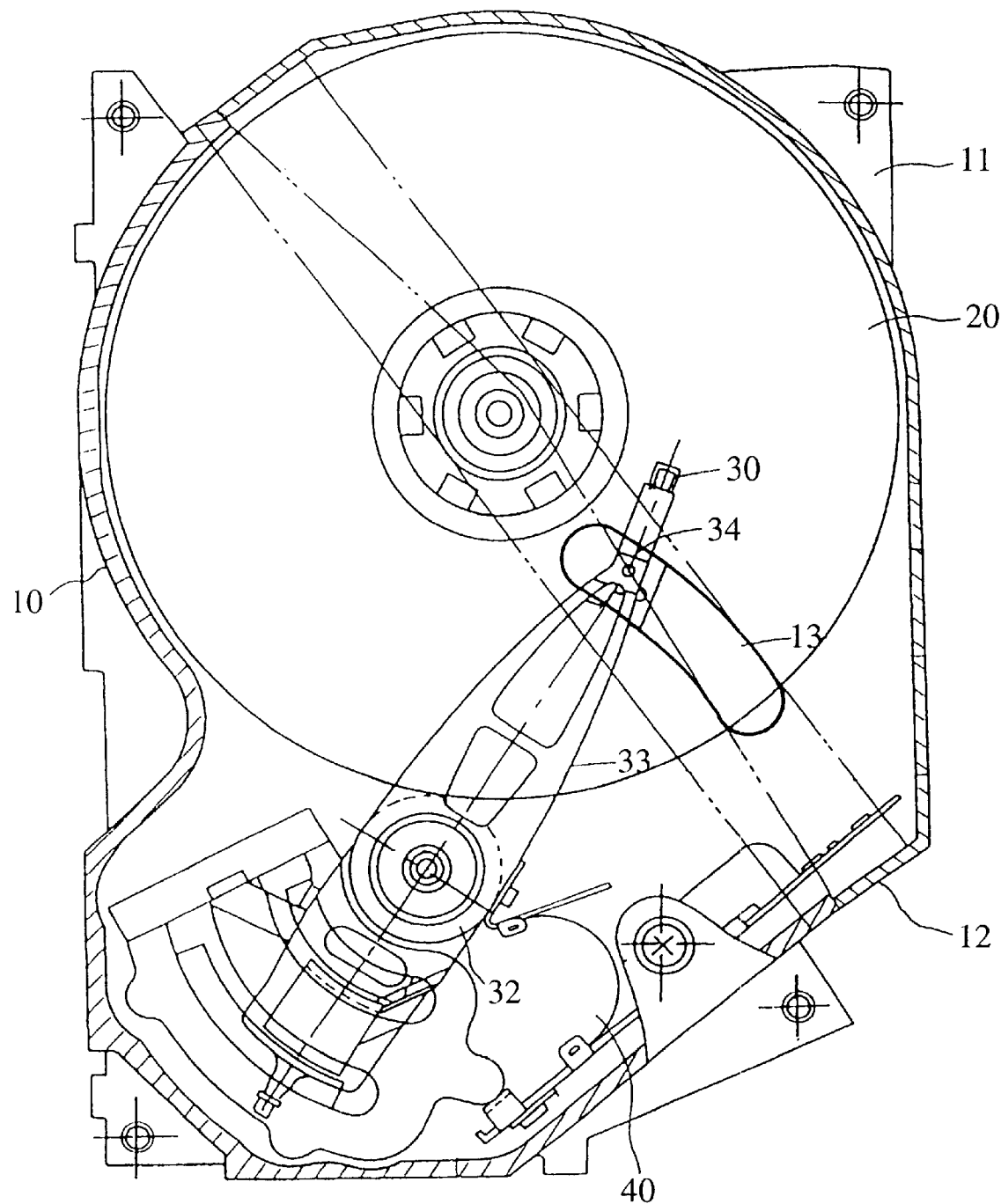
FIG. 7 is a view of assistance in explaining a servo track writing operation in the magnetic disk apparatus of FIG. 2.

FIG. 6 is a view illustrating a structure of the base of the apparatus of FIG. 2. FIG. 7 is a view of assistance in explaining a servo track writing process by the apparatus of FIG. 2.

As shown in FIG. 6, the base 10 is structured such that insulating films 102 based on powdery coating are coated on double sides of a conductor 101 composed of aluminum or the like. The reason for this structure lies in preventing the MR head from a destruction.

That is, a bias voltage (approximately 5.5 V) for reading process is always applied to the MR head 30-2. On the other hand, no electric potential is applied to the magnetic disk 20. For this reason, the electric current leaks to the magnetic disk 20 from the MR head 30-2, thereby bringing about the breakdown of the MR head 30-2.

Under such circumstances, it is required that the electric potential of the magnetic disk 20 be the same as the electric potential of the MR head 30-2. Realization of this arrangement involves a direct connection of a working surface of the base 10 to a terminal of the printed circuit board 50 and applying a power supply potential of the printed circuit board 50 to the base 10. Thus, the electric potential is applied to the magnetic disk 20 electrically connected to this base 10. The leakage of the electric current from the MR head 30-2 to the magnetic disk 20 can be thereby prevented, and the destruction of the MR head 30-2 can be also prevented.

Herein, because of the base 10 being the electric conductor, if a human hand as an electric conductor touches the base 10, the electric potential of the base 10 falls down to the earth, with the result that the electric potential of the magnetic disk 20 is equalized to an earth potential. As a result of this, imparting the electric potential to the magnetic disk 20 is stopped, whereby the breakdown of the MR head 30-2 happens.

For preventing this breakdown, the insulating films 102 are formed on the outer portions of the conductor 101 of the base 10. This arrangement makes it possible to continuously apply the electric potential to the magnetic disk 20, thereby preventing the destruction of the MR head 30-2. Herein, the explanation has been given to only the base 10, but the cover 11 has the same structure. This insulating film 102 also exhibits an effect of preventing a corrosion.

Next, the servo track writing process will be discussed with reference to FIG. 7. As shown in FIG. 7, guide holes 13 are cut in positions, corresponding to a moving locus of the front end of the arm 34, of the base 10 and the cover 11. A push pin (unillustrated) secured to a rotary table is inserted into these guide holes 13.

Then, servo data is written to servo tracks through the magnetic head 30 while positioning the magnetic head 30 by pushing the push pin against the front end of the arm 34 of the actuator 32. Note that the electric current is made to flow across the drive coil 322 to apply a biasing force to the actuator 32 so that the push pin and the actuator 32 contact each other all the time.

In this regard, according to the prior art, a mirror is provided above a hole formed corresponding to a position of the shaft 31 of the actuator 32. Then, the mirror is irradiated with laser beams, and writing to the servo tracks is performed while confirming a position of the actuator. For this reason, the actuator 32 has a cantilever structure wherein one side of the shaft 31 is not supported, resulting in a problem of causing a decline in terms of quality of the servo track writing process. Further, when actually used, the actuator is based on a two-side support structure, and, therefore, the quality of the servo track writing process differs when actually employed. Further, a large hole has to be cut in the base 10, and hence the rigidity of the base 10 decreases. The decrease thereof also leads to the decline of the quality of the servo track writing process.

In contrast with this, according to this embodiment, the actuator 32 is based on a complete two-side support structure wherein both ends of the shaft 31 are fixed to the base 10 and is therefore capable of effecting the writing to the servo tracks. It is therefore possible to prevent the decline in terms of the quality of the servo track writing process. Also, the servo track writing can be done in such a state that the apparatus is used, thereby attaining a more improved quality. Furthermore, the base 10 may be holed just enough to admit the push pin. With this arrangement, the writing to the servo tracks can be performed in such a state as to enhance the rigidity of the base 10. Besides, by pushing the front end of the arm 34, an influence by a repeatable run-out of the bearing 323 can be prevented.

Next, the spindle motor and its peripheral mechanisms will be explained.

Figure 8:
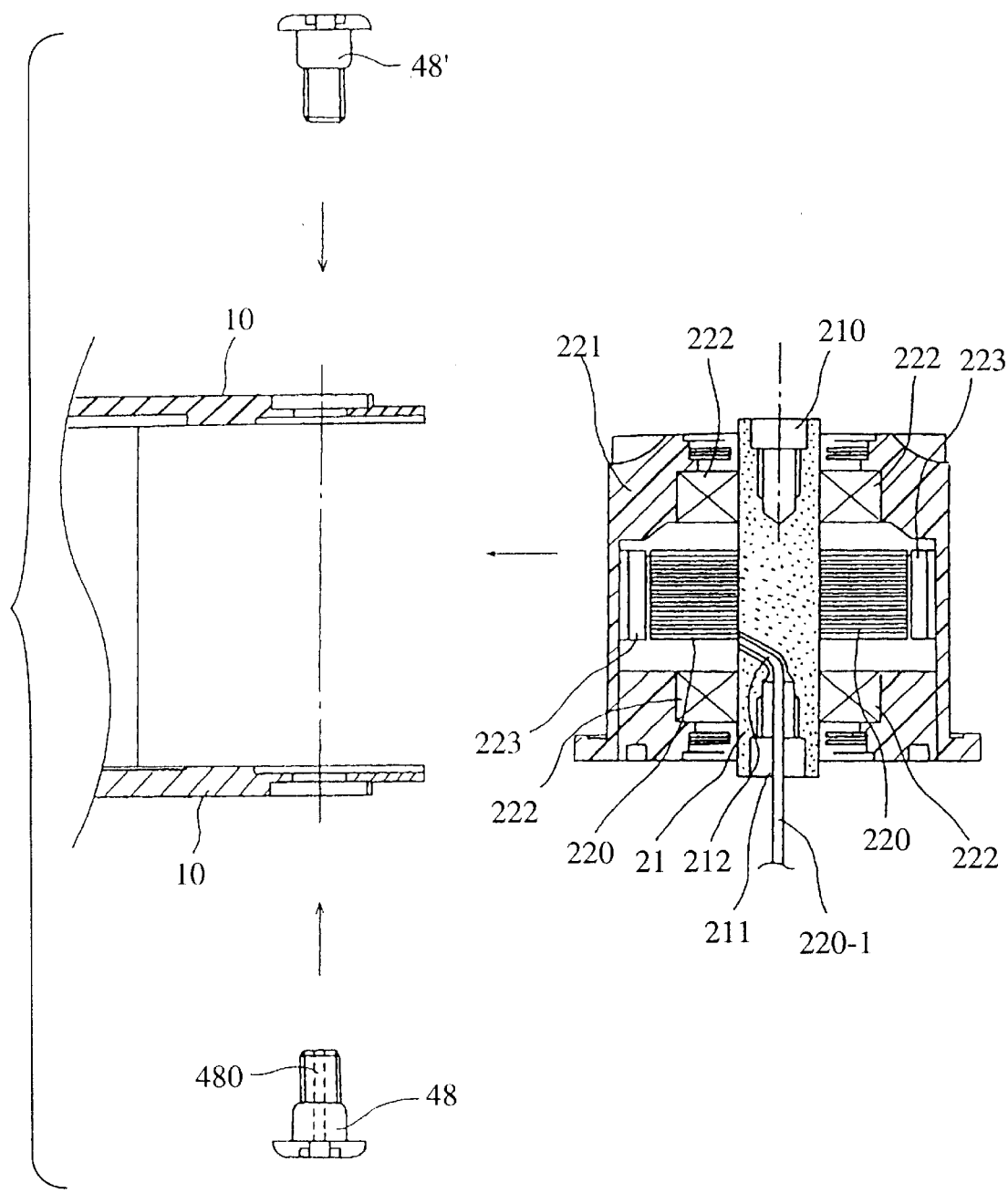
FIG. 8 is a sectional view of a spindle motor.
Figure 9A:
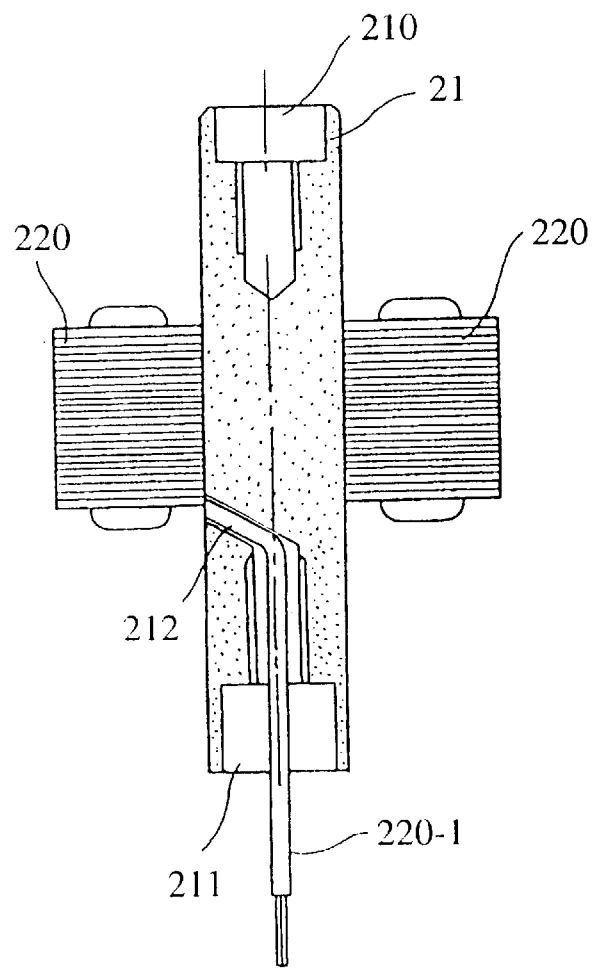
FIGS. 9A and 9B are explanatory views of a coil of FIG. 8.
Figure 9B:
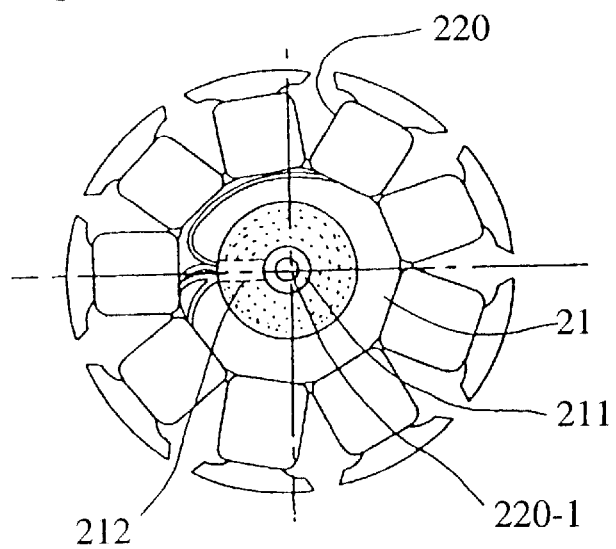
Figure 10:
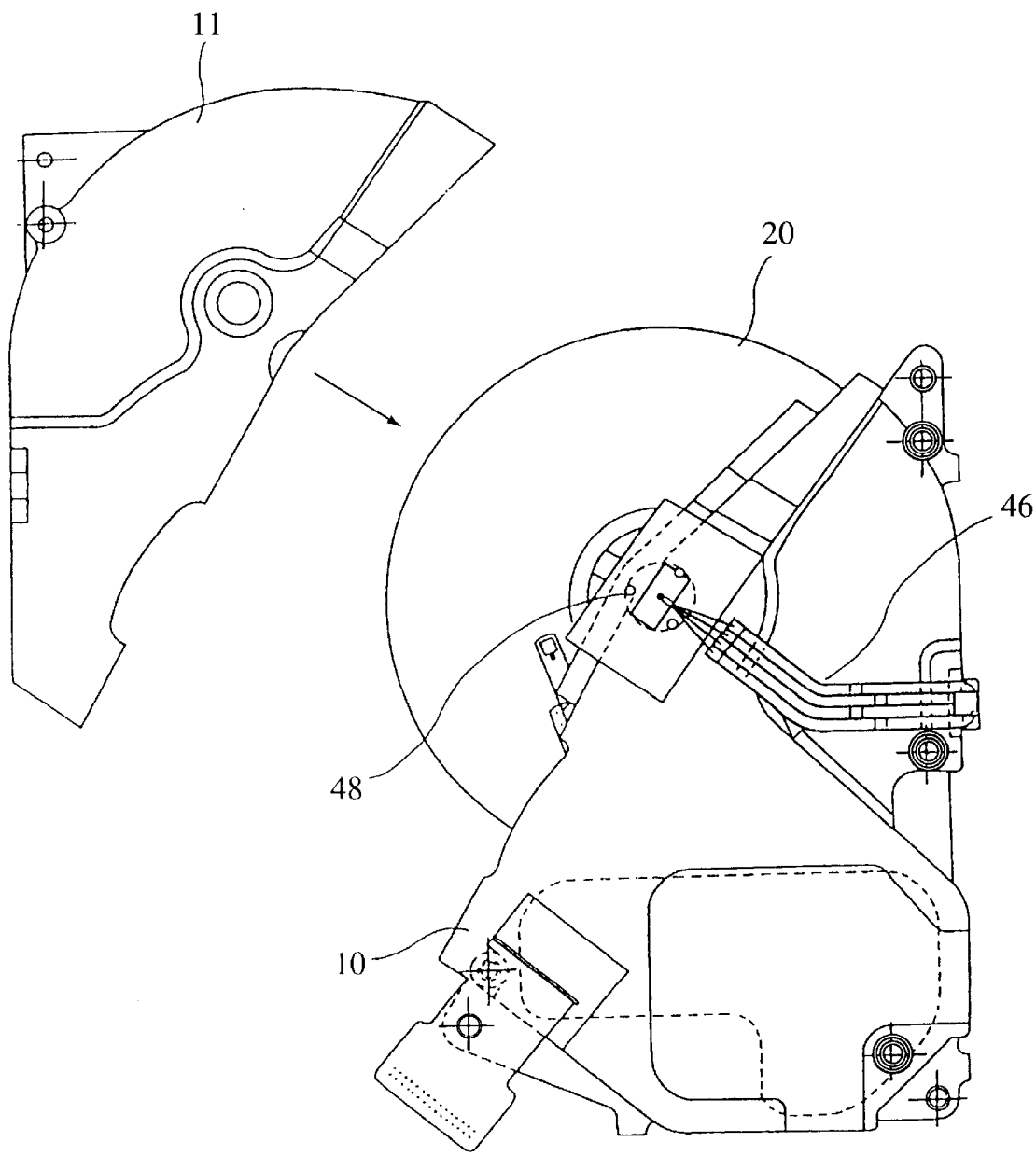
FIG. 10 is a view showing how the base and a cover are separated.
Figure 11:
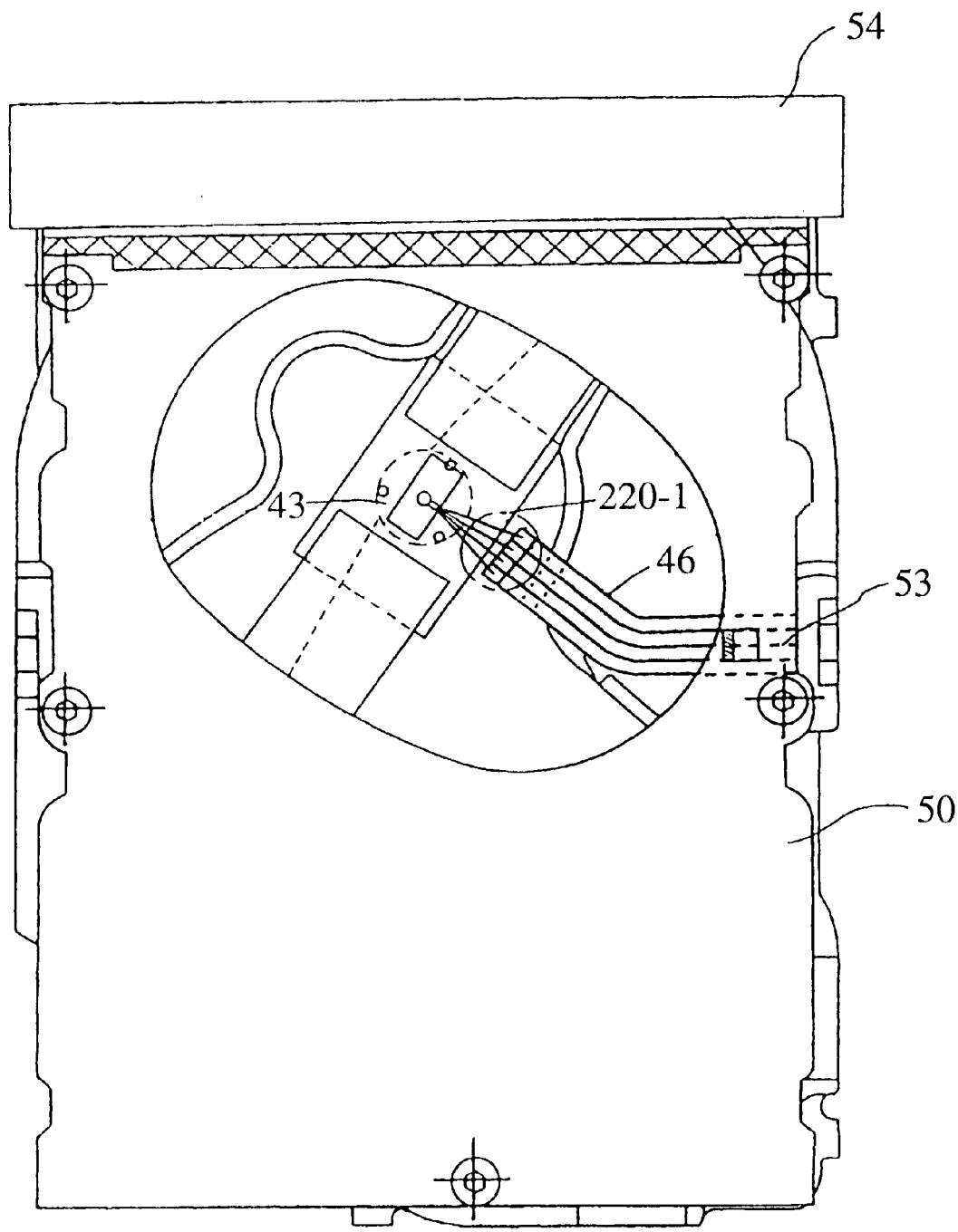
FIG. 11 is a bottom view of the magnetic disk apparatus of FIG. 2.

FIG. 8 is a sectional view of the spindle motor of FIG. 3. FIGS. 9A and 9B are explanatory views showing a coil of FIG. 8. FIG. 10 is a fragmentary view of the magnetic disk apparatus of FIG. 3 as viewed from under. FIG. 11 is a bottom view illustrating a completed body of the magnetic disk apparatus of FIG. 10.

As illustrated, in FIG. 8, the spindle motor includes the shaft, the upper portion of which is screw-fastened to the base through a screw 48'. Also, the lower portion of the shaft 221 is screw-fastened to the base through the screw 48. As shown in FIG. 8, sets of coils 220 are provided along the periphery of this shaft 21. Then, a motor hub 221 is provided through a pair of bearings 2 along the periphery of the shaft 21.

A magnet 223 is attached to an inner surface, disposed in face-to-face relationship with the coil 220, of the motor hub 221. Eight sheets of magnetic disks 20 are fitted in the outer periphery of this motor hub 221.

The motor hub 221 of this spindle motor 22 is, when the electric current flows across the coil 220, rotated about the fixed shaft 21. Thus, it follows that the magnetic disk 20 fixed to the motor hub 221 rotates.

As depicted in FIG. 9B, nine sets of coils 220 are provided along the periphery of the shaft 21. Then, these nine sets of coils 220 are connected to each other via four lengths of lead wires 220-1. As shown in FIG. 9A, screw holes 210, 211 are formed in the spindle shaft 21. Then, the screw hole 211 cut in the lower portion of the shaft 21 communicates with the side surface of the shaft 21 via a communicating hole 212 formed in the shaft 21. The above-mentioned lead wires 220-1 crawl along this communicating hole 212 and the screw hole 211 as well.

As illustrated in FIG. 8, bearings 222 are provided upwardly downwardly of the coils 220 of this spindle shaft 21. Subsequently, the motor hub 221 inclusive of the magnet 223 attached to the inner surface thereof is provided around the bearings 222. Thus, the spindle motor is completed. This spindle motor is secured to the base 10 by use of the screws 48', 48.

Of these screws, the upper screw 48' has a normal structure, but the lower screw 48 is formed with a central hole 480 at the center thereof. When the spindle motor is inserted in this base 10 and secured by the screws 48', 48, the above-discussed lead wires 220-1 are inserted and fitted into the central hole 480 of the screw 48.

Accordingly, both ends of the spindle motor are screw-fastened to the base 10, and, at the same time, the lead wires 220-1 of the coils 220 are guided to the outside of the base 10 via the central hole 480 of the screw 48 as well as via the screw hole 211. Both ends of the spindle shaft 21 are thereby firmly supported on the base 10, and it is therefore possible to prevent the off-track and an eccentricity of the spindle motor. In addition, the lead wires 220-1 can be guided to the outside without exerting an influence on the rotations of the spindle motor. As shown in FIG. 10, these lead wires 220-1 guided to the outside are connected to a flexible cable 46.

FIG. 11 is a top view when the printed circuit board 50 is mounted in the above-described magnetic disk drive 1. The printed circuit board 50 is, as explained in FIG. 2, equipped with an external connector 54 at its front edge. Then, the printed circuit board 50 is, as shown in FIG. 11, connected at five points to the mounting frame 51. The flexible cable 46 of this magnetic disk apparatus is connected to a connector 53 attached to the printed circuit boar 50. With this configuration, the spindle motor is rotationally controlled by a motor control circuit mounted on the printed circuit board 50.

In this manner, the central hole 480 is formed in the screw 48, and the lead wires 220-1 of the coils 220 of the spindle motor are guided to the outside via the central hole 480. Hence, the processing of the lead wires can be facilitated while actualizing the both-end support structure of the spindle motor, and, besides, it is feasible to prevent the decline in terms of rotational characteristics of the spindle motor.

Figure 12:
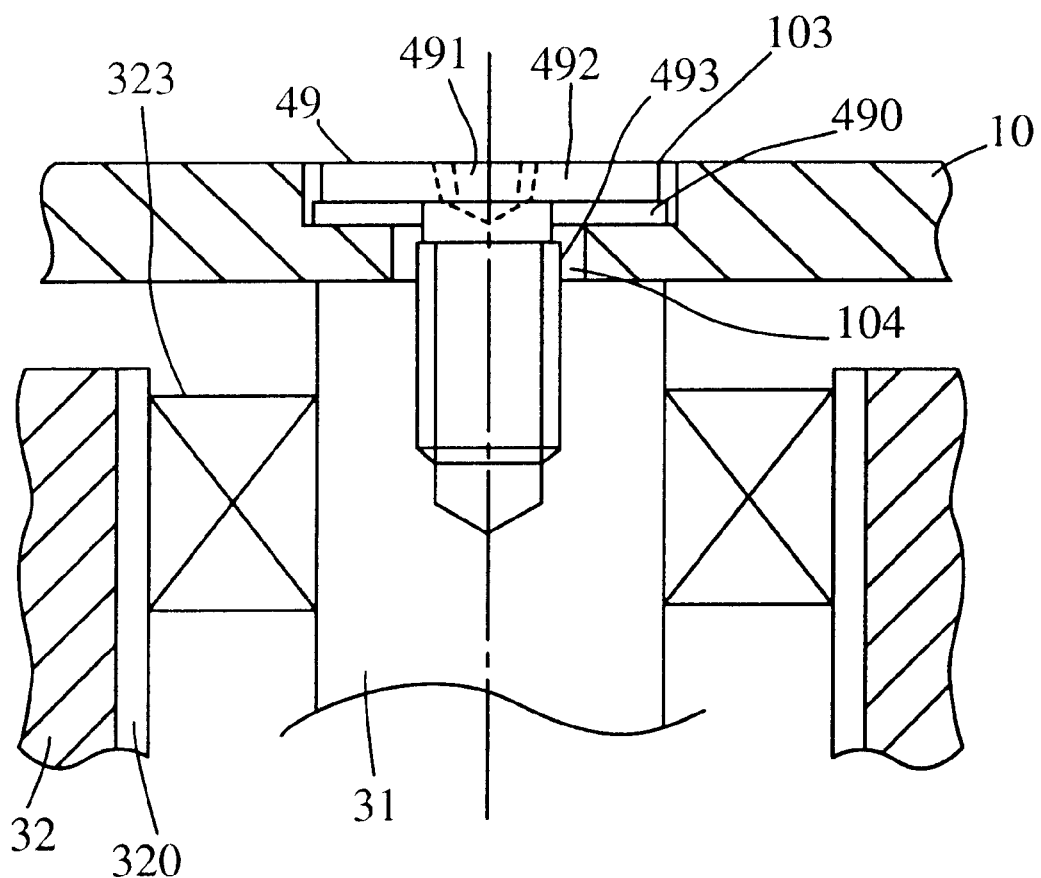
FIG. 12 is a sectional view illustrating a screw fastening mechanism of a rotary actuator.

FIG. 12 is a view depicting a screw fastening structure of the shaft of the rotary actuator. As explained in FIG. 4, the shaft 31 of the rotary actuator 32 rotatably supports the actuator 32 through a sleeve 320 as well as through the bearing 323. Further, the shaft 31 is formed with a screw hole into which a threaded portion of the screw 49 is fastened.

The base 10 is composed of a material such as aluminum, etc. Then, an external surface of the base 10 is formed with a recess 103 for accommodating a washer 490 and a head 492 of the screw 49. The central portion of this recess 103 is cut with a through-hole (first through-hole) 104 through which the threaded portion 493 of the screw 49 passes.

The washer 490 is formed of iron or the like. Then, the washer 490 has a major diameter enough to fit in the recess 103 of the base 10. Further, the washer 490 is formed with a through-hole (second through-hole) having its major diameter smaller than the through-hole 104 of the base 10. The through-hole of the washer 490 has the major diameter enough to permit a passage of the threaded portion of the 493 of the screw 49. Also, the material of the washer 490 has, desirably, a large coefficient of friction with the base 10 but a small coefficient of friction with the screw 49.

The screw 49 is formed of the iron or the like. The screw 49 has a grooved portion 491 engaging with the driver, a head 492 and a threaded portion 493. The material of the screw 49 has, desirably, a small coefficient of friction with the washer 490.

Next, there will be explained an operation of securing the shaft 31 of the rotary actuator 32. To start with, the washer 490 is inserted in the recess 103 of the base 10. Next, the shaft 31 of the rotary actuator 32 is positioned in the through-hole 104 of the base 10. At this time, the screw hole of the shaft 31 is aligned with the through-hole 104 of the base 10. Moreover, the threaded portion 493 of the screw 49 is inserted in the screw hole of the shaft 31 via the through-hole 104 of the base 10 as well as via the through-hole of the washer 490. Then, the screw 49 is screwed therein by the driver. With this operation, the shaft 31 is fixed to the base 10.

Advantages of this construction will be given. Normally, the shaft 31 is positioned and screw-fastened at its one end. On the other hand, the through-hole of the base 10 is formed slightly large. Thus, it is possible to effect positioning by shifting the shaft within a range of the through-hole even if a positional deviation of the through-hole is caused due to a scatter in terms of working accuracy. Subsequently, the shaft is screw-fastened at the other end thereof. This screw-fastening implies a simple support of the shaft 31 because of positioning of the shaft 31 having been completed.

However, a bearing surface of the screw head is not necessarily parallel to a contact surface of the base 10. For this reason, when in the screw fastening operation, a force acts in such a direction as to skew the shaft 31, with a fulcrum being a position where the bearing surface of the screw head contacts the base 10 for the first time. As a result, the shaft 31 is fixed while remaining slightly skewed.

Further, the through-hole of the base 10 is formed comparatively large, and, therefore, a contact area between the screw head and the base 10 is small. For this reason, after fixing the shaft, there exists a possibility in which the shaft 31 deviates within the range of the through-hole due to a thermal distortion, an external impact and a drive reaction of the actuator 32.

Based on this construction, when in the screw fastening operation, the inclination of the shaft 31 can be adjusted by controlling the position of the washer 490. Also, after the screw fastening has been done, the washer 490 and the base 10 do not deviate due to the friction therebetween. Moreover, the diameter of the screw hole of the shaft 31 is smaller than the diameter of the through-hole 104 of the base 10. Hence, the shaft 31 skews only within the range of the through-hole of the washer 490. It is therefore feasible to reduce the skew of the shaft 31.

Note that the through-hole 103 of the base 10 needs to be formed relatively large for adjusting the mounting position of the shaft 31. On the other hand, the through-hole of the washer 490 can be reduced down to such a range as to permit the penetration of the threaded portion 493 of the screw 49.

In accordance with this embodiment, the base 10 is formed of aluminum, while the screw 49 and the washer are formed of iron. An aluminum-to-iron frictional coefficient is larger than an iron-to-iron frictional coefficient. Hence, the coefficient of friction between the base 10 and the washer 490 is large (approximately 0.3 or more), but the coefficient of friction between the screw 49 and the washer 490 is small (approximately on the order of 0.15). Then, when in the screw fastening operation, the bearing surface of the head 492 of the screw 49 is not parallel to the contact surface of the base, and, therefore, even if the bearing surface of the head 492 of the screw 49 partly contacts the washer 490, the contact portion of the screw head 492 slides on the washer 490. For this reason, the shaft does not skew, with the fulcrum being where the bearing surface of the screw head 492 contacts the washer 490 for the first time.

Further, the recess 103 of the base 10 accommodates all of the washer 490 and the screw head 492, and, hence, the screw head 492 can be prevented from protruding from the base 10.

Figure 13:
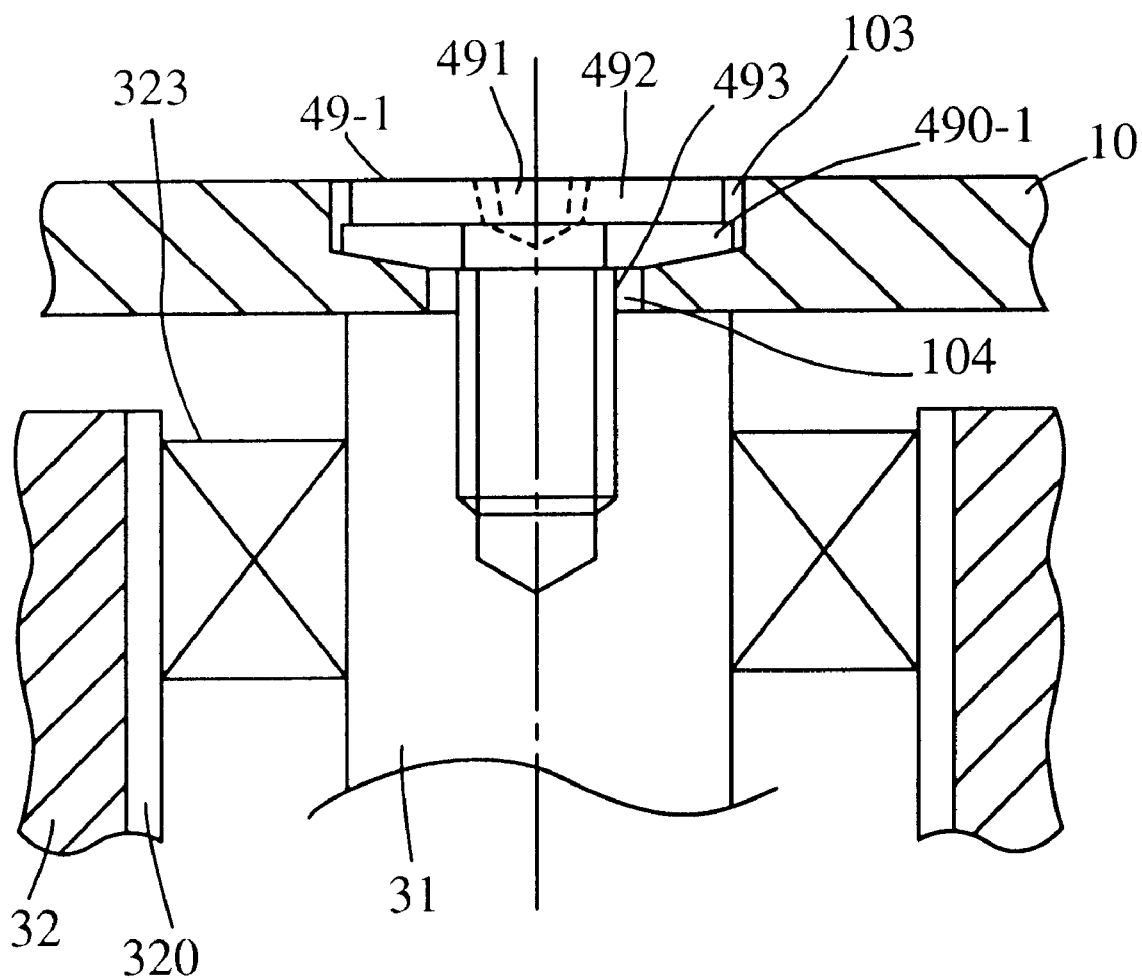
FIG. 13 is a sectional view showing an example of modification of the screw fastening mechanism of FIG. 12.

FIG. 13 is a sectional view illustrating an example of modification of the screw fastening mechanism.

According to this embodiment, in contrast with the embodiment of FIG. 12, a washer 490-1 has a flat screw contact surface but a conical base contact surface. Further, a washer contact surface of the recess 103 of the base 10 is formed in the conical shape corresponding to the conical base contact surface of the washer 490-1. Other configurations are the same as those in the embodiment of FIG. 12.

In accordance with this embodiment, the washer 490-1 and the screw 49 are always positioned at the center of the conical surface between the base 10 and the washer 490-1. With this arrangement, after the screw fastening has been carried out, there always acts a force to revert to an initial state. Thus, even if suffered from the thermal distortion or the external impact, the skew of the shaft 31 can be prevented.

Figure 14A:
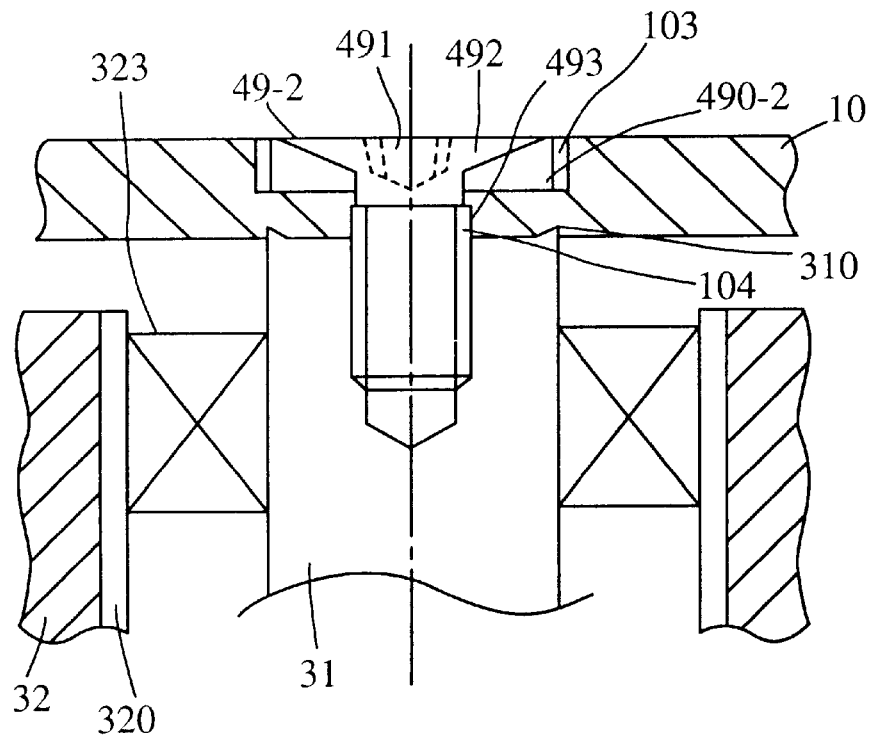
FIGS. 14A and 14B are sectional views showing another example of modification of the screw fastening mechanism of FIG. 12.
Figure 14B:
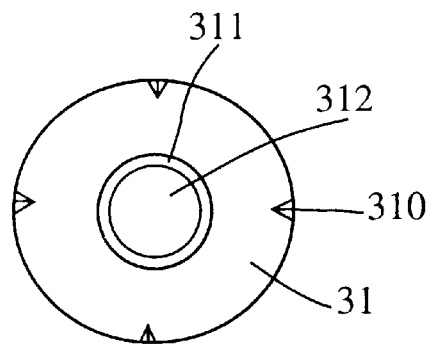

FIG. 14A is a sectional view showing another example of modification of the screw fastening mechanism of FIG. 12. FIG. 14B is a top view illustrating another example of modification of the screw fastening mechanism of FIG. 12.

In accordance with this embodiment, as depicted in FIG. 14A, the screw 49-2 entails the use of a flat countersunk head screw having its conical washer-contact surface. Then, the washer 490-2 has its screw-contact surface assuming a conical shape corresponding to a head 492 of the flat countersunk head screw 49-2. A base-contact surface of the washer 490-2 takes a planar shape. Further, the washer-contact surface of the recess of the base 10 also takes the planar shape.

In this embodiment, the screw 49 is invariably positioned at the center of the conical surface of the washer 490-1. With this positioning, after the screw fastening has been conducted, there works a force to revert to the initial state. In consequence of this, even if suffered from the thermal distortion or the external impact, the skew of the shaft 31 can be prevented.

Further, as illustrated in FIG. 14B, a protrusion 310 is formed on an end surface of the shaft 31. With this formation, a fastening force of the screw 49-2 intrudes the protrusion 310 into the base 10. With this intrusion, the shaft 31 can be firmly fixed, thereby making it possible to prevent the skew of the shaft 31.

In accordance with this embodiment, the discussion has been given to the upper screw fastening mechanism of the shaft 31 of the rotary actuator 32. However, a lower screw fastening mechanism of the shaft 31 of the rotary actuator 32 is also, likewise, usable. Moreover, this mechanism can be employed as a screw fastening mechanism of the shaft 21 of the spindle motor 22.

Figure 15:
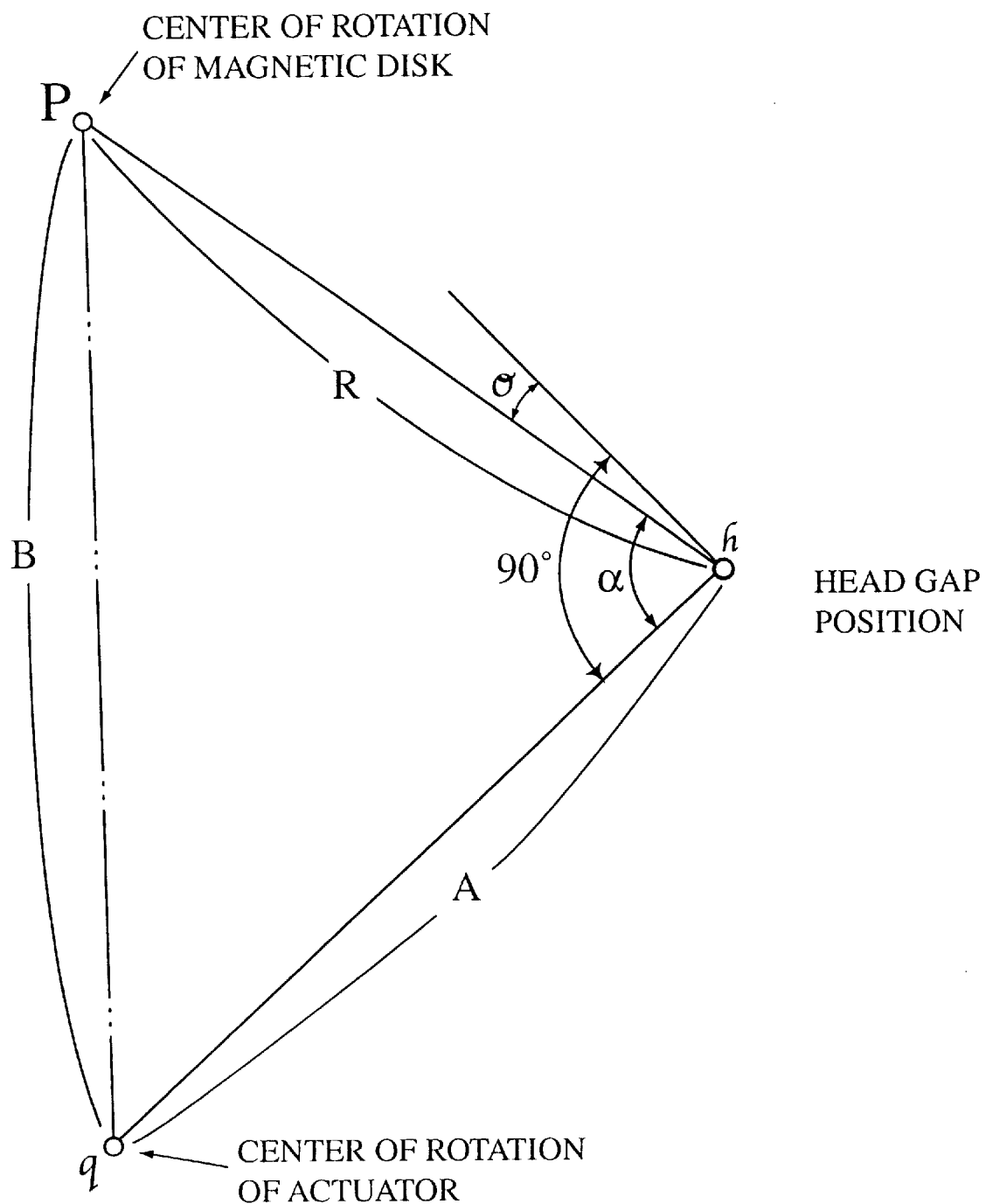
FIG. 15 is a view of assistance in explaining a yaw angle in the magnetic disk apparatus of FIG. 3.
Figure 16:
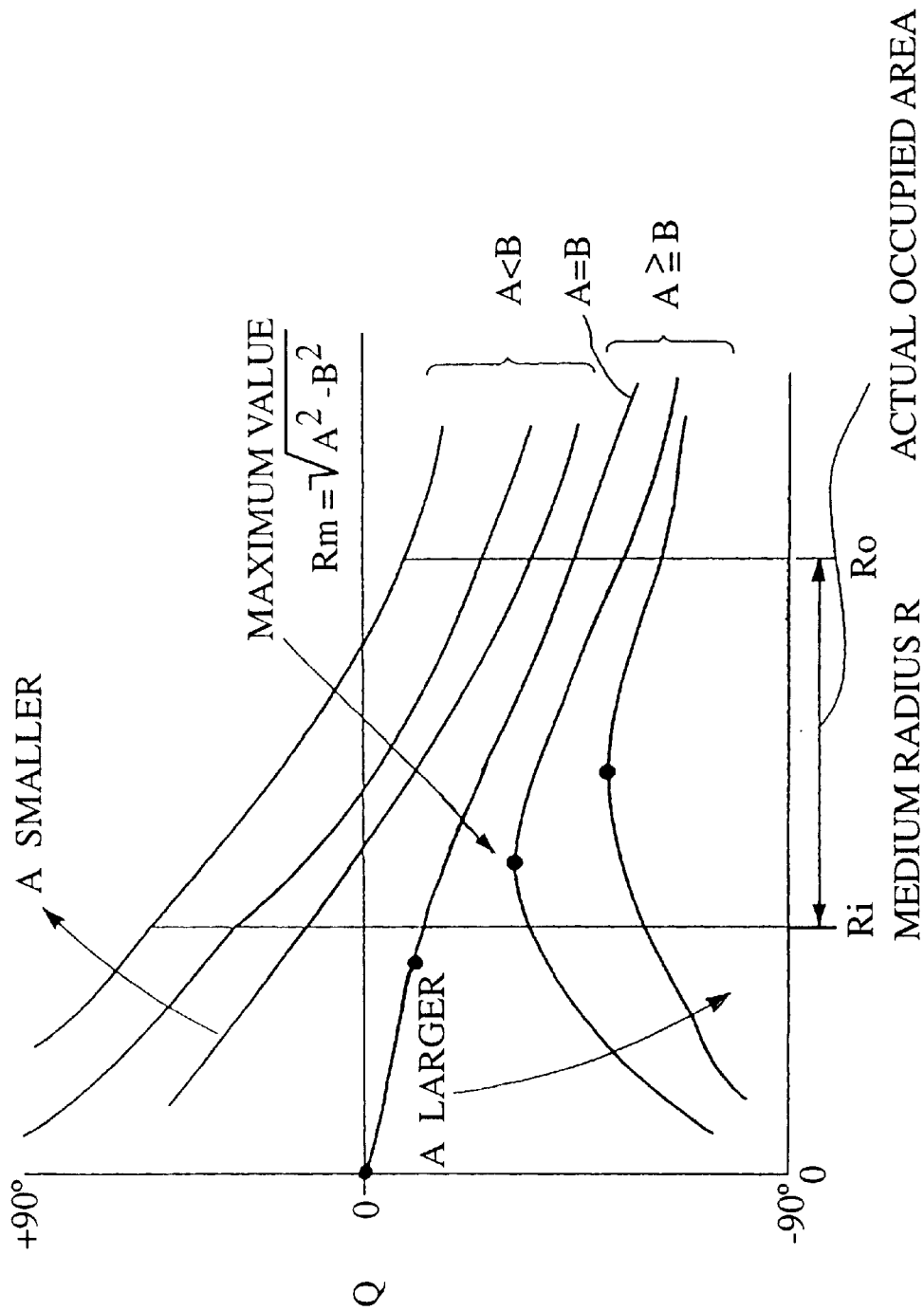
FIG. 16 is a diagram showing a yaw angle versus a radius relationship in FIG. 15.
Figure 17:
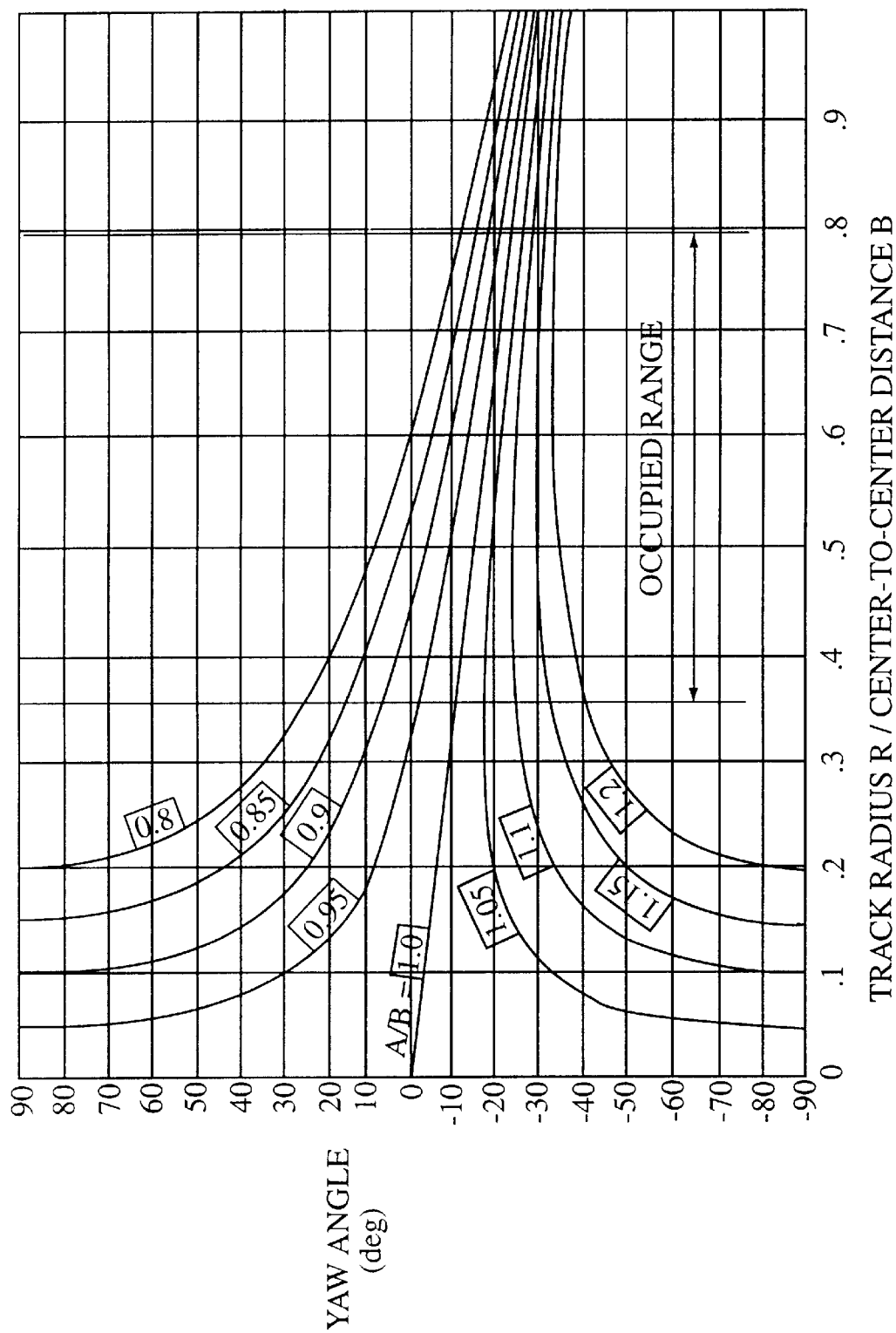
FIG. 17 is a diagram showing a yaw angle versus R/B relationship.
Figure 18A:
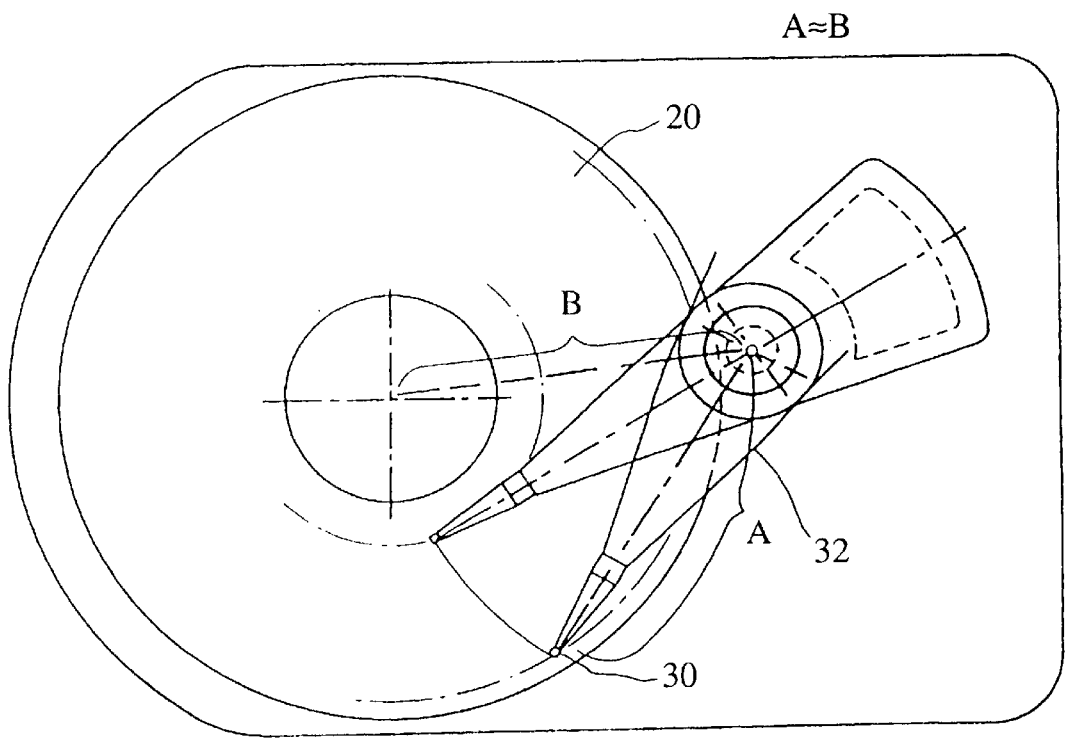
FIGS. 18A and 18B are views of assistance in explaining a correction of a yaw angle variation width.
Figure 18B:
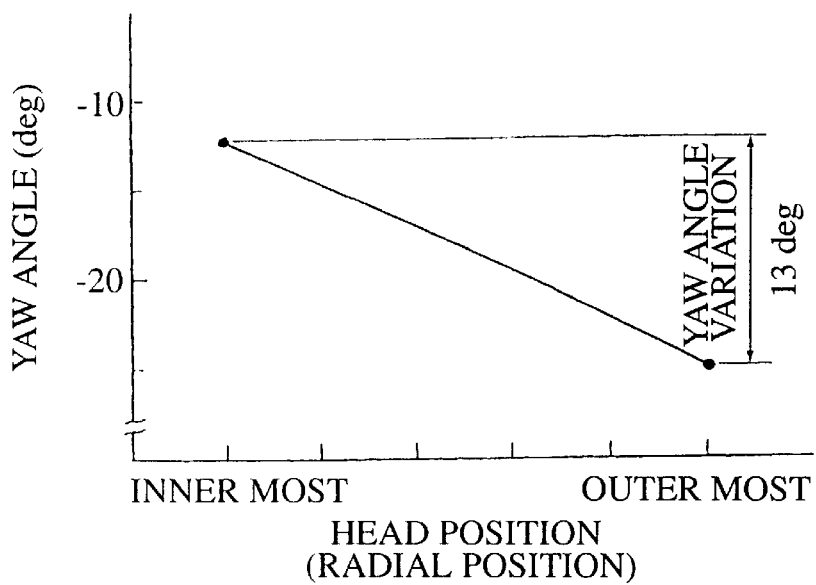
Figure 19A:
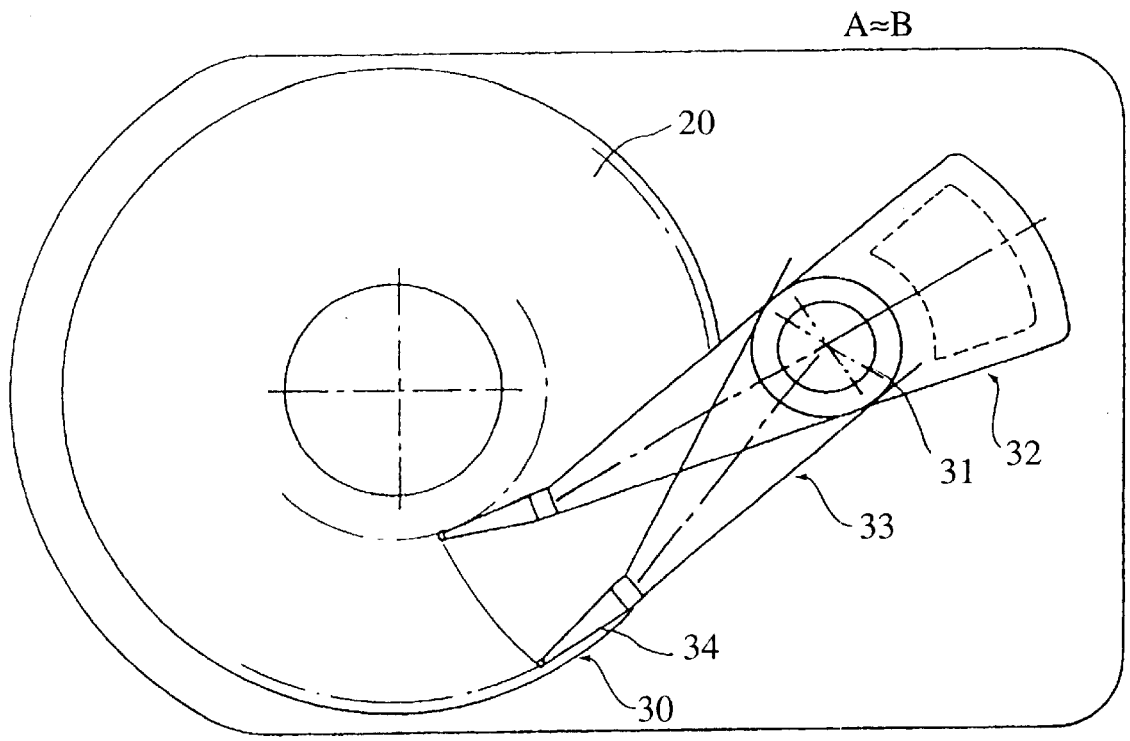
FIGS. 19A and 19B are a view and a diagram of assistance in explaining corrections of the yaw angle variation width and of a yaw angle absolute value (part 1)
Figure 19B:
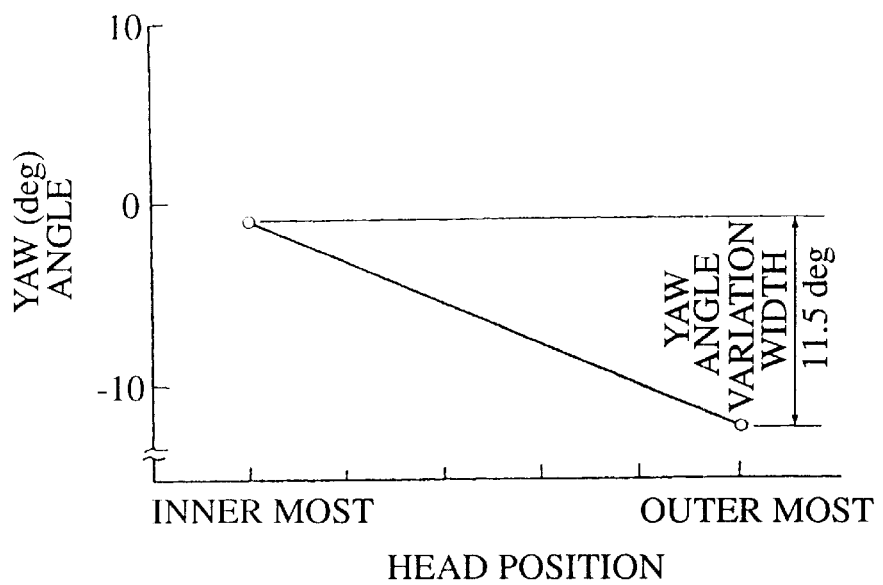
Figure 20A:
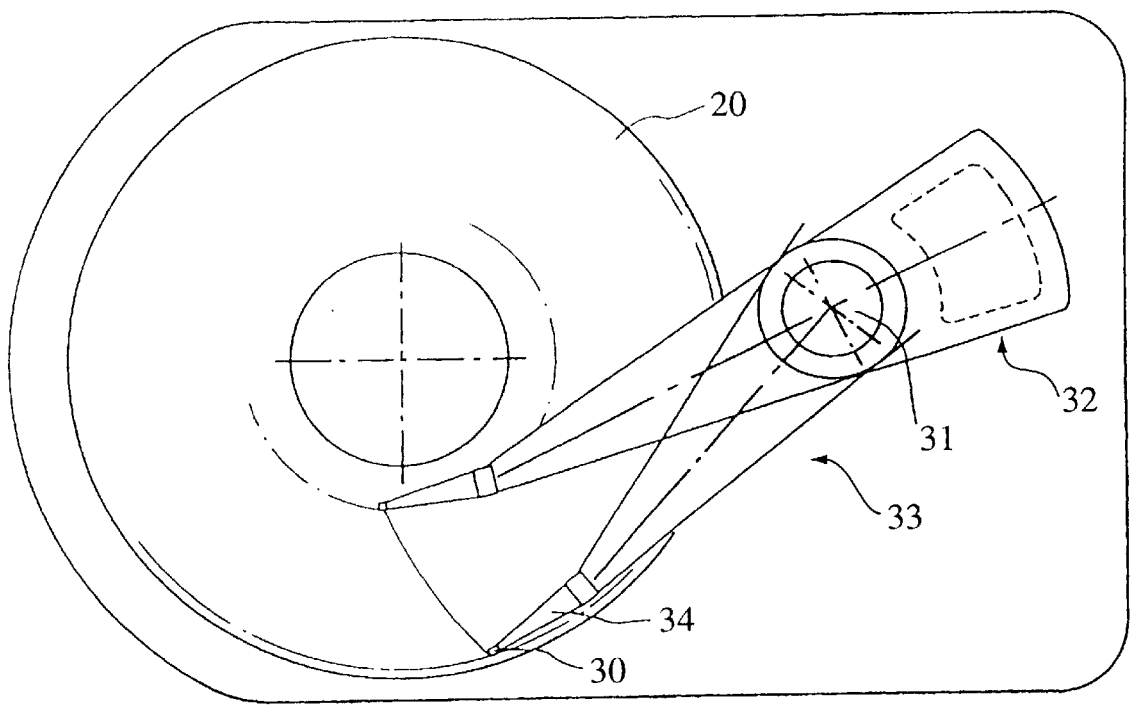
FIGS. 20A and 20B are a view and a diagram of assistance in explaining the corrections of the yaw angle variation width and of the yaw angle absolute value (part 2)
Figure 20B:
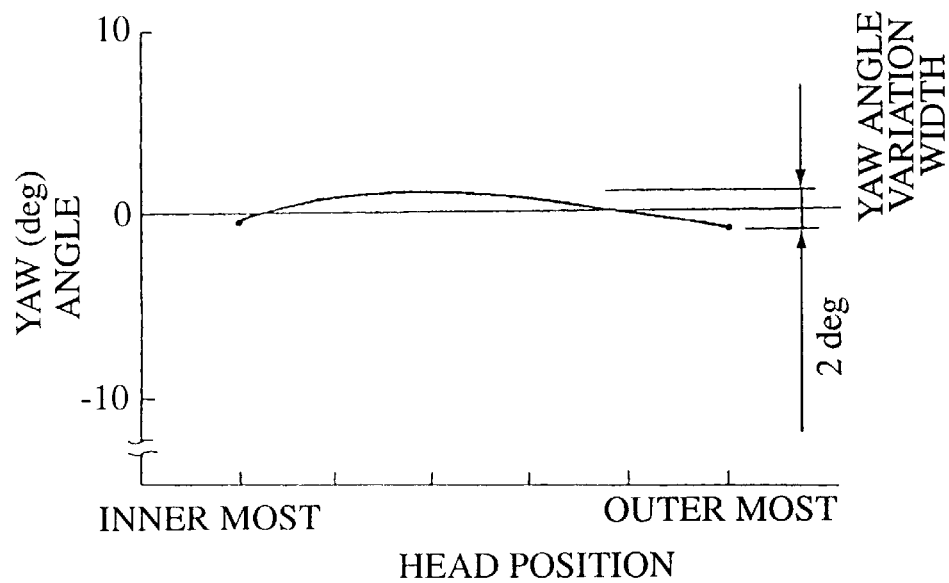
Figure 21:
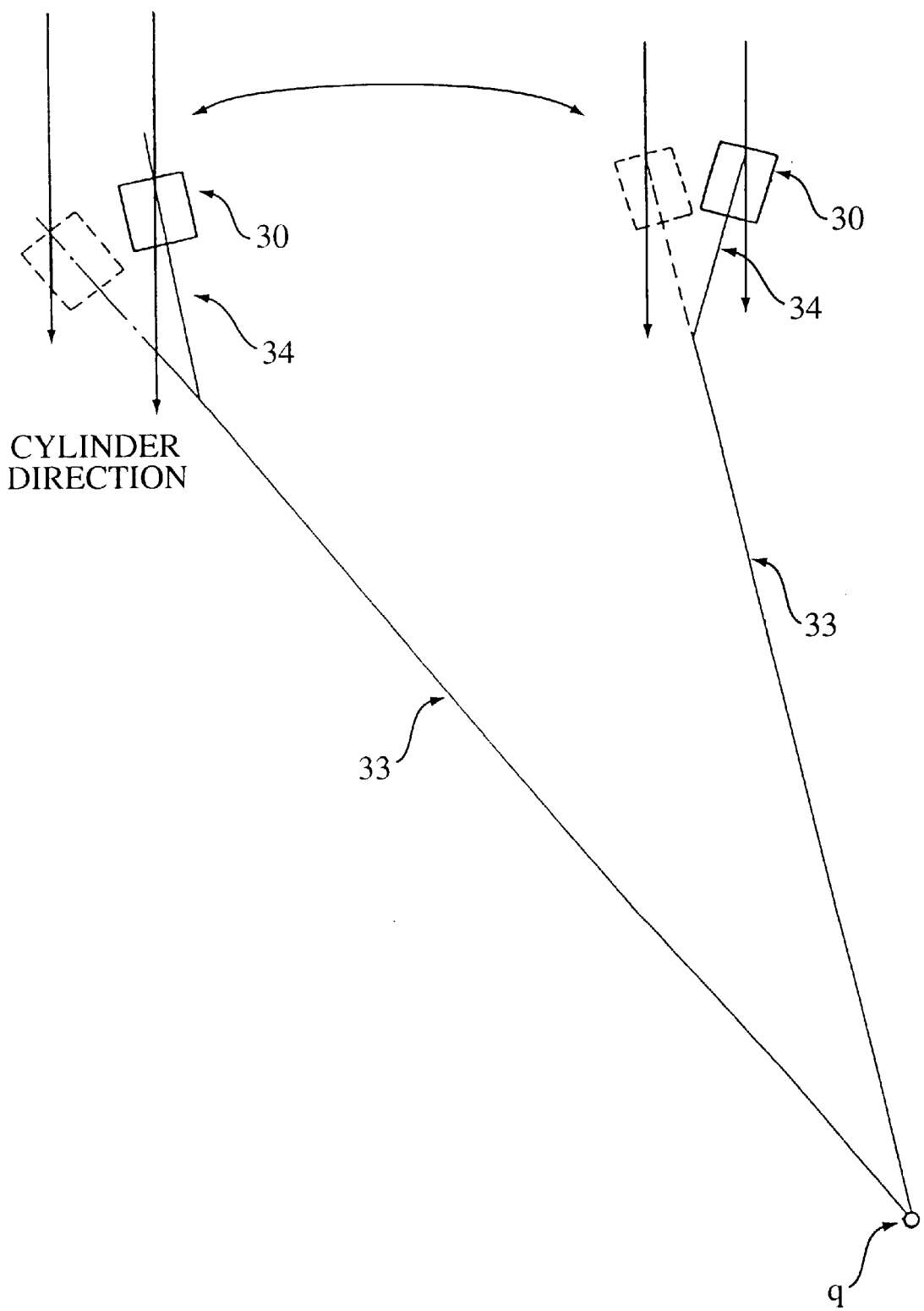
FIG. 21 is a view of assistance in explaining the correction of the yaw angle absolute value.

FIG. 15 is an explanatory view of a yaw angle according to the present invention. FIG. 16 is a diagram showing a yaw angle versus a radius relationship according to this invention. FIG. 17 is a yaw angle versus R/B relationship according to this invention. FIGS. 18A and 18B are a view and a diagram of assistance in explaining a correction of a yaw angle variation width according to the present invention. FIGS. 19A and 19B are a view and a diagram (part 1) of assistance in explaining corrections of the yaw angle variation width and of a yaw angle absolute value according to this invention. FIGS. 20A and 20B are a view and a diagram (part 2) of assistance in explaining the yaw angle variation width and of the yaw angle absolute value. FIG. 21 is an explanatory view showing the correction of the yaw angle absolute value.

As illustrated in FIG. 15, let B be the distance from a center-of-rotation q of the actuator 32 up to a center-of-rotation p of the magnetic disk 20, and let A be the distance from the center-of-rotation q of the actuator 32 up to a gap position h of the magnetic head 20. Further, let R be the distance from the center-of-rotation p of the magnetic disk 20 up to the gap position h of the magnetic head 30. Moreover, let α be the angle made by a side hq and a side hp, and the yaw angle θ is defined by the following formula:

$$\theta = \alpha - 90° \qquad (1)$$

Figure 59A:
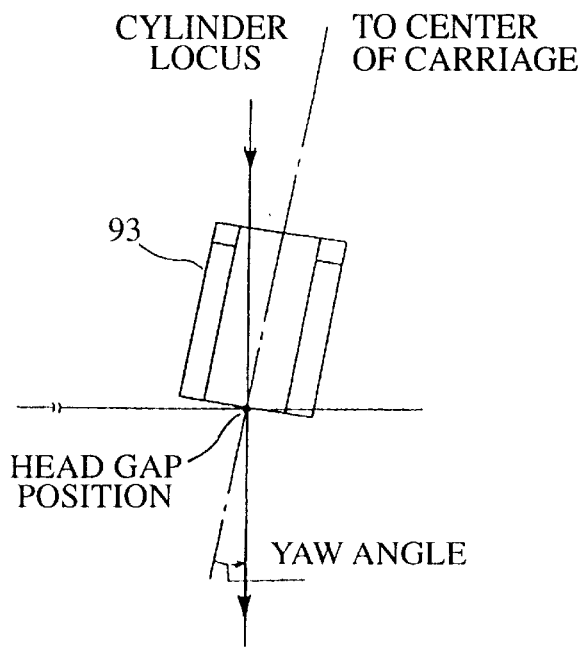
FIGS. 59A, 59B, 59C and 59D are views of assistance in explaining the yaw angle in the prior art.
Figure 59B:
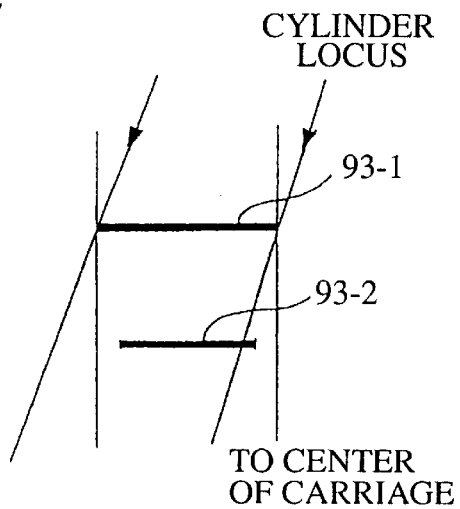
Figure 59C:
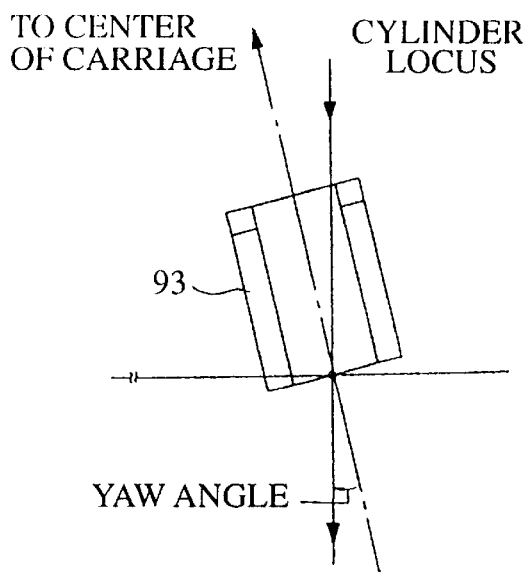
Figure 59D:
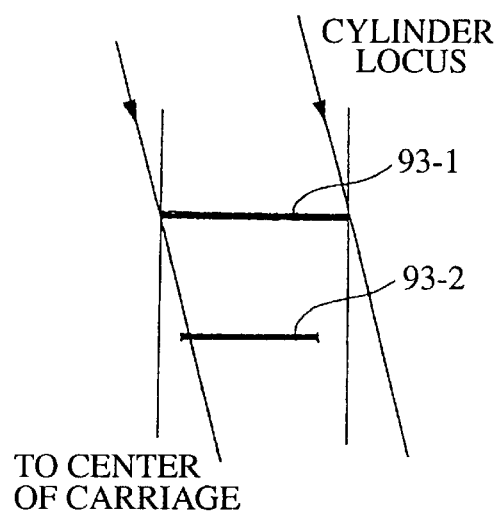

Note that the yaw angle θ in FIG. 15 is set in such a position as to rotate through 90 degrees with respect to the yaw angle shown in FIGS. 59A and 59C.

Herein, in a triangle shaped by the points p, q and h, a relationship is established in the following formula (2):

$$B^2 = A^2 + R^2 - 2AR \cdot \cos \alpha \qquad (2)$$

Hence, the angle α is obtained from the following formula (3).

$$\alpha = \cos^{-1} \sqrt{\frac{A^2 + R^2 - B^2}{2AR}} \qquad (3)$$

When substituting this formula into the formula (1), the yaw angle θ according to the following formula (4) is given by:

$$\theta = \cos^{-1} \sqrt{\frac{A^2 + R^2 - B^2}{2AR}} - 90° \qquad (4)$$

This formula is, as shown in FIG. 16, graphed, wherein the axis of abscissa indicates the radius R, while the axis of ordinate indicates the yaw angle θ. In this graph, the distance a is varied as a parameter. As obvious from this graph, if the distance (termed an arm length) A from the center-of-rotation q of the actuator 32 to the gap position h of the magnetic head 20 is shorter than the distance (termed a center-to-center distance) B from the center-of-rotation q f the actuator 32 to the center-of-rotation p of the magnetic disk 20, the characteristic of the head yaw angle θ depicts such a curve that the yaw angle θ is simply reduced with a larger radius R of the magnetic disk 20. Accordingly, the variation in the yaw angle with respect to the radius is large.

On the other hand, if the arm length A is the center-to-center distance B or larger, the yaw angle θ depicts such a sine wave curve that the maximum value is taken with the radius Rm. Hence, for reducing the variation in the yaw angle, it can be appreciated that the arm length A may be increased, but the center-to-center distance B may be decreased, i.e., A≧B.

Further, in order to minimize the yaw angle width, the maximum value may be taken within an occupied area of the magnetic disk 20 in the radial direction. Namely, Ri≦Rm≦Ro, where Ri is the innermost radius, and Ro is the outermost radius.

Herein, the radius with which the yaw angle θ takes the maximum value is a radius when θ=0, that is, α=90°. Accordingly, from the formula (2), the radius Rm is given by $\sqrt{A^2 - B^2}$.

Hence, the arm length A and the center-to-center distance B may be selected to satisfy the following formula:

$$Ri \geq \sqrt{A^2 - B^2} \leq Ro \qquad (5)$$

FIG. 17 is a relational diagram wherein when arm length A/center-to-center distance B serves as a parameter, the axis of abscissa indicates the yaw angle, while the axis of ordinate indicates track radius R/center-to-center distance B. As shown in FIG. 17, in the yaw angle versus track radius R/center-to-center distance B, if the arm length is shorter than the center-to-center distance B, the characteristic of the head yaw angle θ depicts such a curve that the yaw angle θ simply decreases with a larger track radius R. On the other hand, if the arm length A is equal to the center-to-center distance B, the characteristic of the head yaw angle depicts substantially a straight line. Further, if the arm length A is larger than the center-to-center distance B, the characteristic of the yaw angle exhibits a peak.

Herein, when making a comparison in terms of the occupied area (R/B=3.5 through 8.0) of the magnetic disk 20, it can be apparently understood that the variation in the yaw angle is smaller in the case where the arm length A is larger than the center-to-center distance B than in the case where the arm length A is shorter than the center-to-center distance B. In particular, a preferable range is 1.0≦A/B≦1.2.

FIG. 18A is an example where the center-to-center distance B is decreased to equalize the arm length A to the center-to-center distance B. With this setting, as illustrated in FIG. 18B, the yaw angle variation width is reduced down to 13°. In this example, the length of the arm 33 is not changed, and hence there is an advantage in which an access time can be prevented from being elongated due to an increment in inertia of the arm 33. It is, however, required that the diameter of the magnetic disk 20 be small or some portion of the shaft 31 be notched enough to prevent a collision of the shaft 31 of the actuator 32 with the magnetic disk 20.

FIG. 19A shows an example where the arm 33 is elongated to equalize the arm length A to the center-to-center distance B. With this setting, as illustrated in FIG. 19B, the yaw angle variation width is reduced down to 11.5°. Further, since the arm 33 is elongated, the access time increases. However, the diameter of the shaft 31 of the rotary actuator 32 can be taken large, and, therefore, a strength of the actuator 32 can be enhanced.

Moreover, as depicted in FIG. 21, the spring arm 34 is attached at a slant to the inner side of the magnetic disk 20 with respect to the arm 33. A mounting angle thereof is 1°. With this arrangement, as shown in FIG. 21, the yaw angle absolute value itself can be reduced. In this example, as shown in FIG. 19B, the maximum of the yaw angle absolute value can be decreased as small as 13°. Contrastingly, referring to FIG. 18B, the maximum of the yaw angle absolute value is 25°.

Thus, by reducing the absolute value of the yaw angle, the slider of the magnetic head 30 is oriented in the rotating direction of the magnetic disk 20 all the more. For this reason, a decline of a floating characteristic of the slider of the magnetic head 30 can be prevented.

FIG. 20A shows an example where the arm length A is further increased to minimize the yaw angle variation width. Namely, this is the example where A/B is set to 1.12. With this setting, as illustrated in FIG. 20B, the yaw angle variation width is reduced down to 2°. In this example, as in the same way with the example of FIG. 19A, the spring arm 34 is mounted at a slant to the inner side. The mounting angle thereof is 30°. With this arrangement, as shown in FIG. 20B, the absolute value of the yaw angle is approximately 1°.

Thus, the arm length A is the center-to-center distance B or larger, and hence the yaw angle variation width of the magnetic head 30 can be reduced. Accordingly, the reading process can be well done by the MR head in any cylinder position of the magnetic disk 20. Besides, a simple mechanism is actualized.

Also, as the spring arm 34 is mounted on the inner side, the absolute value of the yaw angle can be decreased. Hence, as stated earlier, even when the arm length A is not smaller than the center-to-center distance B, it is possible to prevent the decline in terms of the floating characteristic of the magnetic head 30.

Figure 22A:
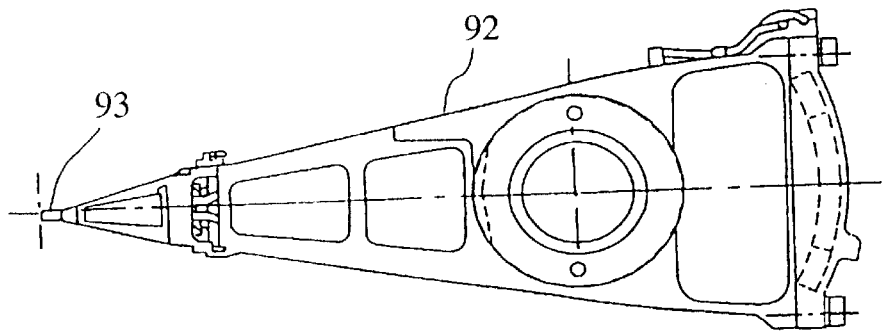
FIG. 22A is a top view illustrating the actuator in a comparative example.
Figure 22B:
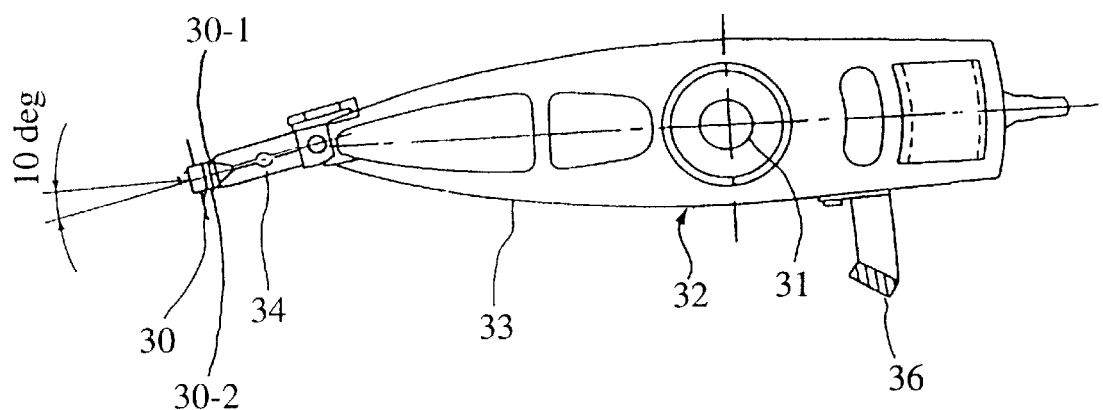
FIG. 22B is a top view showing the actuator in one embodiment of the present invention.
Figure 24:
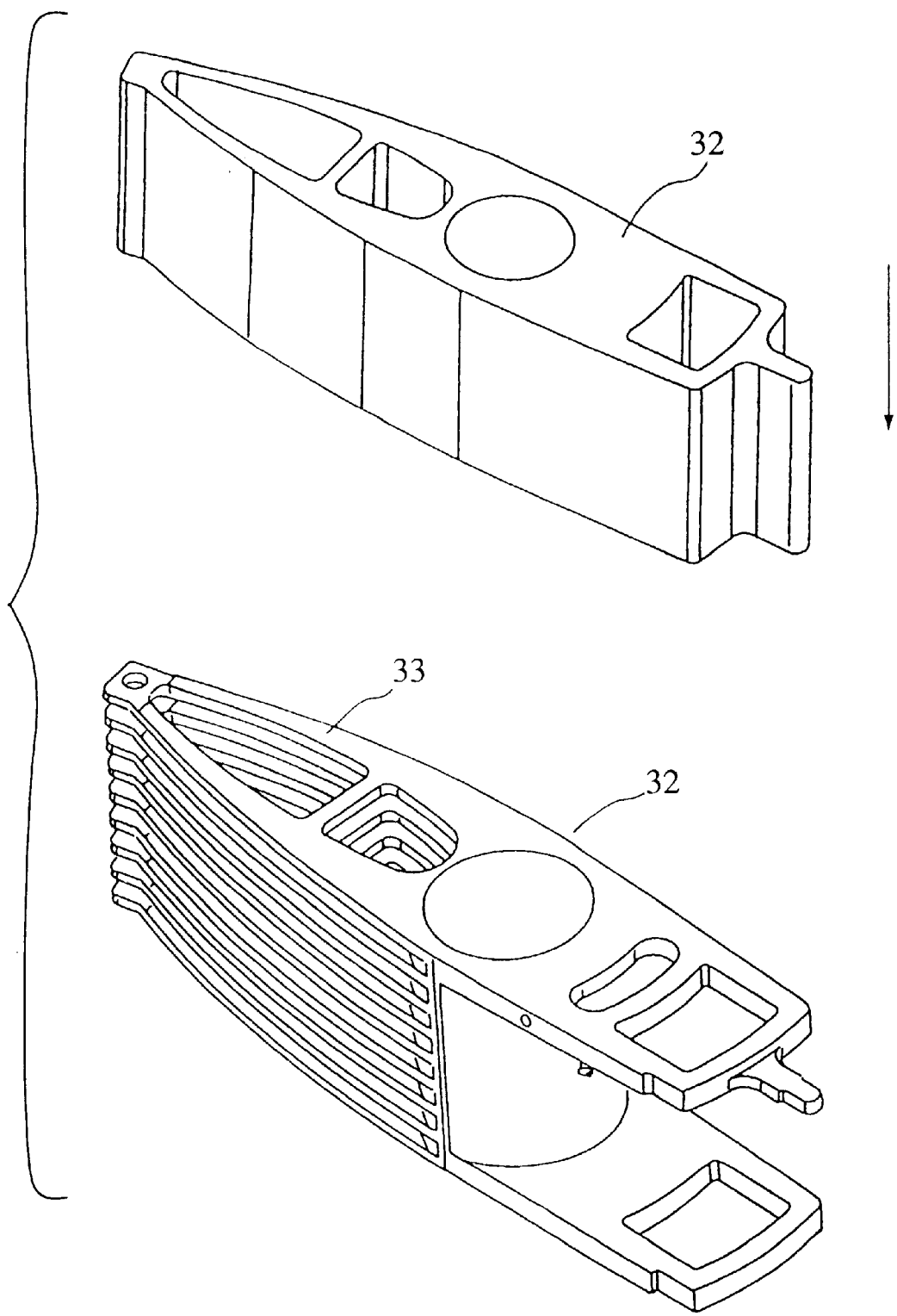
FIG. 24 is an explanatory view showing how the actuator of FIG. 22B is manufactured.
Figure 25:
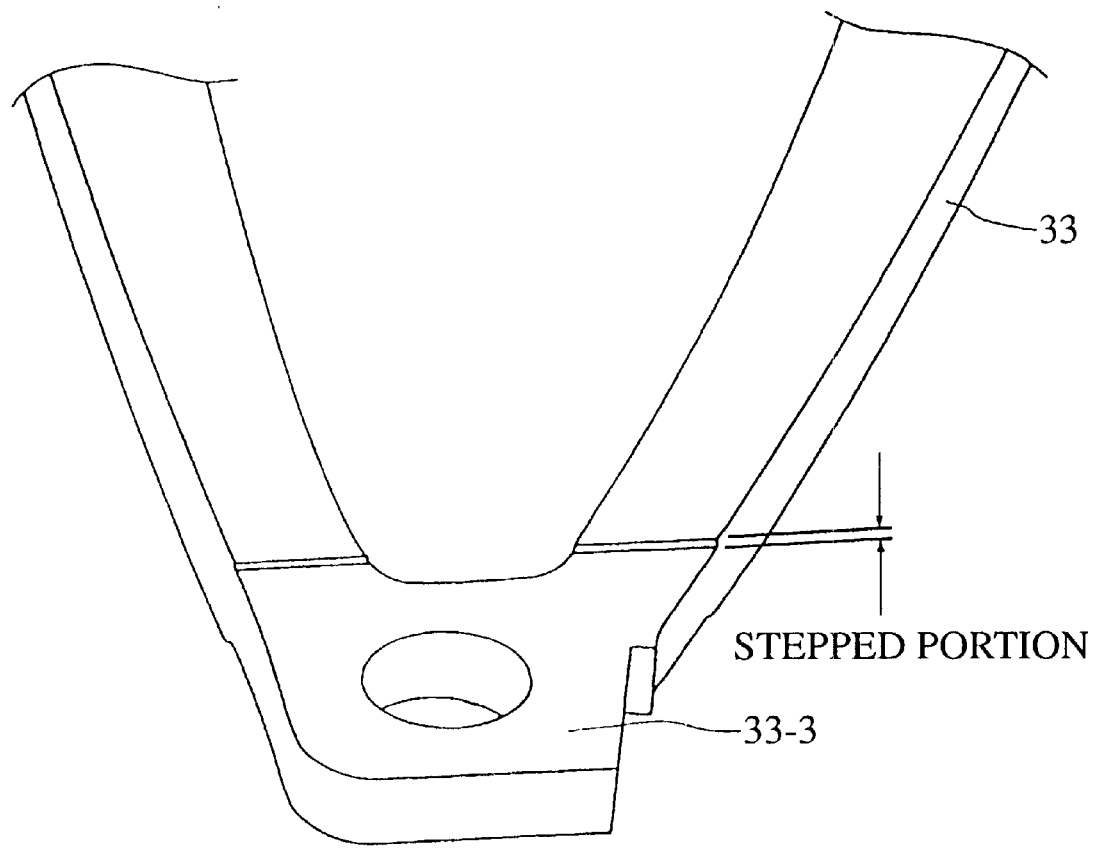
FIG. 25 is an enlarged view of a front end of the actuator of FIG. 22B.
Figure 26A:
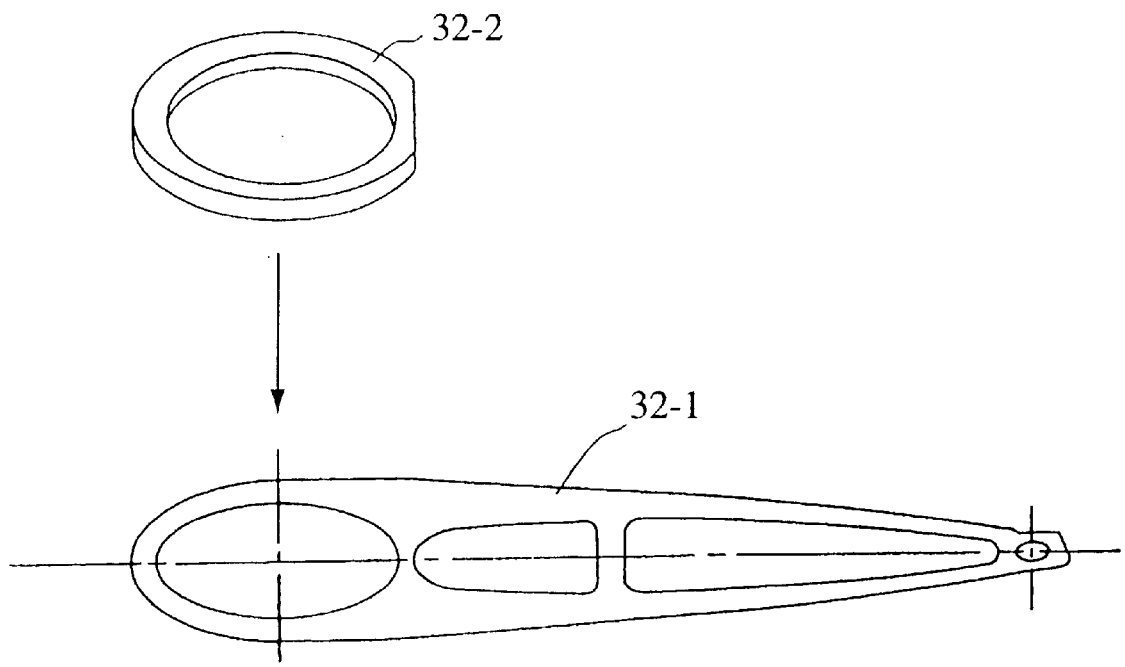
FIGS. 26A and 26B are explanatory views of another example showing how the actuator of FIG. 22B is manufactured.
Figure 26B:
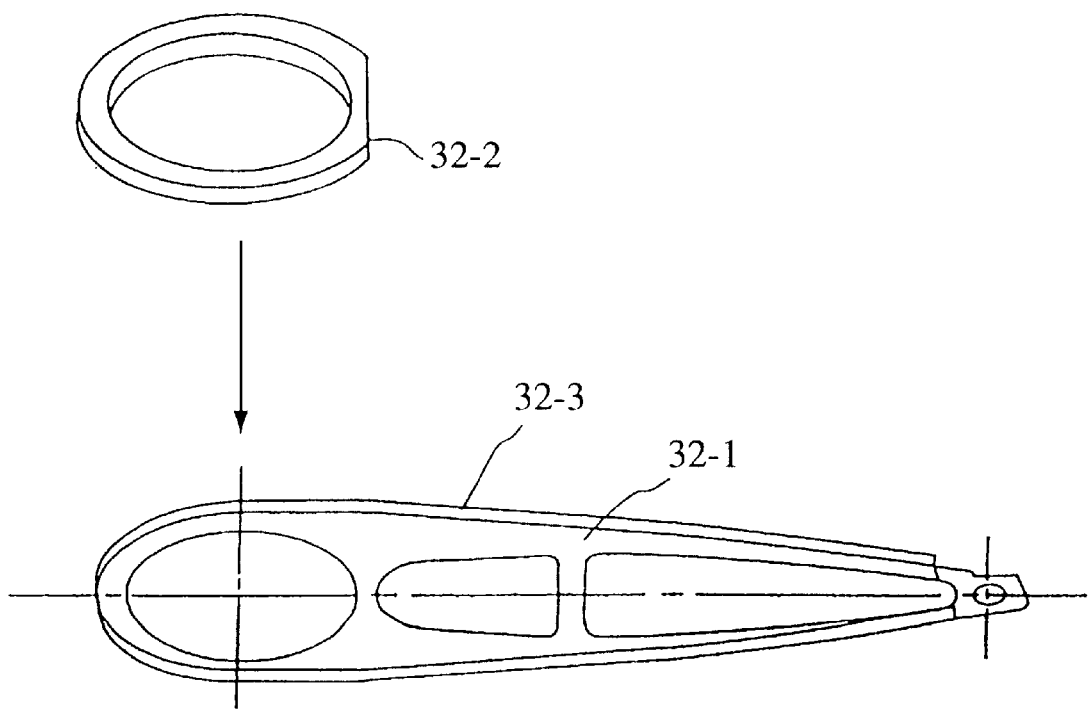

FIGS. 22A and 22B are explanatory views of the actuator according to this invention. FIGS. 23A and 23B are views illustrating a configuration of the actuator of FIG. 22B. FIG. 24 is an explanatory view showing how the actuator of FIG. 22B is manufactured. FIG. 25 is an enlarged view showing a stepped portion of the actuator of FIG. 22B. FIGS. 26A and 26B are explanatory views showing another method of manufacturing the actuator.

FIG. 22A is a view illustrating a conventional actuator by way of a comparative example. A conventional actuator 92 takes a substantially triangular shape. As discussed above, if the arm is elongated to reduce the yaw angle variation and such a shape is taken, vibrations in up-and-down directions become large. For preventing this, if a thickness of the arm of the actuator 92 is increased, there decreases the number of the magnetic disks that can be housed in the magnetic disk drive 1.

For this reason, even if the arm is thinned but elongated, a head arm configuration highly resistible to the vibrations is needed. As shown in FIGS. 22B and 23A, the side surface of the arm 33 assumes such a configuration as to approximate a convex curve. This convex curve is a combination of a plurality of straight lines and curves.

When constructed in this manner, it is possible to reduce a mass of an arm front end 33-2 which largely influences the moment of inertia of the actuator 32 and enhance the rigidity of a root 33-1 of the arm 33. Accordingly, a natural oscillation frequency in a seek direction and up-and-down directions can be increased, considering the fact that the arm 33 is thin.

Further, as shown in FIG. 23A, a rib width a of the arm front end 33-2 is set to ⅓ or smaller of a rib width b of the arm root 33-1. In this example, the rib width a is set to ¼ of the rib width b. The configuration of this rib is determined to substantially uniformize bending stresses produced on the respective sections of the rib extending toward the magnetic head from the center of rotation of the actuator 32. Thus, when in an acceleration and deceleration of the seek, the bending stresses caused by body forces of the head, the suspension and the arm themselves become uniform, and, it is therefore possible to prevent an excessive force from acting on some portion of the arm.

Further, as illustrated in FIG. 23B, the arm thickness t is set equal to or smaller than ¹⁄₄₀ of the distance A from the magnetic head 30 to the center of rotation of the actuator 32. In this example, the arm thickness t is set to approximately ¹⁄₅₀. With this setting, an interval between the magnetic disks can be reduced.

As shown in FIGS. 23B and 25, the front end 33-2 of this arm 33 is formed with a mounting surface 33-3 for the suspension 34. This mounting surface 33-3 has a stepped portion in continuation from the arm 33. If configurated in this manner, the mounting and positioning processes of the suspension 34 are facilitated, and, at the same time, a weight of the front end of the arm 33 can be lightened. This suspension 34 is, as explained in FIGS. 19A and 20A, tilted at 10 degrees to the arm 33.

Next, a method of manufacturing the actuator will be explained. As shown in FIG. 24, the actuator 32 is formed by extruding aluminum, as indicated by an arrowhead in the Figure, along a direction of the rotary shaft of the actuator. Then, the actuator 32 is manufactured by removing the arm 33 and a magnetic circuit portion by a cutting work.

This method exhibits a higher density than by the die-cast molding method and is therefore hard to form a mold cavity. Also, this method provides a high ductility and, hence, a fixation of the suspension 34 by caulking to the head mounting surface 33-3 is easy to perform. Besides, the caulked portion can be decreased in weight.

As a method other than this method, as illustrated in FIG. 26A, a press molding arm 32-1 is molded by a press from a plate or a laminated damping steel sheet. Then, a spacer 32-2 is provided at the rotary shaft portion, whereby the formation can be obtained. Referring to FIG. 26B, the above-mentioned press molding arm 32-1 is formed with a side surface 32-3. If formed in this way, the bending strength is further enhanced.

Thus, the arm takes a shape of the convex curve, thereby lightening the weight of the arm front end and, at the same time, making it possible to strengthen the arm root. For this reason, even when the arm length is increased, the vibrations can be prevented.

Figure 27:
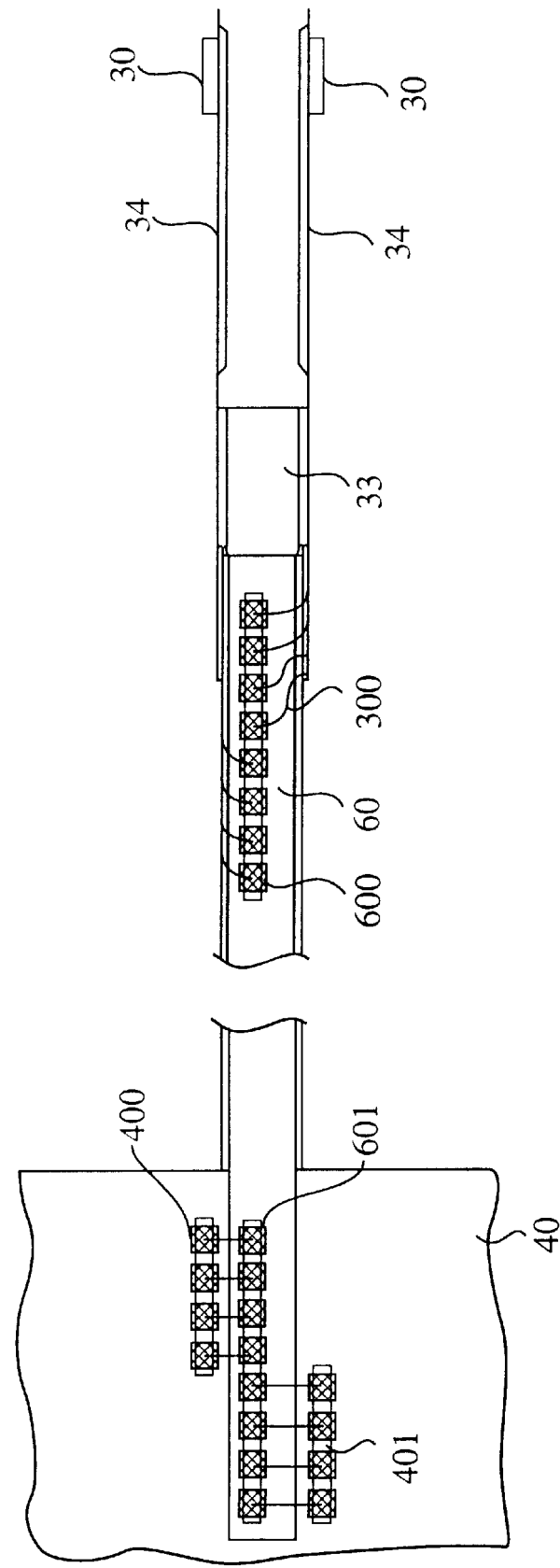
FIG. 27 is a view illustrating a structure of a relay FPC for the actuator of FIG. 22B.
Figure 28:
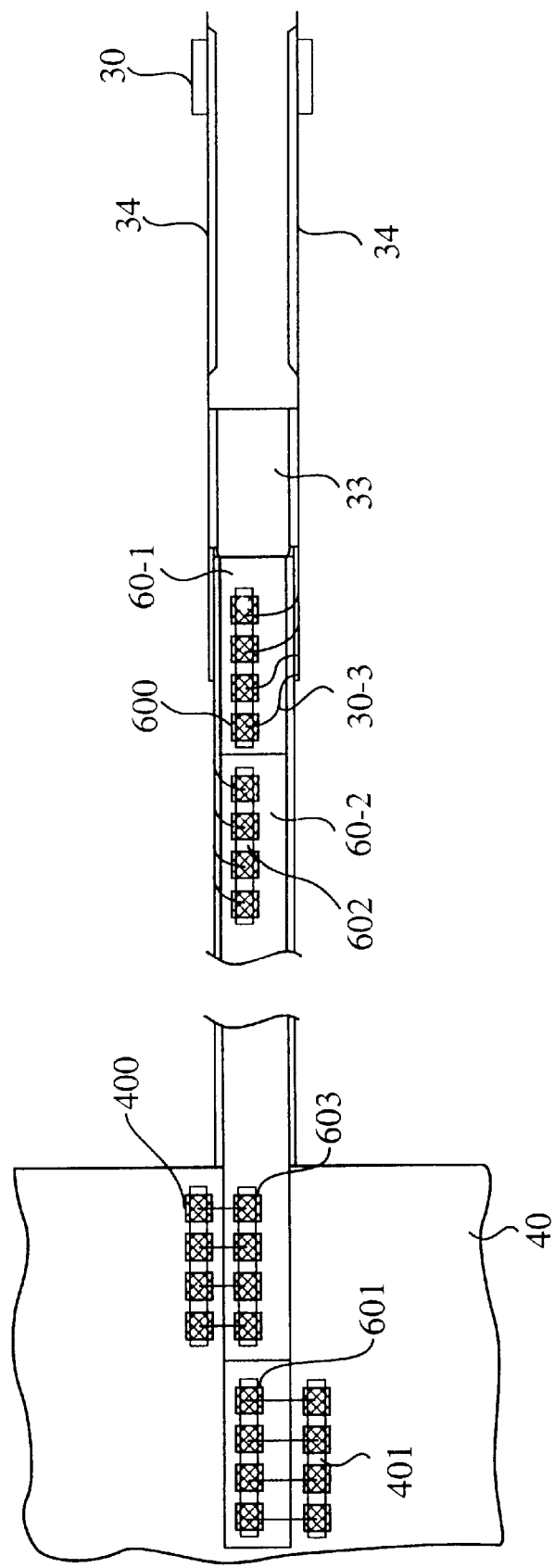
FIG. 28 is a view illustrating another example of the structure of the relay FPC of FIG. 27.
Figure 29A:
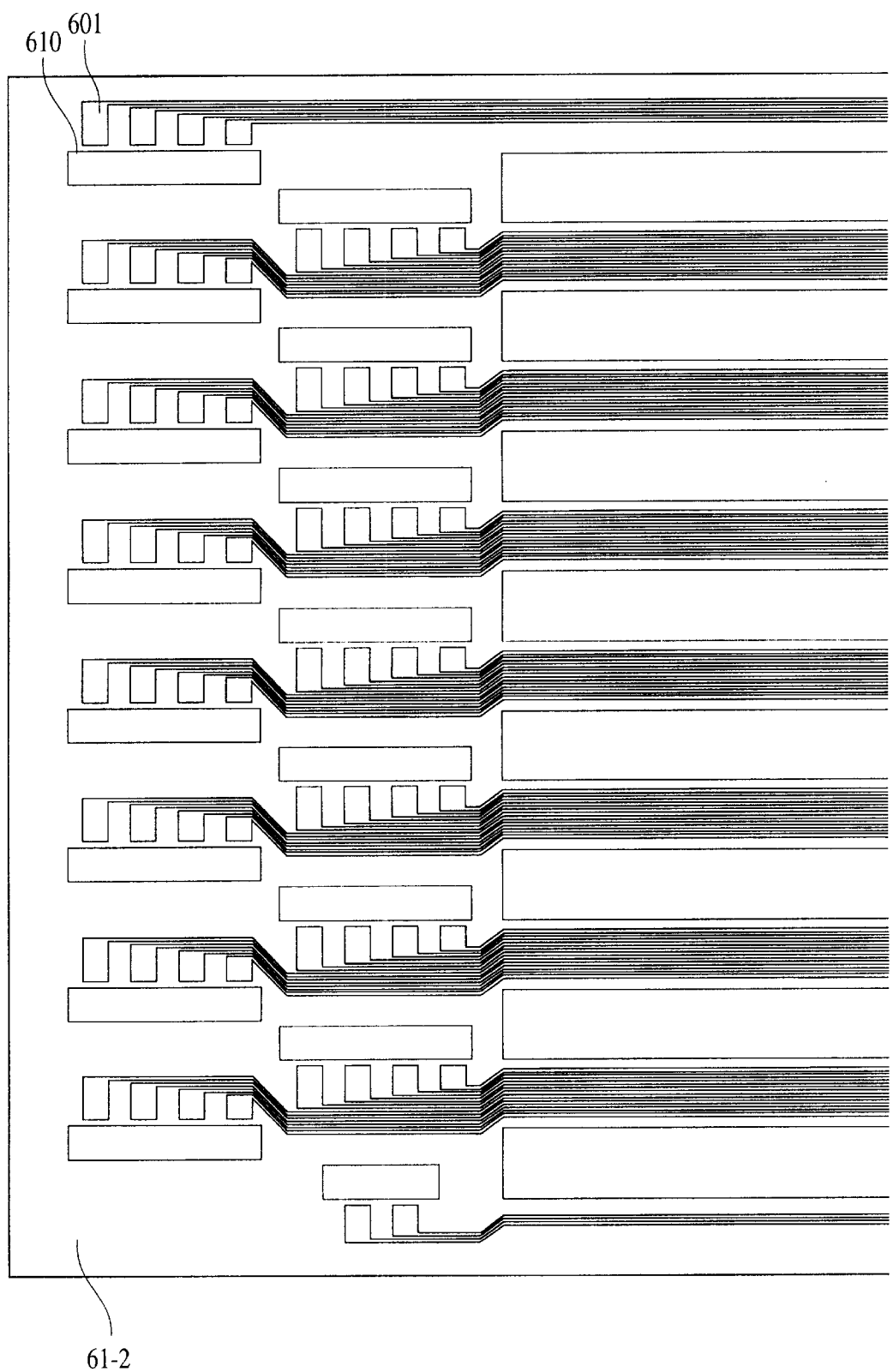
FIG. 29A is a view showing a left half of an FPC substrate for the relay FPC of FIG. 27.
Figure 29B:
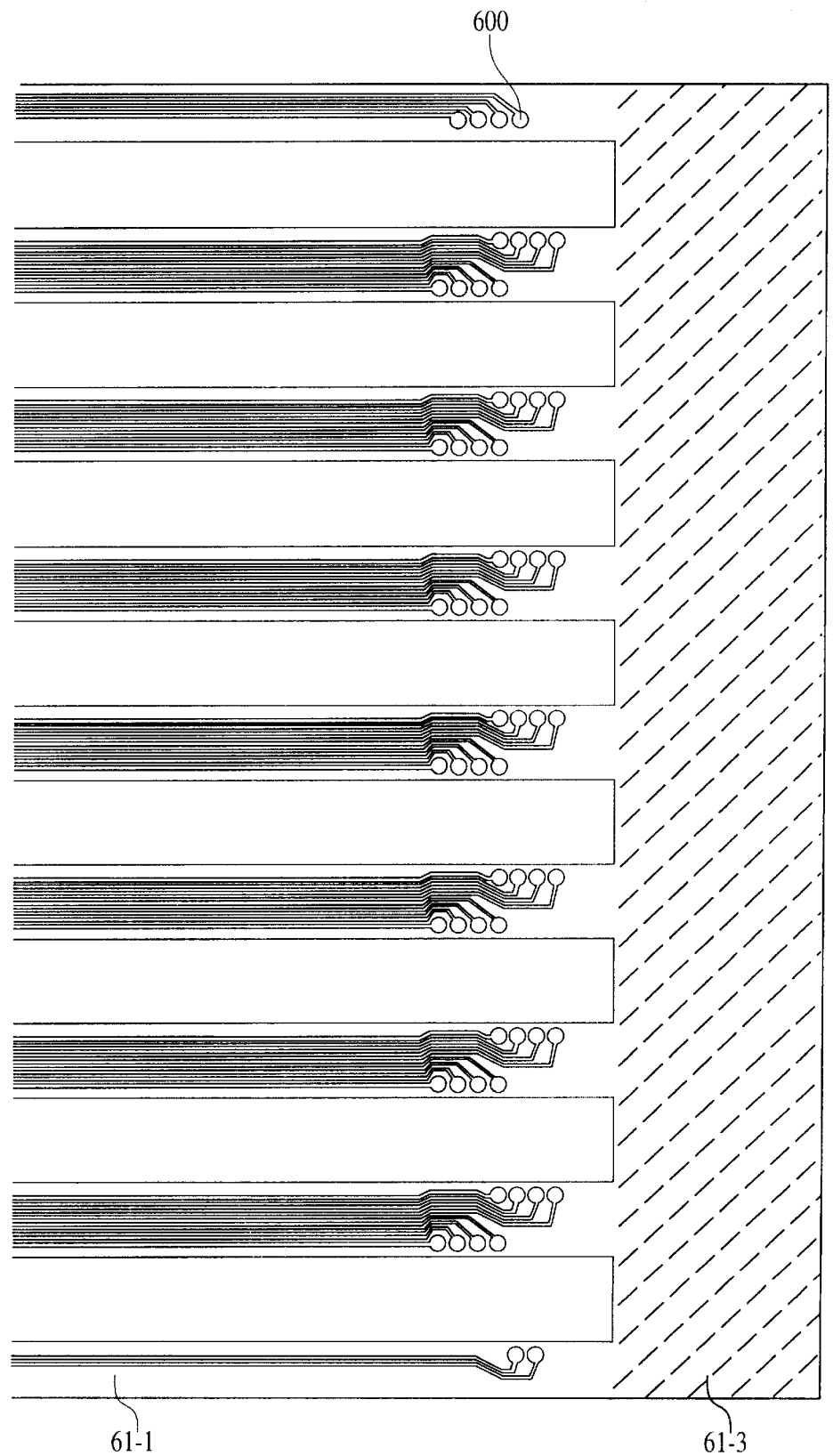
FIG. 29B is a view illustrating a right half of the FPC substrate for the relay FPC of FIG. 27.
Figure 30:
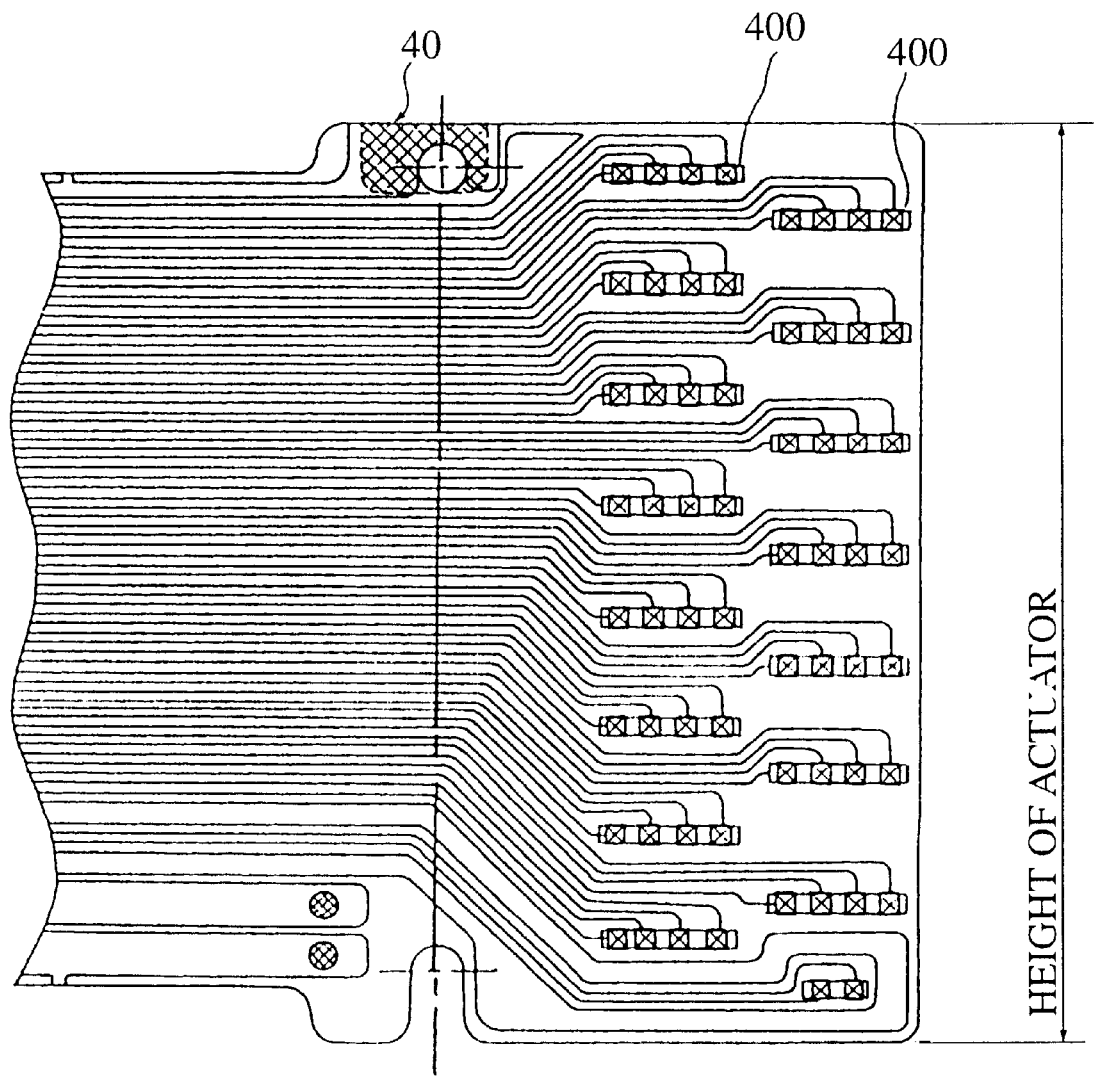
FIG. 30 is an enlarged view showing an end portion of a main FPC for the relay FPC of FIG. 27.

FIG. 27 is a view illustrating a construction of a relay FPC according to this invention. FIG. 28 is a view illustrating another example of the construction of the relay FPC according to this invention. FIG. 29A is a view showing a left half of a relay FPC substrate. FIG. 29B is a view showing a right half of the relay FPC substrate. FIG. 30 is an enlarged view of an end portion of a main FPC. FIGS. 31A through 34B are views showing a relay FPC mounting process involving the use of the relay FPC substrate of FIGS. 29A and 29B.

Referring to FIG. 27, a relay FPC (Flexible Print Cable) 60 is provided on the side surface of the arm 33. This relay FPC 60 includes a first land group 600 at the end portion, on the side of the head, of the front end thereof and a second land group 601 at the end portion, on the side of the main FPC, of the rear end thereof. The first land group 600 and the second land group 601 are connected to each other via an unillustrated lead pattern within the relay FPC 60.

The relay FPC 60 is fixed to the side surface of the arm 33 and to the main FPC 40 shown in FIGS. 3 and 5 through a double-coated tape. Then, the second land group 601 of the relay FPC 60 is located in positions of land groups 400, 401.

Lead wires 300 led from the magnetic head 30 are bonded to the first land group 600 of the relay FPC 60. On the other hand, the land groups 400, 401 of the main FPC 40 are connected to the second land group 601 by bonding or soldering. Accordingly, the magnetic head 30 is electrically connected to the main FPC 40 via the lead wires 300 and the relay FPC 60.

The reason why the relay FPC 60 is thus provided will be elucidated. According to the conventional connecting structure, the lead wires from the magnetic head 30 crawl along the side surface of the arm 33 and is led to the main FPC 40 provided at the proximal end of the arm 33. Then, the lead wires are bonded to the land groups 400, 401 of the main FPC 40. After this bonding process, the lead wires are fixed to the side surface of the arm 33 by bonding or the like.

Based on this conventional structure, the lead wires from the magnetic head 30 are led to the land groups 400, 401 of the main FPC 40 and therefore elongated. For this reason, the lead wires that are not yet bonded turn out obstacles in the middle of bonding the lead wires, resulting in a deterioration in terms of operability. Further, when the lead wires are bonded en bloc to the arm 33, an elaborate operation is needed so as not to cut off the fine lead wires.

In addition, the leads wires for two pieces of magnetic heads are fixed en bloc to the arm 33. Consequently, one magnetic head may be damaged, and removing this damaged head out of the arm 33 is very time-consuming. Namely, this entails the procedures of temporarily making the lead wires for the two magnetic heads free of bonding, peeling off the lead wires from the arm 33 and removing the damaged magnetic head therefrom. After replacing the damaged magnetic head, the procedures reversal thereto are required. That is, the labor required for the replacement of the single piece of magnetic head is doubled.

This problem becomes more serious when the MR head is employed as a read head. That is, the two lead wires of the inductive head in the prior art are provided. Contrastingly in the MR head, the number of the lead wires is doubled, i.e., amounts to 4, and hence it becomes more difficult to deal with the lead wires than before. Particularly when replacing the magnetic head, the replacement of the single magnetic head involves effecting de-bonding at eight portions, peeling off the eight lengths of bonded lead wires and thereafter performing the replacement thereof. Accordingly, an operating efficiency further worsens.

Besides, as discussed above, the arm 33 has a small rib width but a large length, resulting in a further deteriorated operating efficiency.

In accordance with this embodiment, instead of making the lead wires crawl along the side surface of the arm 33, the relay FPC 60 is provided. With this provision, during the bonding operation, the wire members are easy to deal with. Also, there is no necessity of being cautious about cutting off the lead wires, and, hence, the bonding operation may be improved. Besides, a yield relative to the cut-off of the lead wires is also improved. Moreover, during the replacement of the head, it may be enough to simply effect de-bonding of the lead wires 300 from the relay FPC 60, whereby the head replacing operation can be made more efficient.

FIG. 28 illustrates another embodiment of the relay FPC. A width of the relay FPC has to be equal to or smaller than a width of the arm 33. In the case of applying the relay FPC to the MR head, however, the relay FPC entails eight sets of lead patterns. Accordingly, when trying to making the width of the FPC fall within a range of the width of the arm 33, the lead patterns become quite small in their width. For example, the FPC having a pattern width on the order of 50 $\mu$m is needed. Such a hyperfine pattern FPC is expensive.

In contrast with this, according to an embodiment of FIG. 28, there are laminated two relay FPCs 60-1, 60-2 each having four patterns. More specifically, the second relay FPC 60-2 having the first land group 602 and the second land group 603 is laminated on the first relay FPC 60-1 including the first land group 600 and the second land group 601.

With this arrangement, the pattern width of each of the relay FPCs 60-1, 60-2 may be 100 $\mu$m, and inexpensive FPCs are usable. This relay FPC has one layer of patterns and is therefore inexpensive. Further, even when using a multi-layered FPC, the pattern width can be increased. This FPC is, however, more expensive than the one-layered FPC.

Thus, even when the number of the wires connected increases in the case of employing the MR head, the connection can be done by use of the inexpensive FPC.

Given next is an explanation of a process of attaching the above-stated relay FPC to the actuator 32. Used is a ladder type relay FPC substrate 61 as shown in FIGS. 29A and 29B. Note that FIG. 29A is a view showing a right half of the ladder type relay FPC substrate 61, and FIG. 29B is a view illustrating a left half of the ladder type relay FPC substrate 61.

This substrate 61 includes, as shown in FIG. 29A, a base 61-2 formed with a multiplicity of windows 610 and the second land groups 601 at the left end of the substrate 61. Then, the base 61-2 is provided with a corresponding number of bars 61-1 to the bars 33 while disposed corresponding to the bars 33. Further, as illustrated in FIG. 29B, at the right end of the substrate 61, each of the bars 61-1 is connected to a connecting part 61-3.

That is, this substrate 61 is provided with the plurality of relay FPCs in parallel but assumes the ladder-like configuration in which the portions between arms 33 are punched out.

Also, as depicted in FIG. 30, land groups 400 are arrayed in zigzag at the end portion of the main FPC 40. This land group 400 consists of four lands corresponding to one magnetic head 30. When the land groups 400 are arrayed in zigzag in this way, the land groups 400 each connected to the lead pattern can be accommodated in the main FPC 40 having a width falling within a height of the actuator 32. Therefore, the width of the main FPC 40 is allowed to fall within the height of the actuator 32.

Next, the process of mounting the FPC substrate will be discussed with reference to FIGS. 31A through 34A.

Figure 31A:
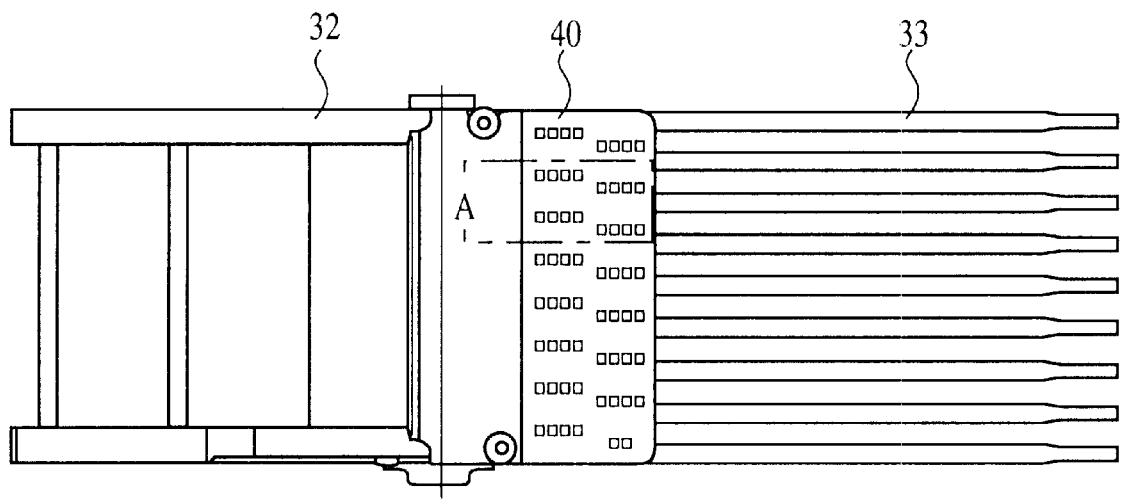
FIGS. 31A and 31B are views showing a process of mounting the FPC substrate (part 1)
Figure 31B:
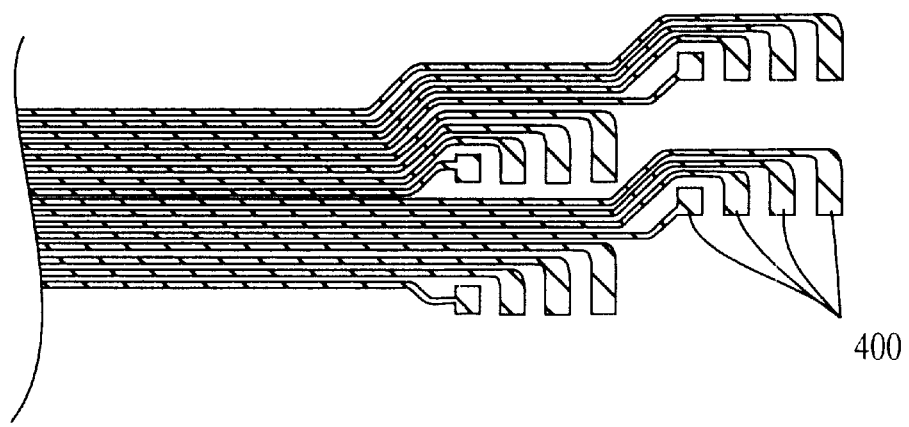

First, as shown in FIG. 31A, the main FPC 40 is fixed to the proximal end of the arm 33 of the actuator 32. As illustrated in an enlarged view of FIG. 31B showing an A-portion of FIG. 31A, the multiplicity of land groups 400 are arranged in zigzag in this main FPC 40.

Figure 32A:
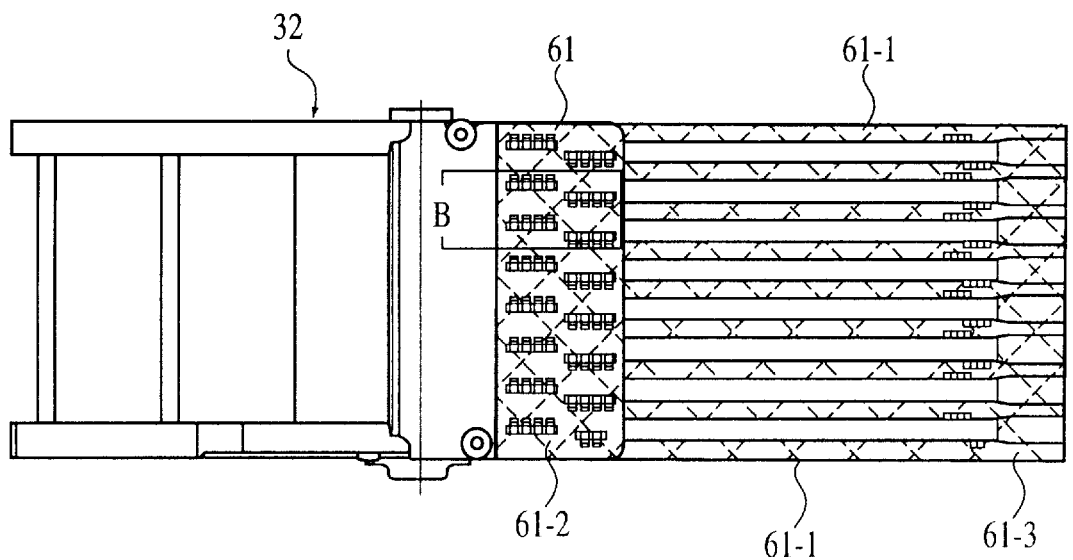
FIGS. 32A and 32B are views showing a process of mounting the FPC substrate (part 2)
Figure 32B:
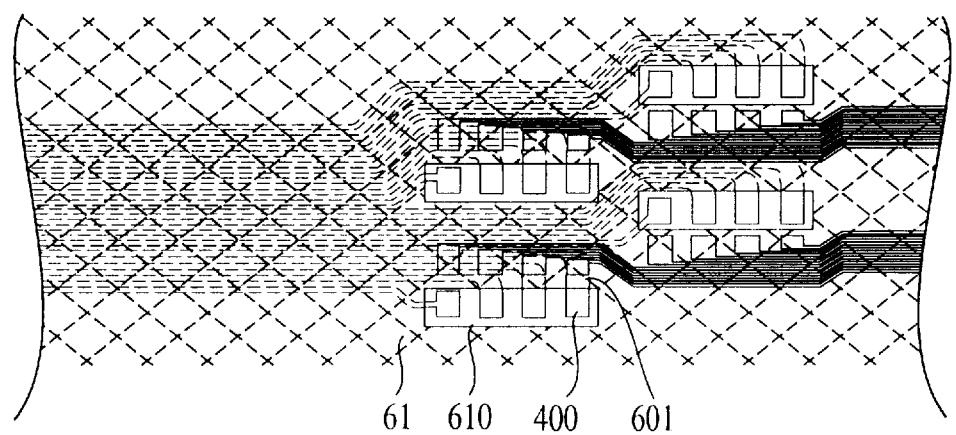

Next, as shown in FIG. 32A, the above-stated FPC substrate 61 is stuck to the main FPC 40 provided at the proximal end of the arm 33 as well as to the arm 33. At this time, as depicted in an enlarged view of FIG. 32B showing a B-portion of FIG. 32A, the lower land group 400 of the main FPC 40 is exposed from a window 610 of the FPC substrate 61. The second land group 601 of the FPC substrate 61 is disposed in face-to-face relationship with this land group 400.

Figure 33A:
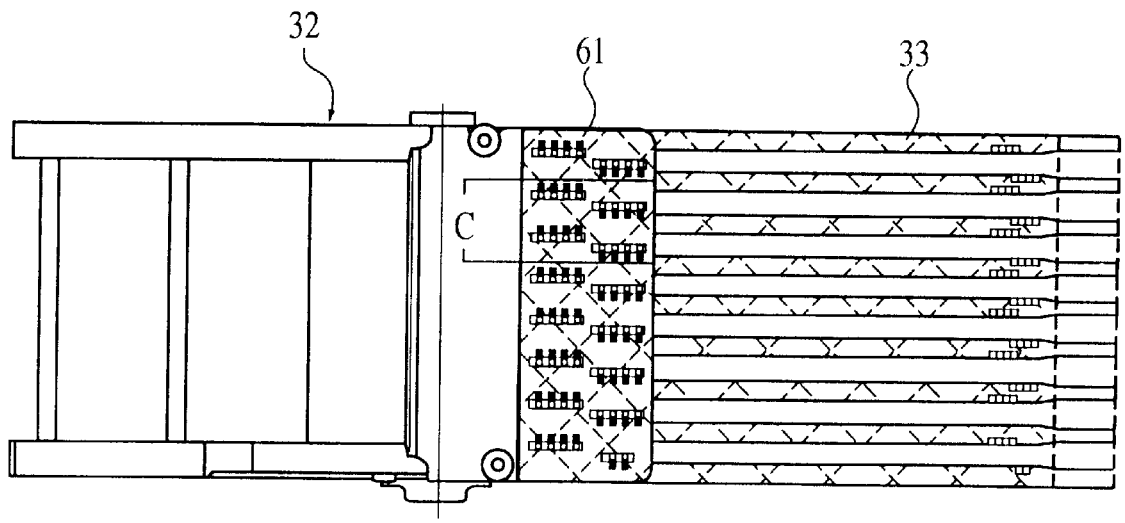
FIGS. 33A and 33B are views showing a process of mounting the FPC substrate (part 3)
Figure 33B:
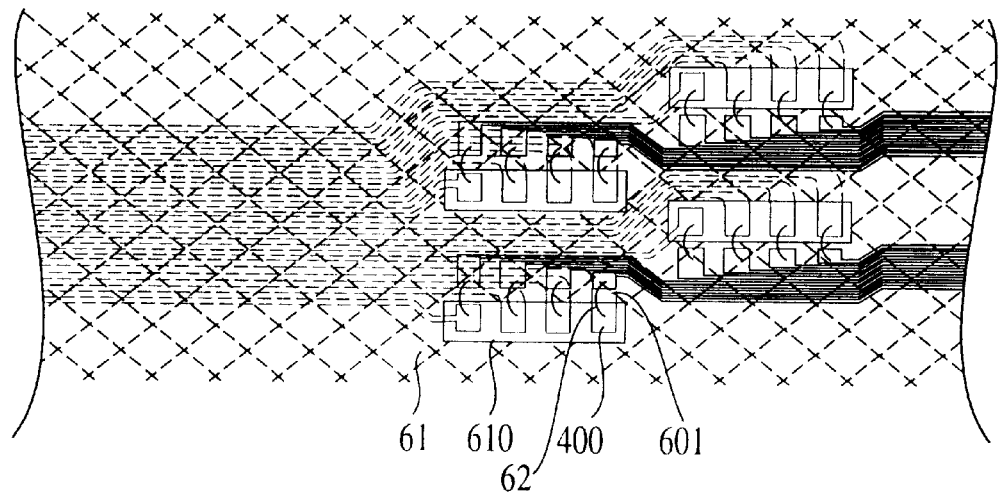

Next, as shown in FIG. 33A, the connecting parts 61-3 of the FPC substrate 61 are cut off. Then, as depicted in an enlarged view of FIG. 33B showing a C-portion of FIG. 33A, the land group 400, exposed from the window 610 of the FPC substrate 61, of the main FPC 40 is bonded to the second land group 601 of the FPC substrate 61 through a bonding wire 62.

Figure 34A:
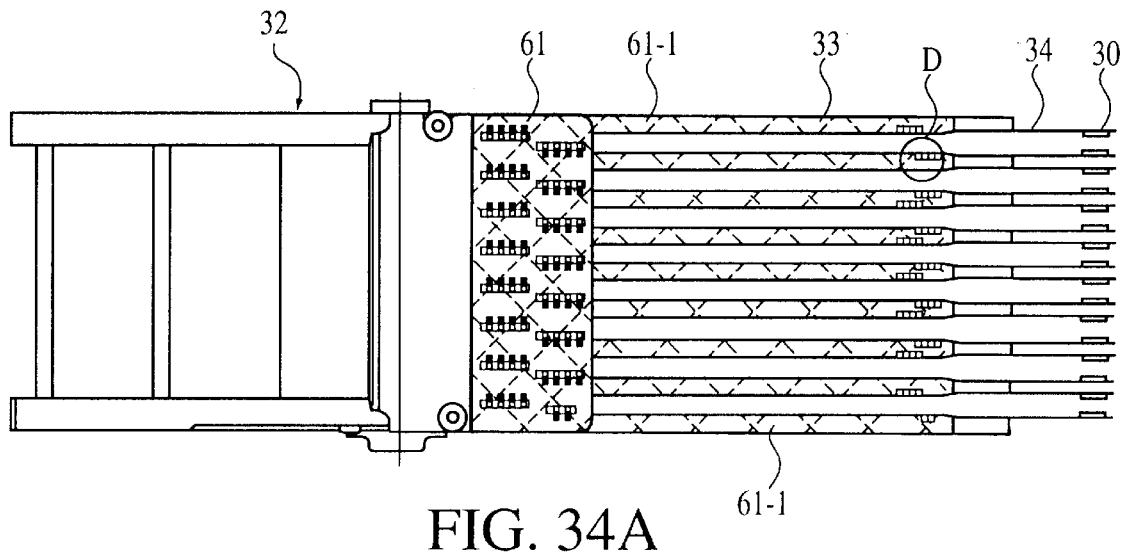
FIGS. 34A and 34B are views showing a process of mounting the FPC substrate (part 4)
Figure 34B:
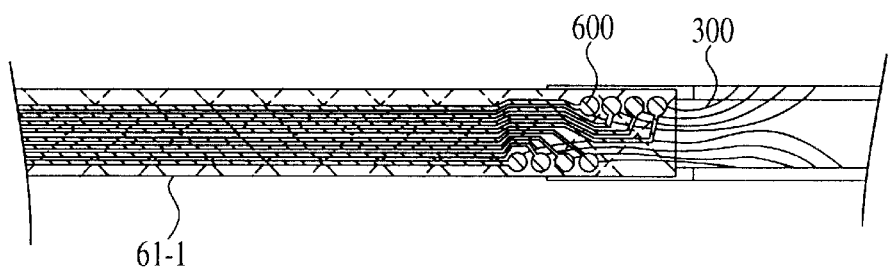

Further, as shown in FIG. 34A, the suspension 34 fitted with the magnetic head 30 is secured to the front end of the arm 33. Subsequently, as illustrated in an enlarged view of FIG. 34B showing a D-portion of FIG. 34A, the lead wires 300 of the magnetic head 30 are bonded to the first land groups 600 of the respective bars 61-1 of the FPC substrate 61.

If structured in this manner, the fitting operation can be facilitated by dealing with the relatively large FPC substrate 61. Accordingly, even when the arm width is 2 mm, the relay FPC 60 can be easily attached.

Figure 35:
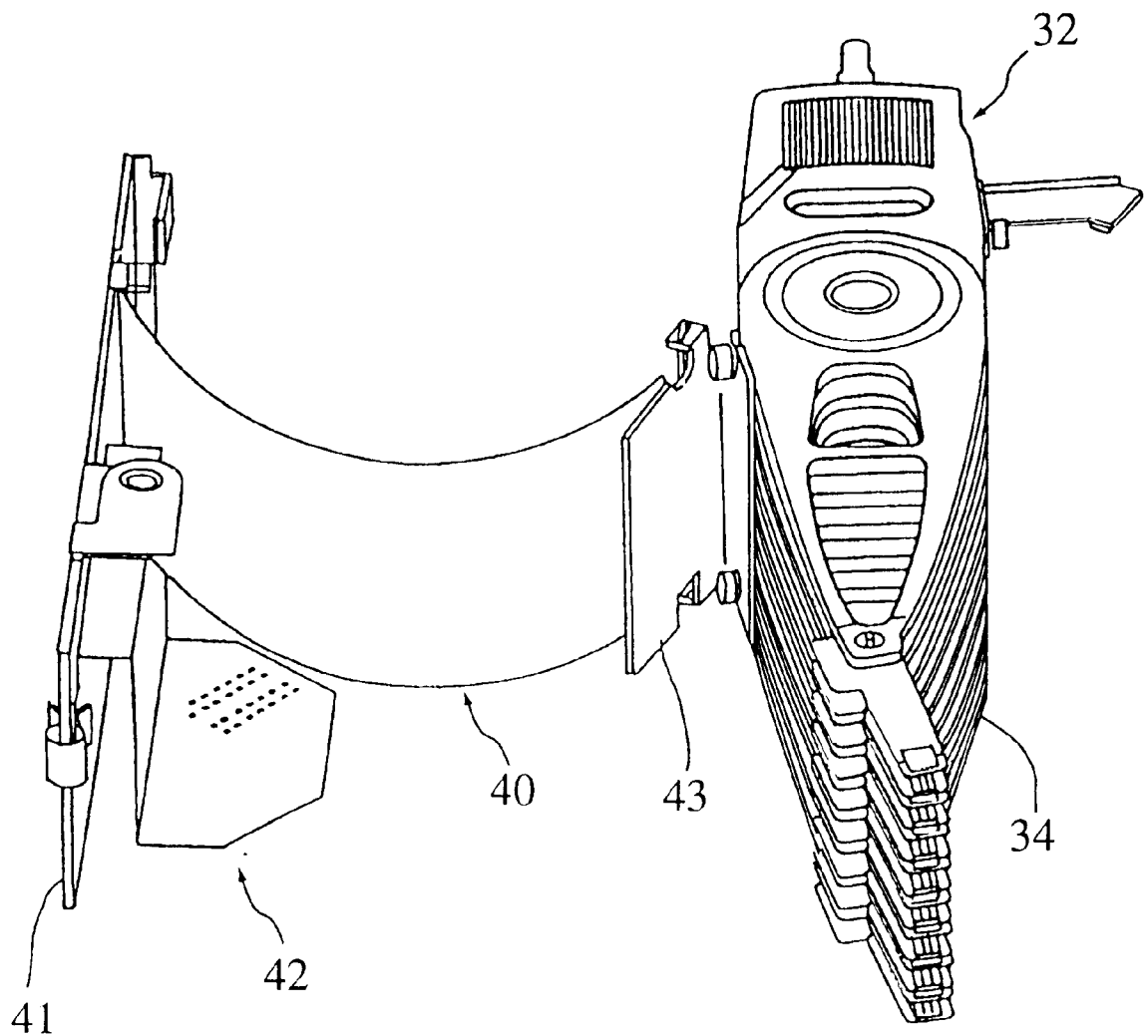
FIG. 35 is a front view of a retractor mechanism of FIG. 3.
Figure 36:
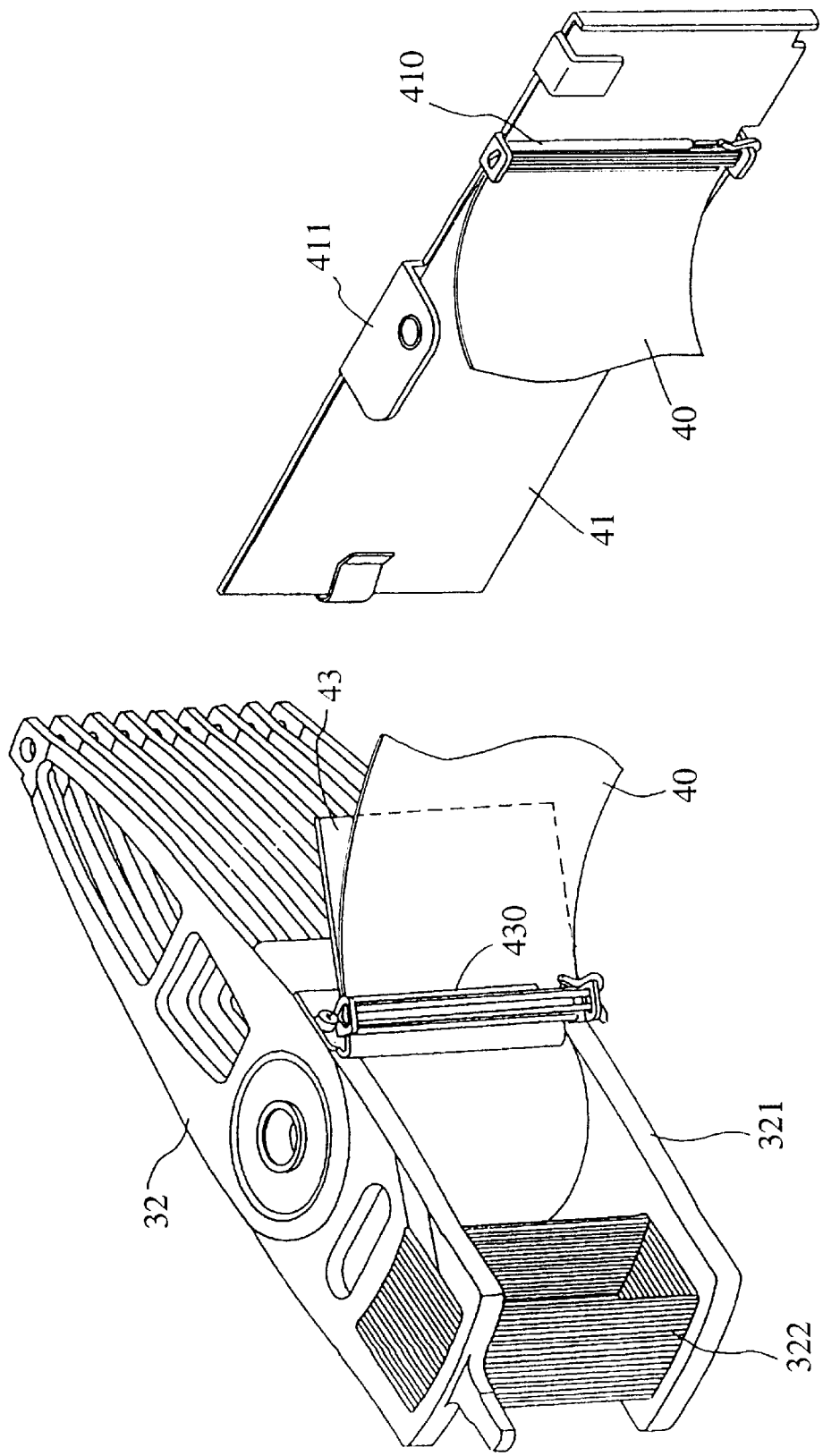
FIG. 36 is a fragmentary view of the retractor mechanism of FIG. 35.
Figure 37:
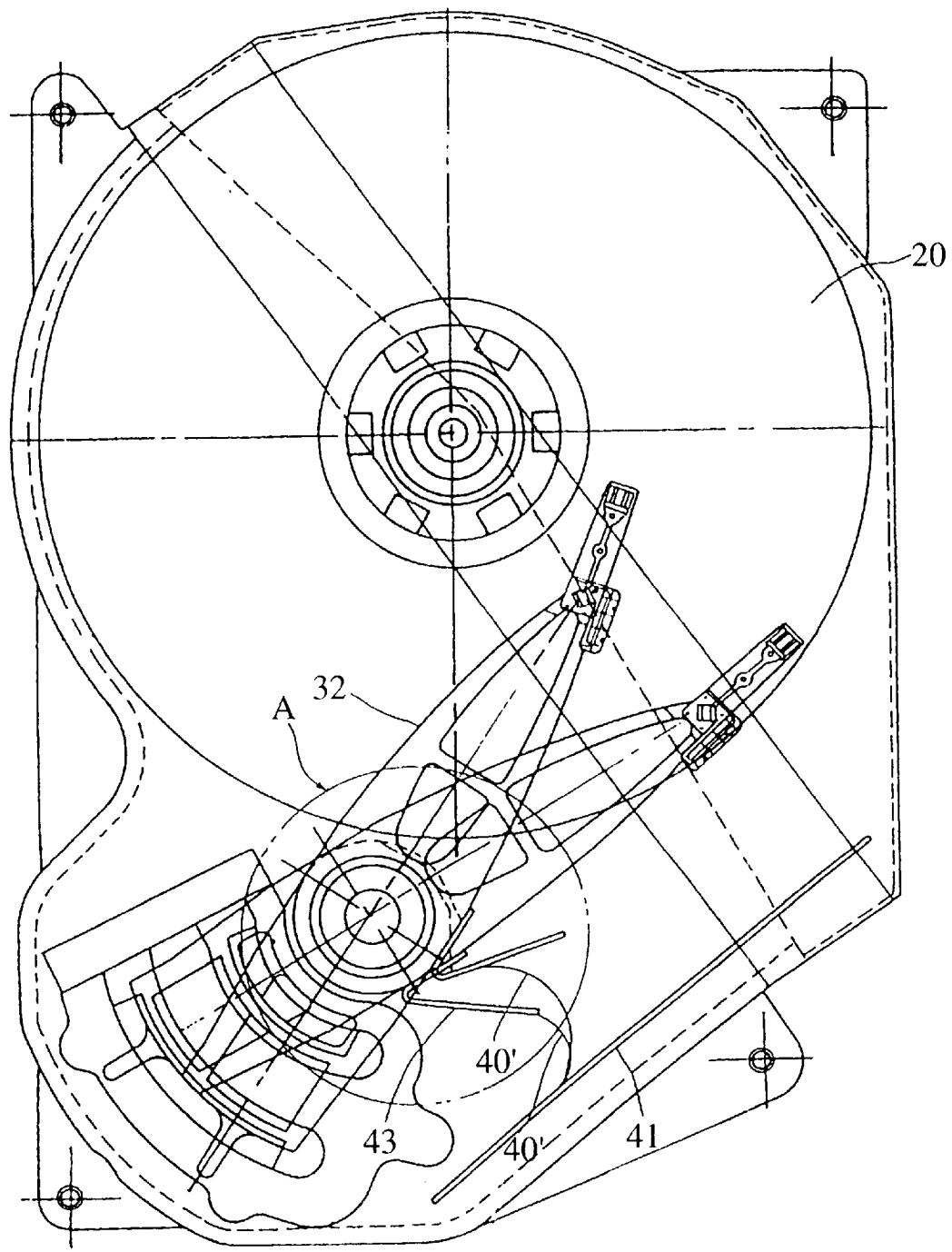
FIG. 37 is a view of assistance in explaining an operation of the retractor mechanism of FIG. 35.
Figure 38A:
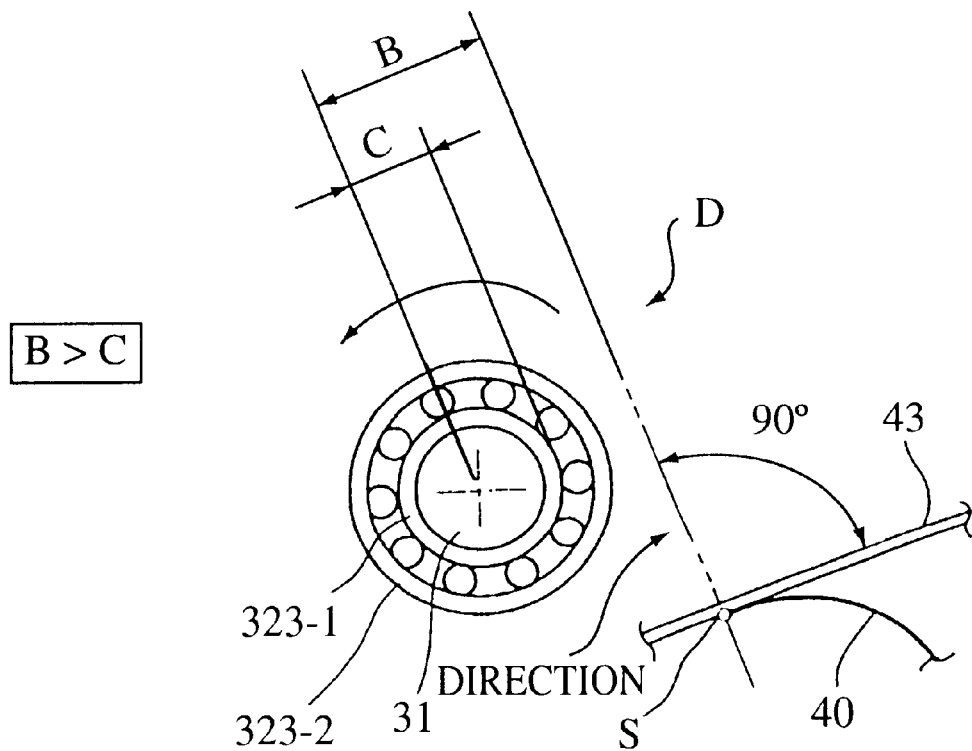
FIG. 38A is an enlarged view showing an A-portion of FIG. 37.
Figure 38B:
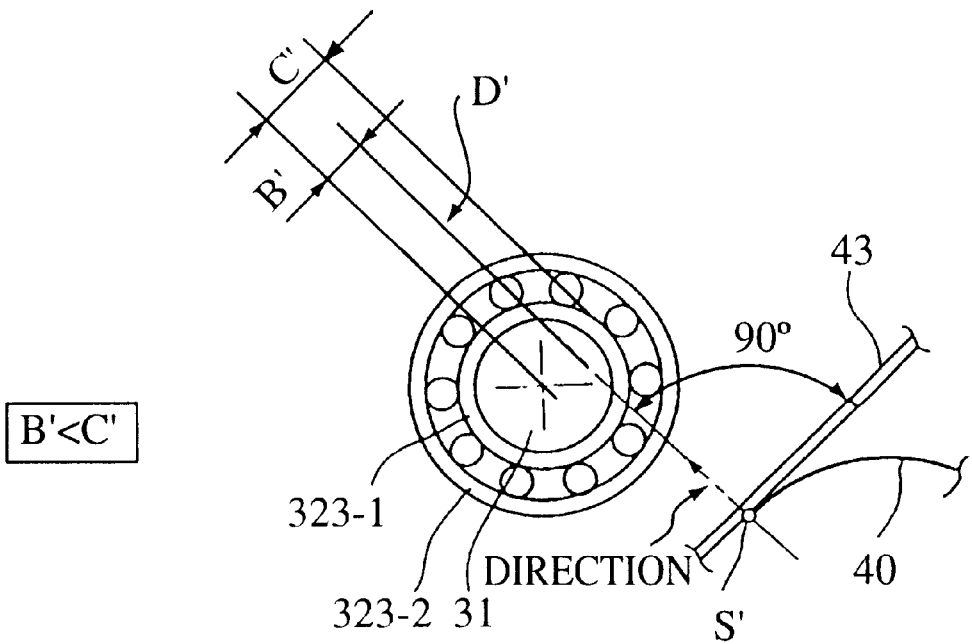
FIG. 38B is a view showing a comparative example of FIG. 38A.

FIG. 35 is a front view illustrating a retractor mechanism. FIG. 36 is a fragmentary view of the retractor mechanism. FIG. 37 is a view of assistance in explaining the operation of the retractor mechanism. FIGS. 38A and 38B are enlarged views each showing an A-portion of FIG. 37.

As shown in FIG. 35, one end of the main FPC 40 is guided by a guide plate 43 and thus secured to the side surface of the actuator 32. On the other hand, the other end of the main FPC 40 is fixed to a cable fixing plate 41. Hence, a bent free member corresponds to a portion between the actuator 32 of the main FPC 40 and the cable fixing plate 41. This main FPC 40 is bent at and fixed to the cable fixing plate 41. The front end of the main FPC 40 is further bent and fixed to an external connector 42.

As depicted in FIG. 36, one end of the main FPC 40 is pressed down to the guide plate 43 by a presser member 430. On the other hand, the other end of the main FPC 40 is also pressed down to the cable fixing plate 41 by a presser member 410.

Accordingly, as shown in FIG. 37, a bending degree of a bending portion 40' of the main FPC 40 changes with a rotation of the actuator 32. Hence, it follows that a bending reaction is given to the actuator 32.

FIG. 38A is an enlarged view of the A-portion of FIG. 37. Referring to FIGS. 38A and 38B, each of S and S' designates a point of force defined as a contact point between the main FPC 40 and the guide plate 43. A position of this contact point is, generally, a pressing position of the presser member 430 down to the guide plate 43. Passing through the position of this contact point, each of directions D and D' perpendicular to the guide plate 43 is defined as a direction of the bending reaction.

As illustrated in FIG. 38B, the point-of-force position S' in the prior art is set in the manner which follows. That is, a distance B' from a line of the direction D' up to the center of the actuator shaft 31 is smaller than a distance C' from the center of the actuator shaft 31 up to an inner ring (fixed ring) of bearing 323. This intends to reduce an influence by the reaction on the seek.

With this arrangement, in the inner position, the force by which the main FPC 40 pushes the actuator 32 toward the inner side is hard to apply. Therefore, in a position exclusive of the innermost position (CSS zone), there is produced a zone (dead zone) where the reaction of the main FPC 40 equilibrates. As a result, the direction of the force is reversed with respect to the seek exceeding the dead zone, which in turn causes such a problem that the seek control becomes intricate.

Under such circumstances, in accordance with this embodiment, as shown in FIG. 38A, the point-of-force position S is set so that the distance B from a line of the direction D up to the center of the actuator shaft 31 is larger than the distance C from the center of the actuator shaft 31 up to the inner ring (fixed ring) 323-1 of the bearing 323.

With this setting, the actuator 32 is easy to rotate on the inner side of the magnetic disk 20 by dint of the reaction of the main FPC 40. Consequently, no dead zone is produced, thereby facilitating the seek control. Note that the numeral 323-2 in the Figures represents an outer ring of the bearing 323.

Next, a structure of the connector will be explained with reference to FIGS. 39A to 41B.

Figure 39:
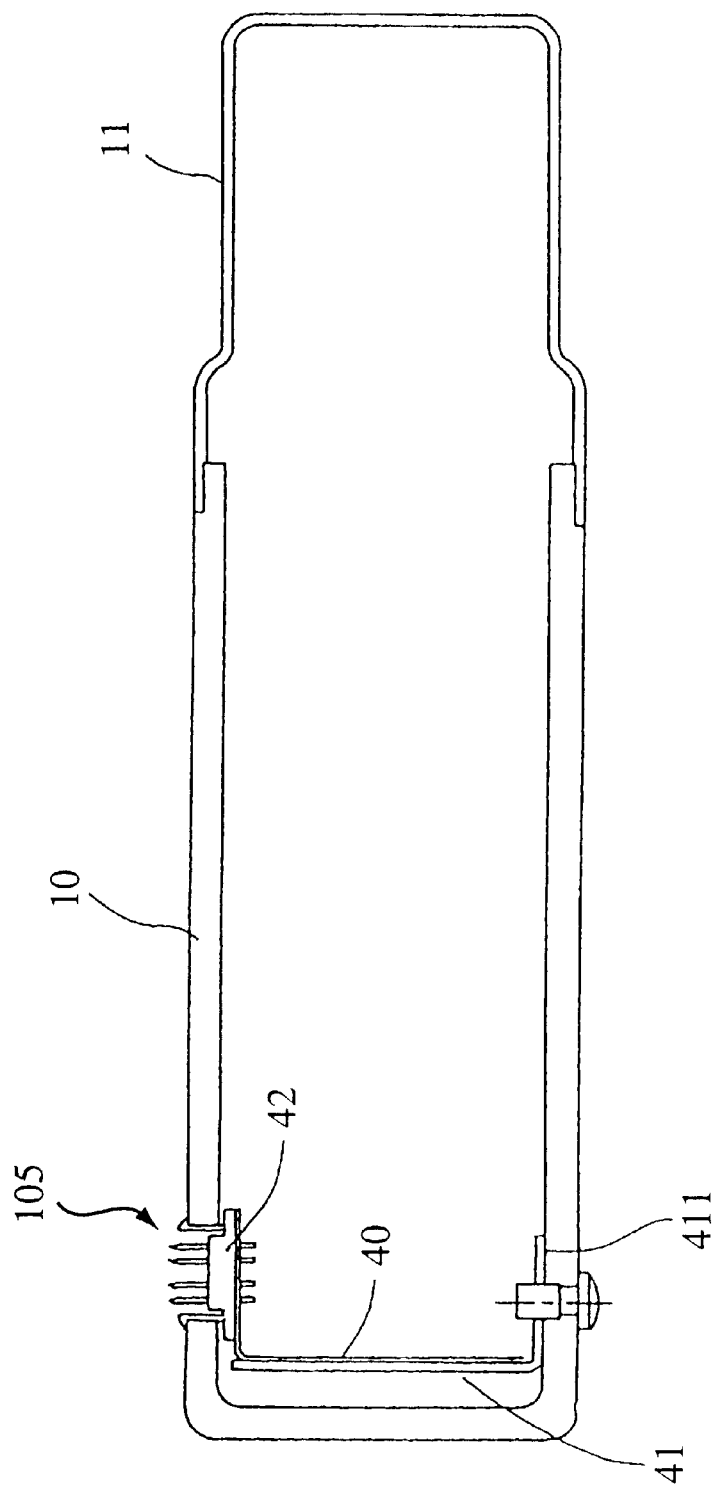
FIG. 39 is an explanatory view of a connector of FIG. 3.
Figure 40A:
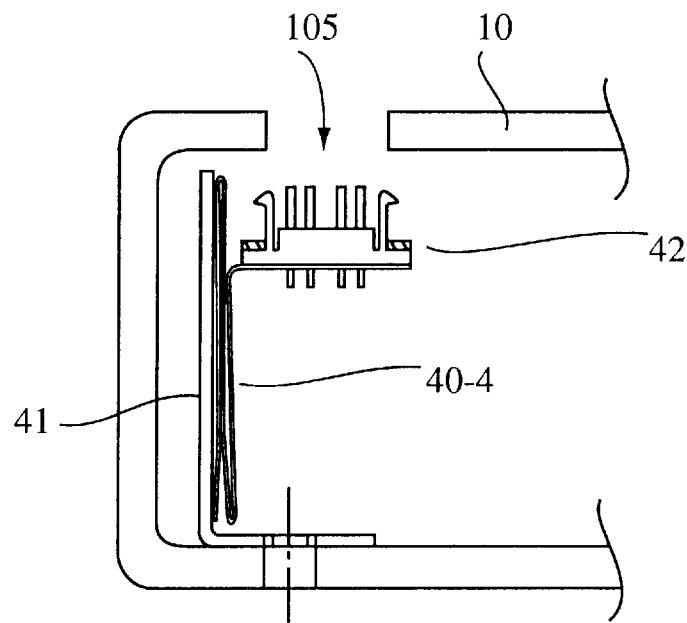
FIGS. 40A and 40B are views of assistance in explaining a connector fixing operation in FIG. 39.
Figure 40B:
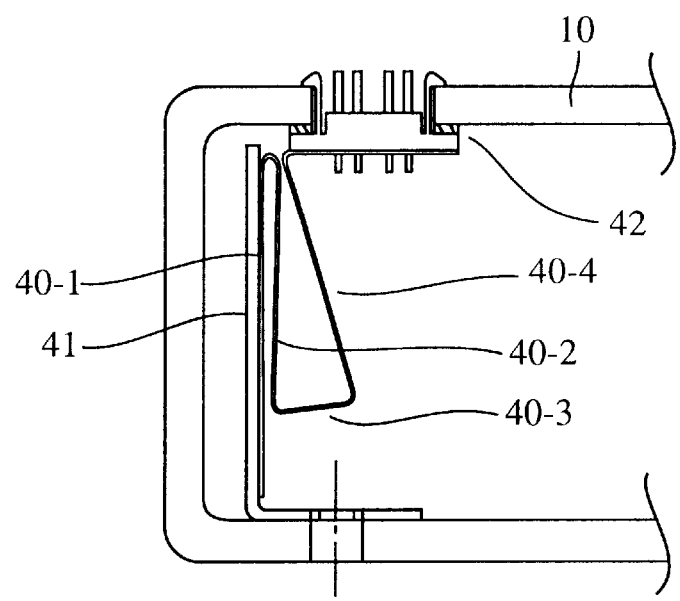
Figure 41A:
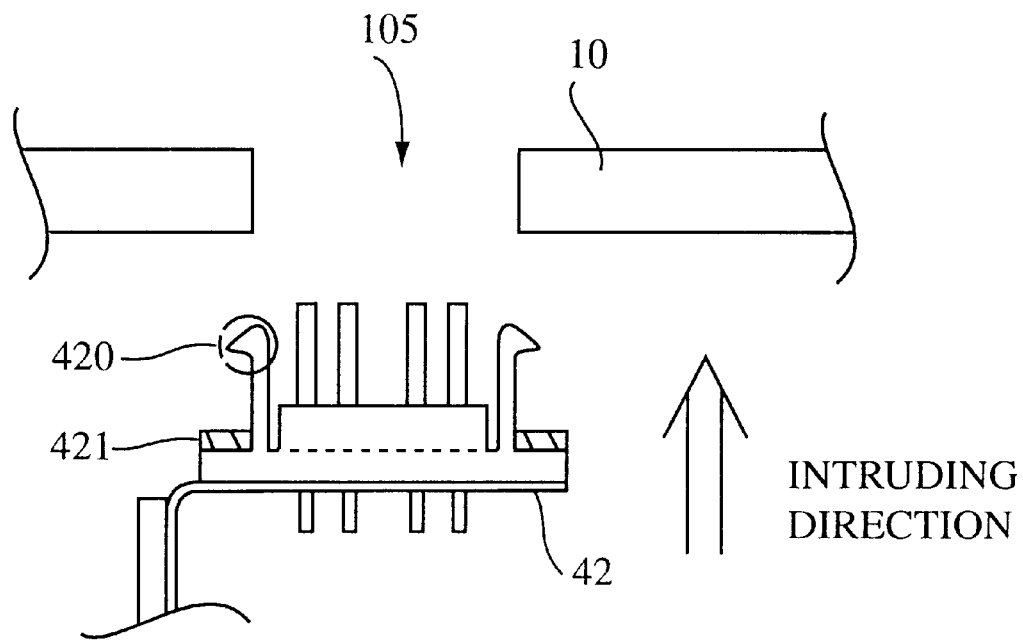
FIGS. 41A and 41B are enlarged views showing the connector fixing operation in FIG. 39.
Figure 41B:
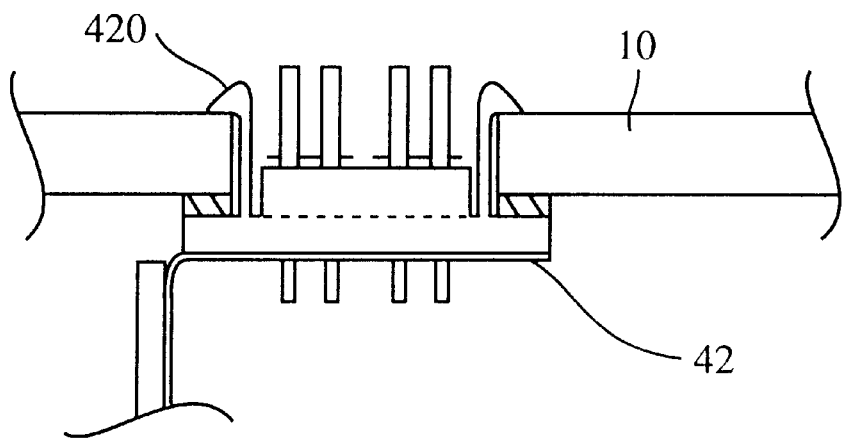

FIG. 39 is an explanatory view of the connector. FIGS. 40A and 40B are views of assistance in explaining a connector fixing operation. FIGS. 41A and 41B are enlarged views of assistance in explaining the connector fixing operation.

As depicted in FIG. 39, a closed type connector is used as a connector 42 for connecting the main printed circuit board 50 (see FIG. 2) to the main FPC 40. The closed type connector 42 has pawls. Then, the connector 42 is intruded into a hole 105 formed in the base 10 from an interior of the base 10 and caught by the pawls, thus fixing the connector 42 to the base 10.

In this case, when the base 10 is separated up and down, the direction of inserting the main FPC 40 into the base 10 is the same as the direction of inserting the connector 42 into the base 10. Hence, there is no problem when using the closed type connector 42. In the case of the base 10 shown in FIGS. 4 and 39 but separated right and left, however, the following problem arises.

After inserting the main FPC 40 into the base 10, as illustrated in FIG. 39, the connector 42 is fixed to the base 10. In this instance, the direction of intruding the connector 42 into the hole 105 of the base 10 is a direction perpendicular to the inserting direction of the main FPC 40 into the base.

For this reason, fixing the cable fixing plate 41, to which the main FPC 40 is stuck by use of a double-coated tape, to the base 10 involves the following operations. To begin with, the cable fixing plate 41 is inserted into the base 10 while bending the main FPC 40 so that the connector 42 does not collide with the upper surface of the base 10. Subsequently, when the cable fixing plate 41 reaches a fixing position, the main FPC 40 is folded back, and the connector 42 is intruded into the hole 105 of the base 10 and fixed thereto.

According to such a method, the connector 42 has only a degree of freedom of rotation about a bending line in the bending position, and, therefore, when trying to intrude it into the base 10, the pawls of the connector 42 butt against the corners of the base 10, with the result that a well-intruded state is not attainable.

An ensured fixation of the connector 42 to the base 10 entails intruding the connector 42 into the base 10 in a direction perpendicular to the upper surface of the base 10 while providing some degree of freedom in the right-and-left directions of the connector 42. For this reason, as depicted in FIGS. 40A and 40B, the FPC 40 is formed with substantially N-shaped folded portions 40-1 to 40-4.

With this configuration, as shown in FIGS. 40B, 41A and 41B, these folded portions 40-1 to 40-4 are folded back, whereby the connector 42 is movable in the perpendicular direction while having some degree of freedom in the right-and-left directions. Namely, the pawls 420 of the connector 42 can be intruded into the base 10 in the direction perpendicular to the upper surface of the base 10 while absorbing positional deviation in the right-and-left directions.

Accordingly, the base 10 is based on the right-and-left separating structure, and hence, even when both the inserting direction of the FPC 40 and the intruding direction of the connector 42 are perpendicular, the fixation of the connector 42 is made easier.

Figure 43A:
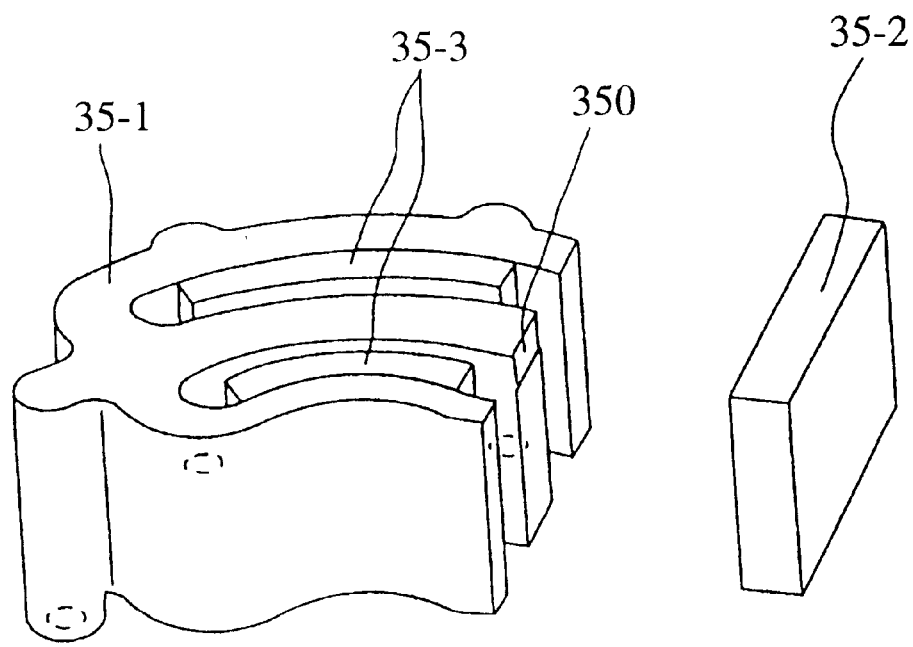
FIGS. 43A and 43B are views of assistance in explaining a leakage flux mechanism of FIG. 42.
Figure 43B:
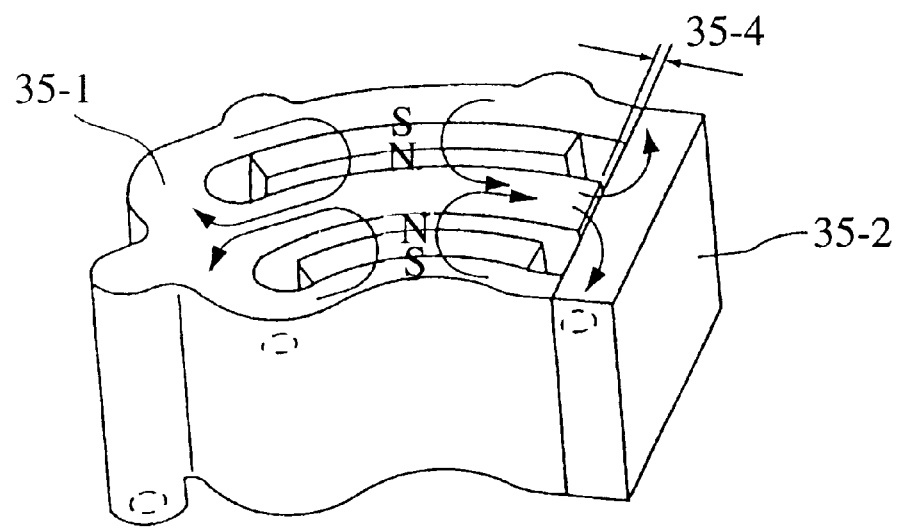
Figure 44A:
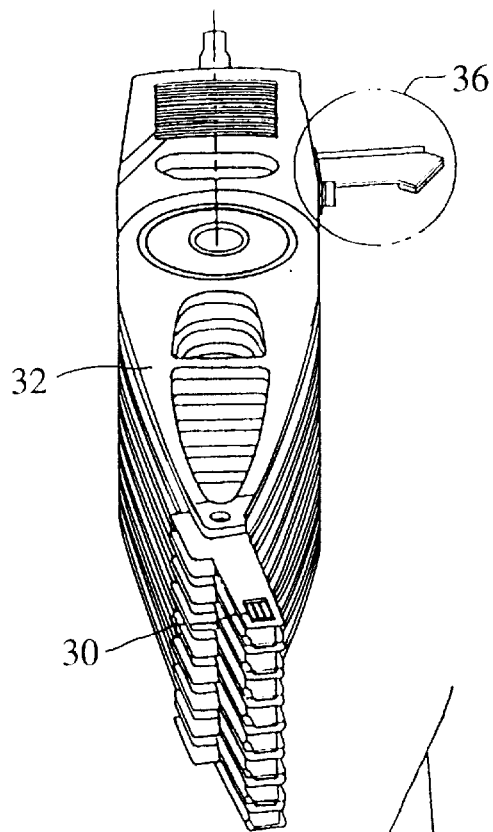
FIGS. 44A and 44B are explanatory views of a lock mechanism of FIG. 42.
Figure 44B:
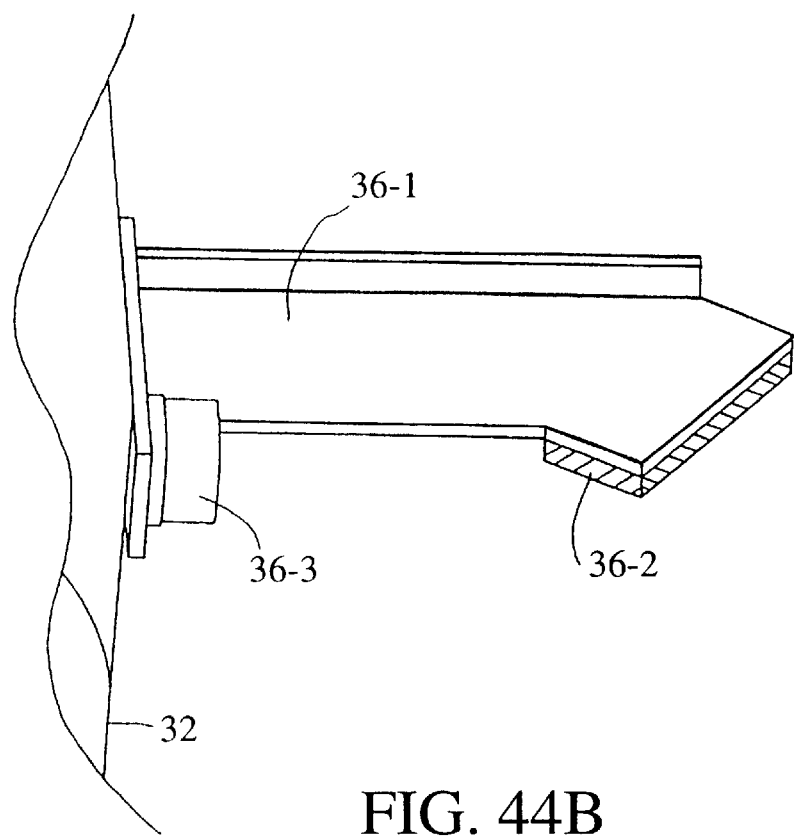

FIG. 42 is a top view of an actuator lock mechanism. FIGS. 43A and 43B are explanatory views of a leakage flux mechanism of FIG. 42. FIG. 44A and 44B are explanatory views of the lock mechanism.

As depicted in FIG. 42, a yoke 35 constituting a magnetic circuit of the actuator 32 is constructed of an E-shaped yoke 35-1 and a side yoke 35-2. The above-described magnet 35-3 is provided on the internal surface of the E-shaped yoke 35-1.

As shown in FIG. 43A, a center yoke located at the center of this E-shaped yoke 35-1 is formed with a stepped portion 350. With this formation, as illustrated in FIG. 43B, when the yoke 35 is constructed by joining the E-shaped yoke 35-1 to the side yoke 35-2, a slit 35-4 is formed between the center yoke of the E-shaped yoke 35-1 and the side yoke 35-2. Accordingly, a leakage flux is produced from this slit 35-4.

As shown in FIGS. 42 and 44A, a lock mechanism 36 is mounted on the side surface of the actuator 32. As illustrated in FIG. 44B, this lock mechanism 36 is constructed of a support member 36-1 formed by bending an aluminum sheet and a lock member 36-2 formed by punching out a rolled steel sheet (soft magnetic material) by a press.

This lock member 36-2 is bonded and secured to a front end of the support member 36-1. Further, the support member 36-1 is secured to the side surface of the actuator 32 by use of a screw 36-3.

This operation will be discussed. As illustrated in FIG. 42, when the actuator 32 reaches the innermost position of the magnetic disk 20, the lock mechanism 36-2 of the actuator lock mechanism is located in the vicinity of the slit 35-4 of the yoke 35. The leakage flux from the slit 35-4 thereby runs across the lock member 36-2, thus constituting a part of the magnetic circuit. As a result, the lock member 36-2 is attracted by the slit 35-4, and the actuator 32 is locked in the innermost CSS zone.

If the actuator 32 is moved during a transportation of the magnetic disk apparatus, the magnetic disk 20 and the actuator 32 may be damaged, and this lock is therefore required. It is well known that the leakage flux is utilized for locking this actuator. According to the conventional constructions, however, a direction of the leakage flux is a direction of the magnetic flux of the yoke 35. For this reason, the actuator lock member is moved perpendicular to the leakage flux. This conduces to such a problem that the lock member collides with the slit of the leakage flux, resulting in a generation of dusts or a deformation and a destruction of the actuator 32. Further, a range of the leakage flux is broad enough to affect the seek operation and the positioning operation as well.

Contrastingly, in this embodiment, the actuator lock member 36-2 is invariably in non-contact with the slit 35-4 but keeps a spacing of approximately 0.4 mm therefrom. It is therefore possible to prevent the generation of dusts due to the collision with the slit. Further, a deformation and a destruction of the actuator or the support member thereof can be prevented.

In addition, the leakage flux utilized for attracting the actuator is concentrated at the slit 35-4, and, hence, in the normal using state, the seek operation and the positioning operation are not adversely affected even in the inner-side cylinder.

Besides, as shown in FIG. 42, in the lock position of the actuator, a protrusion 324 of the actuator 32 does not contact the stopper 37. That is, a gap gap is formed. For this reason, the collision of the actuator 32 with the stopper 37 can be also prevented. This slit 35-4 is shaped by providing the stepped portion 350 in the E-shaped yoke 35-1, and hence the easy manufacturing thereof is accomplished.

Figure 45:
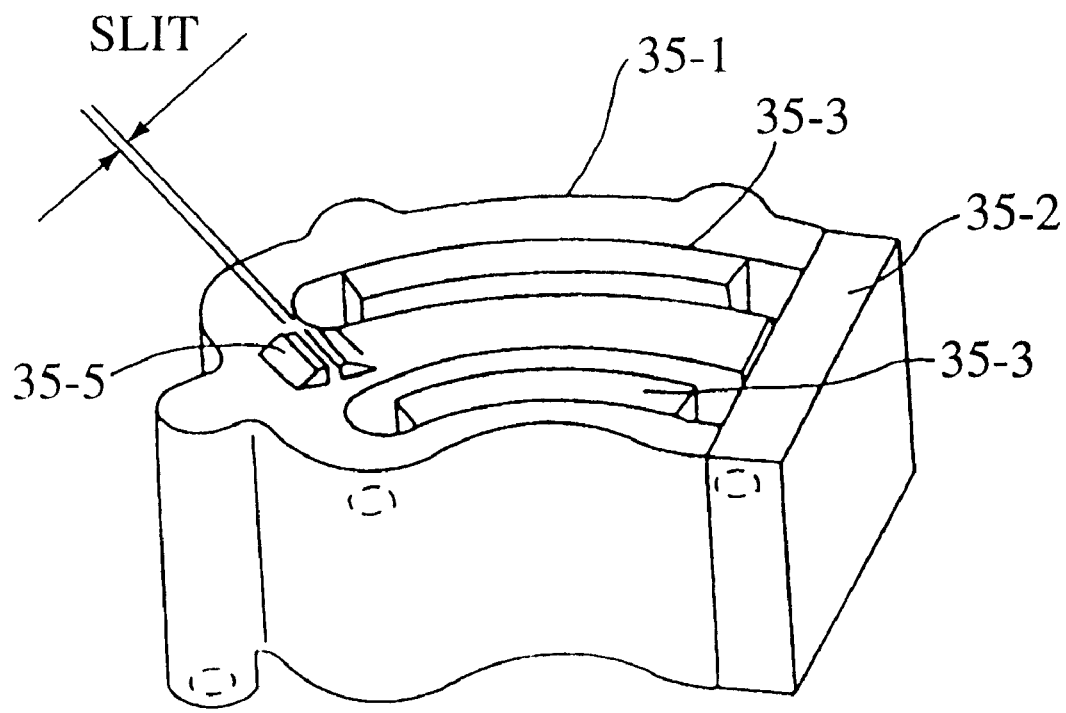
FIG. 45 is an explanatory view showing another example of the leakage flux mechanism of FIG. 42.

FIG. 45 is an explanatory view showing another example of the leakage flux mechanism.

In accordance with this embodiment, a protrusion 35-5 is provided on the center yoke of the E-shaped yoke 35-1 and is formed with a slit 350. A lock mechanism 36 is formed on the actuator 32 is the same as the mechanism shown in FIGS. 44A and 44B. Accordingly, the same action and effect as those explained referring to FIG. 43B are exhibited.

Figure 46A:
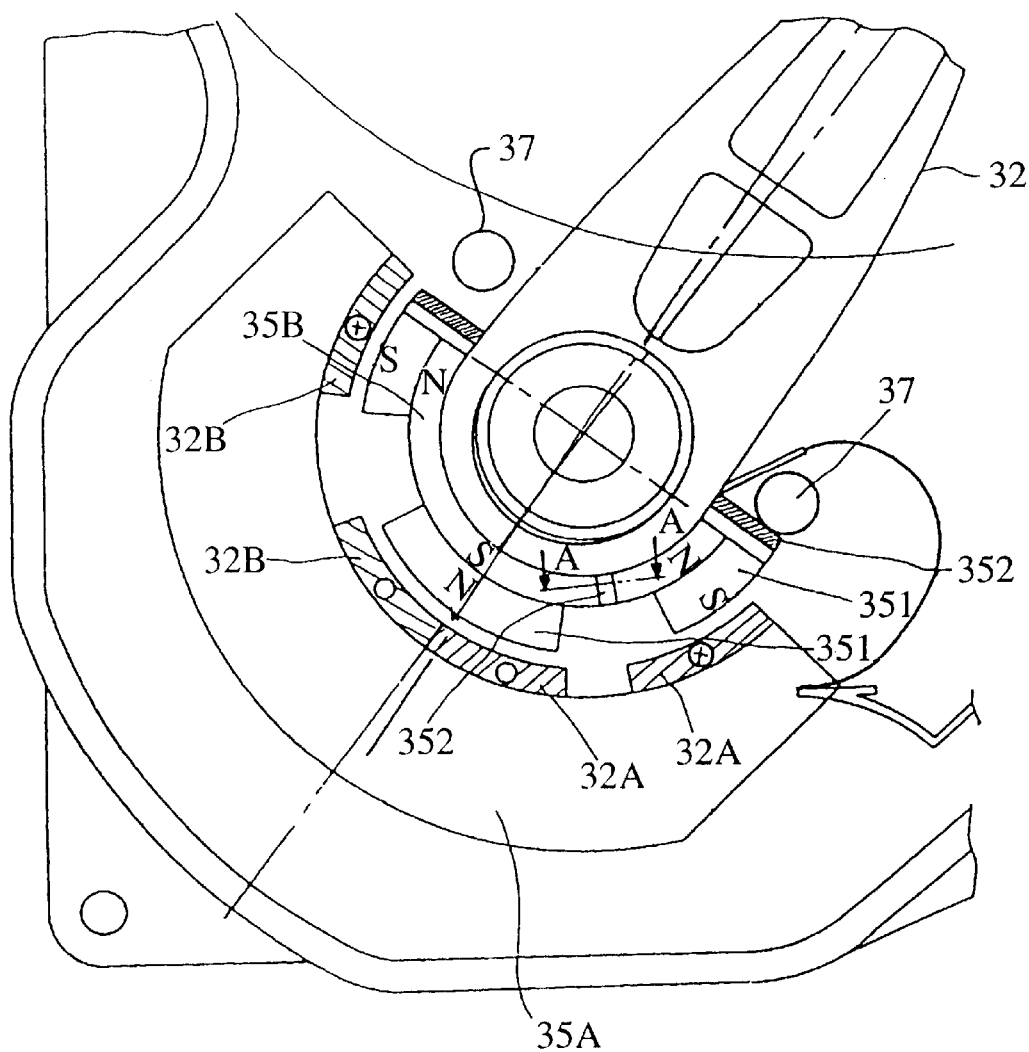
FIG. 46A is an explanatory view showing an example of modification of the actuator lock mechanism of FIG. 42.
Figure 46B:
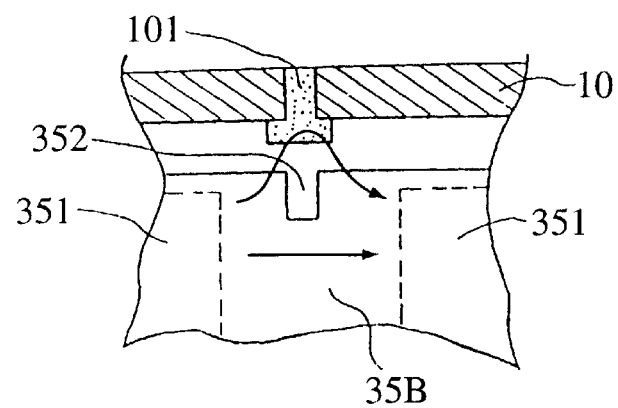
FIG. 46B is a sectional view of the principal portion of the actuator lock mechanism of FIG. 46A.

FIGS. 46A and 46B are explanatory diagrams illustrating another example of the actuator lock mechanism.

As shown in FIG. 46A, in this example, a stator 35A is provided with coils 32A, 32B. Then, magnets 351 are attached to a yoke 35B of a rotor (actuator) 32. This yoke 35B is formed with slits 352. That is, as shown in FIG. 46B, the slits 352 are formed between the magnets 351 of the yoke 35B.

On the other hand, as illustrated in FIG. 46B, a lock member 101 composed of a soft magnetic material is disposed in a lock position of the base 10. The leakage fluxes from the slits 352 thereby run across the lock member 101, thus forming a part of the magnetic circuit. As a result, the lock member 101 is attracted to the slits 352, but the actuator 32 is locked in the innermost CSS zone.

The following is still another example thereof. An elastic material such as rubber or the like is lined on or press-fitted in or bonded to the side surface of the lock member 36-2 of the actuator lock mechanism 36 of FIG. 44B. Also, the stopper 37 is disposed in close proximity to the slit 35-4 of the FIG. 43B.

With this construction, the actuator lock mechanism 36 is capable of performing a function as an actuator stopper. This yields an advantage of making it easier to adjust the above-mentioned slit position 35-4 and a stop position.

As discussed above, the lock member is provided on the external portion of the yoke, and the leakage fluxes are generated outside because of the slits, thus locking the actuator. Accordingly, it is feasible to prevent the generation of dusts and the destruction and damage of the mechanism. Further, no adverse influence is exerted on the seek and positioning accuracies with respect to the data cylinder.

Figure 47A:
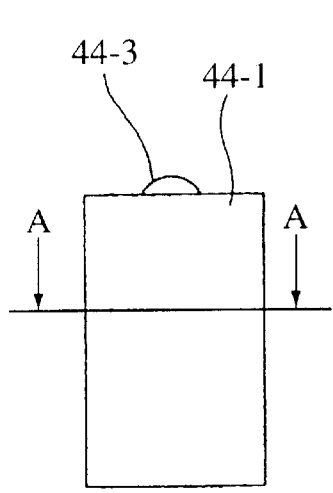
FIGS. 47A, 47B and 47C are views illustrating a structure of a circulation filter of FIG. 3.
Figure 47B:
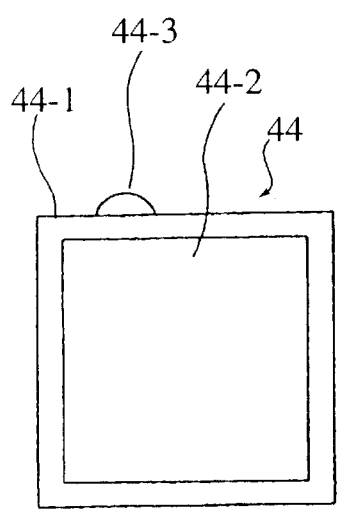
Figure 47C:
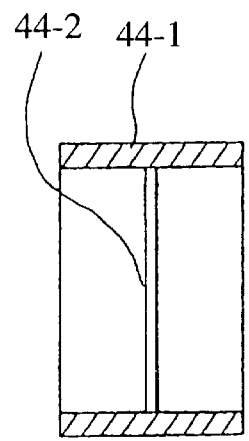
Figure 48A:
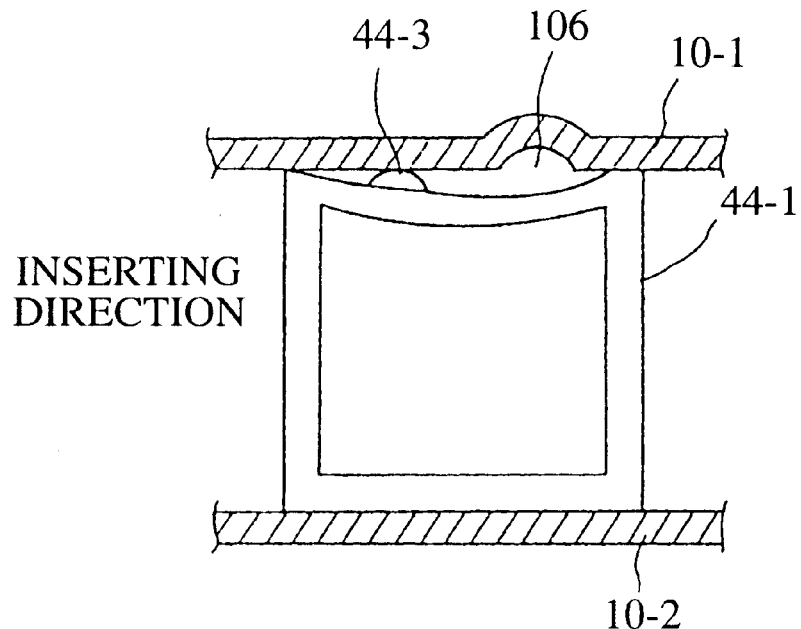
FIGS. 48A and 48B are views showing how the circulation filter of FIG. 47B is attached.
Figure 48B:
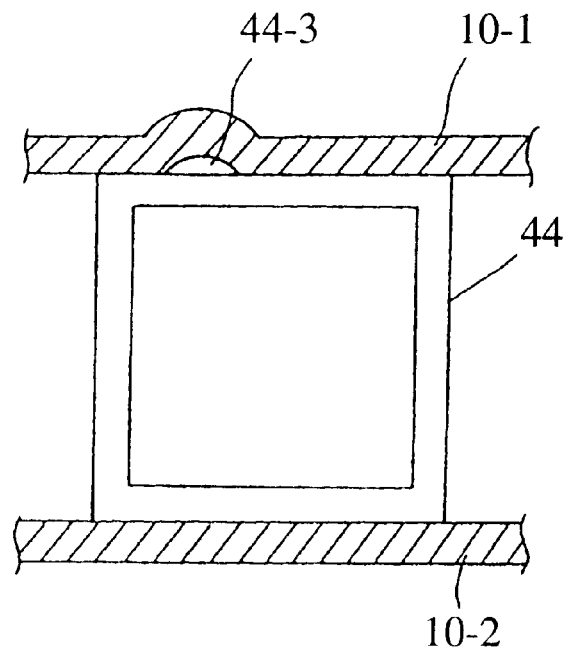

FIGS. 47A, 47B and 47C are views illustrating a structure of a circulation filter. FIGS. 48A and 48B are views showing how the circulation filter is attached. FIG. 47B illustrates the front surface of a filter 44. FIG. 47A shows the side surface thereof. FIG. 47C depicts the section thereof. As illustrated in FIG. 47B, a frame 44-1 of the filter 44 is composed of a plastic material exhibiting a flexibility. A filter member 44-2 composed of a mesh material or the like is set in the frame 44-1 of the filter 44.

A semi-circular protrusion 44-3 is formed on the upper portion of the frame 44-1 of the filter 44. On the other hand, as shown in FIG. 48A, a recess 106 is formed in an upper portion 10-1 of the base 10 in a filter mounting position of the base 10.

As shown in FIG. 48A, the filter 44 is inserted from the side surface of the base 10. At this time, the frame 44-1 of the filter 44 exhibits the flexibility and is therefore deformed. For this reason, the insertion can be, even with an existence of the protrusion 44-3, conducted. Then, as depicted in FIG. 48B, the protrusion 44-3 of the filter 44 is fitted into the recess 106 of the base 10, and its position is fixed.

Accordingly, even in the right-and-left separable base 10, the filter 44 can be smoothly attached.

Figure 49A:
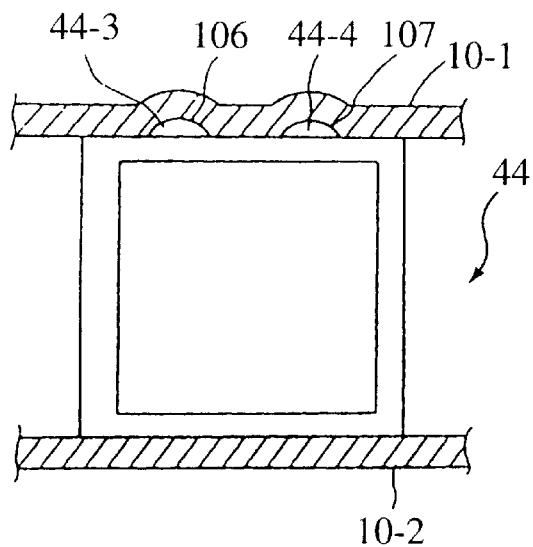
FIGS. 49A and 49B are explanatory views showing a first example of modification of the circulation filter.
Figure 49B:
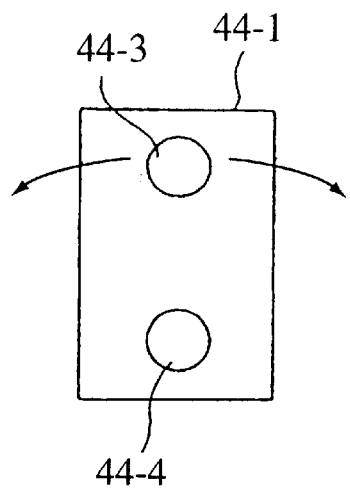

FIGS. 49A and 49B are explanatory views showing a first example of modification of the circulation filter. FIG. 49A is a front view thereof. FIG. 49B is a top view thereof.

As shown in FIG. 49B, the frame 44-1 of the filter 44 is provided with two protrusions 44-3, 44-4. As illustrated in FIG. 49B, on the other hand, two recesses 106, 107 are formed in the upper portion 10-1 of the base 10. The filter 44 is therefore supported at two upper points of the base 10. This arrangement makes it possible to prevent a rotation of the filter 44. In consequence of this, the position of the filter 44 is accurately fixed.

Figure 50A:
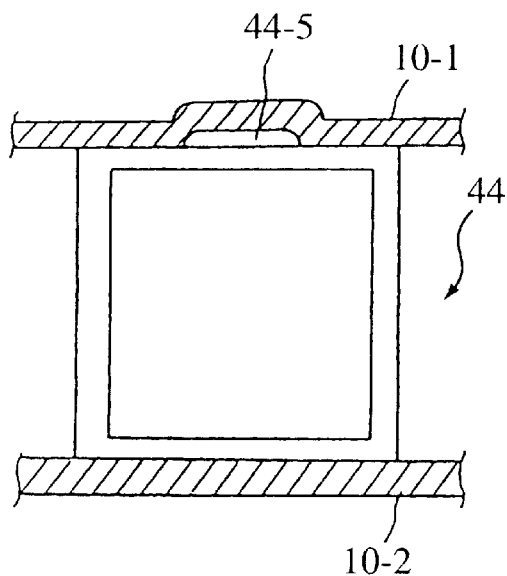
FIGS. 50A and 50B are explanatory views showing a second example of modification of the circulation filter.
Figure 50B:
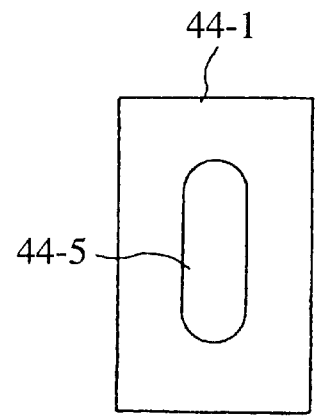

FIGS. 50A and 50B are explanatory views showing a second example of modification of the circulation filter. FIG. 50A is a front view thereof. FIG. 50B is a top view thereof.

As depicted in FIG. 50A, a protrusion 44-5 of the frame 44-1 of the filter 44 is formed in an elliptical shape. This arrangement, as shown in FIG. 50B, also makes it possible to prevent the rotation of the filter 44.

Figure 51A:
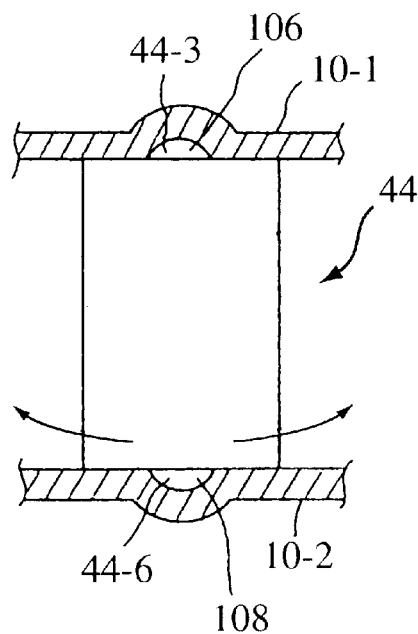
FIGS. 51A and 51B are explanatory views showing a third example of modification of the circulation filter.
Figure 51B:
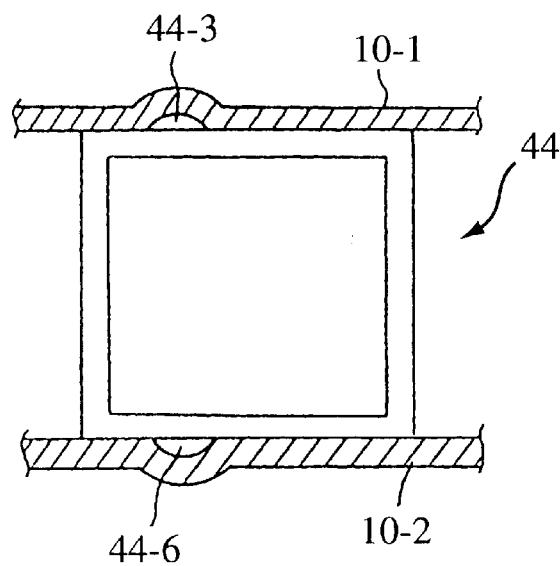

FIGS. 51A and 51B are explanatory views showing a third example of modification of the circulation filter. FIG. 51A is a side view thereof. FIG. 51B is a front view thereof.

As shown in FIGS. 51A and 51B, a pair of protrusions 44-3, 44-6 are formed at the upper and lower portions of the frame 44-1 of the filter 44. On the other hand, recesses 106, 108 are formed in the upper portion 10-1 and a lower portion 10-2 of the base 10. Hence, the filter 44 is fixed to the upper and lower portions of the base 10. This arrangement ensures the fixation.

Figure 52A:
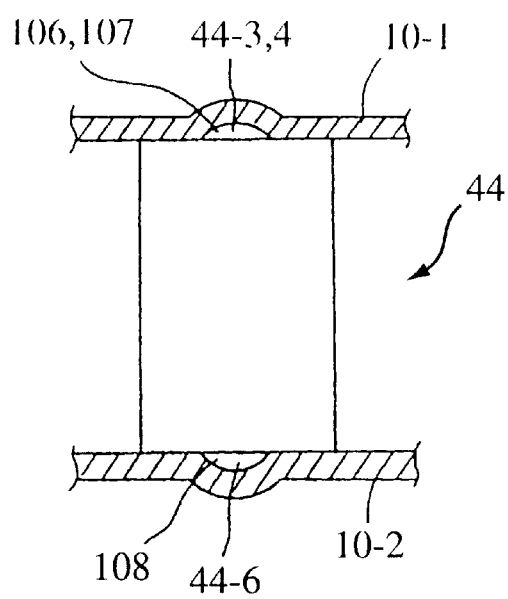
FIGS. 52A and 52B are explanatory views showing a fourth example of modification of the circulation filter.
Figure 52B:
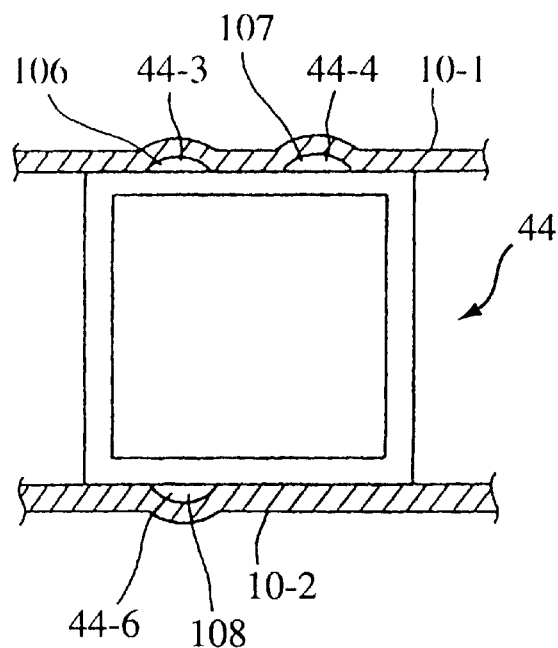

FIGS. 52A and 52B are explanatory views showing a fourth example of modification of the circulation filter. FIG. 52A is a side view thereof. FIG. 52B is a front view thereof.

As illustrated in FIG. 52B, two protrusions 44-3, 44-4 are formed on the upper portion of the frame 44-1 of the filter 44. On the other hand, one protrusion 44-6 is provided on the lower portion of the frame 44-1 of the filter 44. Accordingly, this embodiment is a combination of the embodiments shown in FIGS. 49A and 51A. This combined embodiment works to prevent the rotation of the filter 44. In addition to this, the lower portion of the filter 44 can be fixed.

Figure 53A:
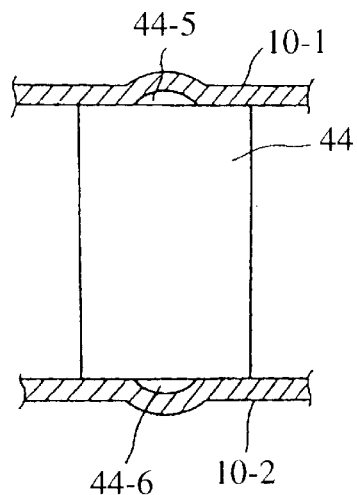
FIGS. 53A and 53B are explanatory views showing a fifth example of modification of the circulation filter.
Figure 53B:
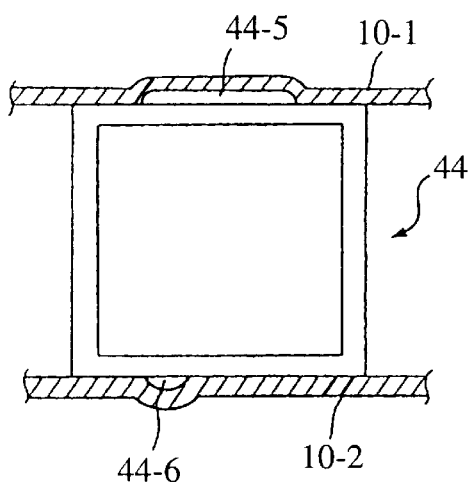

FIGS. 53A and 53B are explanatory views showing a fifth example of modification of the circulation filter. FIG. 53A is a side view thereof. FIG. 53B is a front view thereof.

As shown in 53A and 53B, an elliptical protrusion 44-5 is provided on the upper portion of the frame 44-1 of the filter 44. On the other hand, a semi-circular protrusion 44-6 is formed on the lower portion of the frame 44-1 of the filter 44.

In this embodiment also, the protrusions 44-5, 44-6 are formed on the upper and lower portions of the filter 44, and, with this provision, the fixation can be accomplished at the upper and lower portions of the filter 44. Besides, the protrusion 44-5 on the upper portion of the filter 44 takes the elliptical shape, and this therefore makes it possible to prevent the rotation of the filter 44.

Figure 54A:
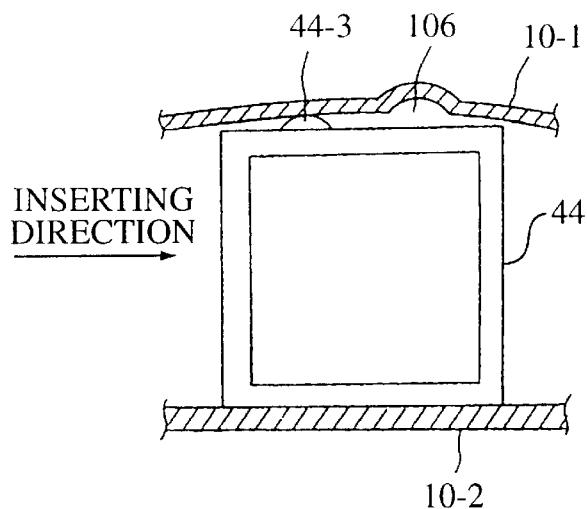
FIGS. 54A and 54B are explanatory views showing a sixth example of modification of the circulation filter.
Figure 54B:
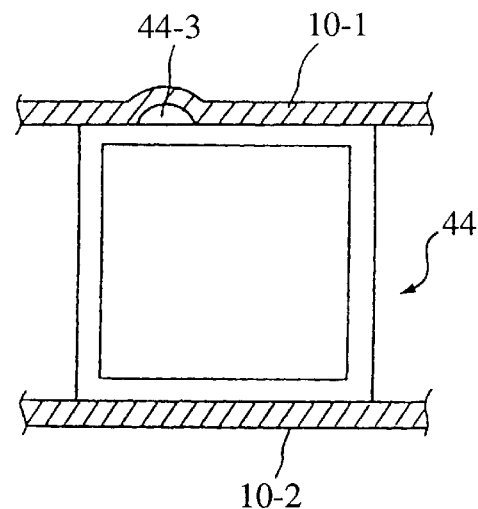

FIGS. 54A and 54B are explanatory views showing a sixth example of modification of the circulation filter.

In the example of FIG. 54A, the fixed frame 44-1 of the filter 44 is constructed of a rigid material enough not to deform. Then, the frame 44-1 is provided with a protrusion 44-3. On the other hand, the upper portion 10-1 of the base 10 is thinned enough to be slightly flexible. The recess 106 is formed in the upper portion 10-1 of this base 10.

Next, as shown in FIG. 54A, the filter 44 is inserted from the side surface of the base 10. At this time, the upper portion 10-1 of the base 10 exhibits the flexibility and hence deforms. For this reason, with even an existence of the protrusion 44-3, the filter 44 is insertable into the base 10. Then, as shown in FIG. 54B, the protrusion 44-3 of the filter 44 is fitted into the recess 106 of the base 10, and its position is fixed.

Figures 55A, 55B:
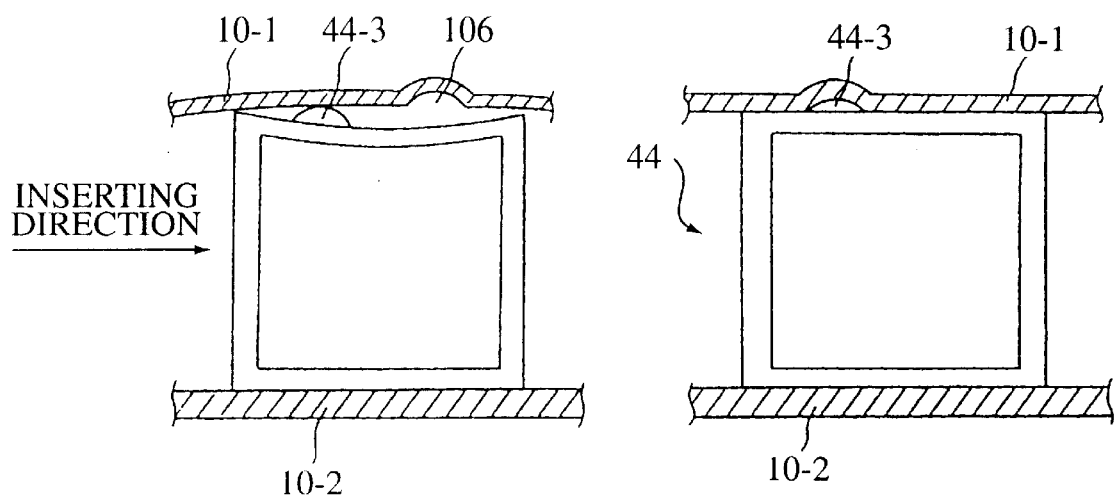
FIGS. 55A and 55B are explanatory views showing a seventh example of modification of the circulation filter.

FIGS. 55A and 55B are explanatory views showing a seventh example of modification of the circulation filter.

As illustrated in FIG. 55A, the fixed frame 44-1 of the filter 44 is constructed to have the flexibility. Then, the frame 44-1 is provided with the protrusion 44-3. On the other hand, the upper portion 10-1 of the base 10 is thinned enough to be slightly flexible. The upper portion 10-1 of this base 10 is formed with the recess 106.

Next, as shown in FIG. 55A, the filter 44 is inserted from the side surface of the base 10. At this time, the frame 44-1 of the filter 44 and the upper portion 10-1 of the base 10 exhibit the flexibility and therefore deform. For this reason, in spite of the fact that the frame 44-1 has the protrusion 44-3, the filter 44 can be inserted into the base 10. Subsequently, as illustrated in FIG. 55B, the protrusion 44-3 of the filter 44 is fitted into the recess 106 of the base 10, and the position thereof is fixed.

Figures 56A, 56B:
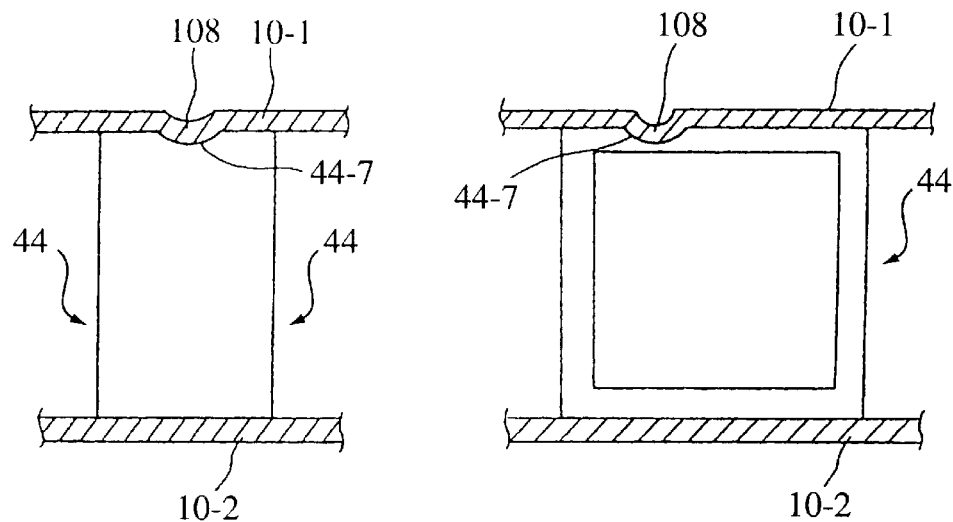
FIGS. 56A and 56B are explanatory views showing an eighth example of modification of the circulation filter.
Figure 57:
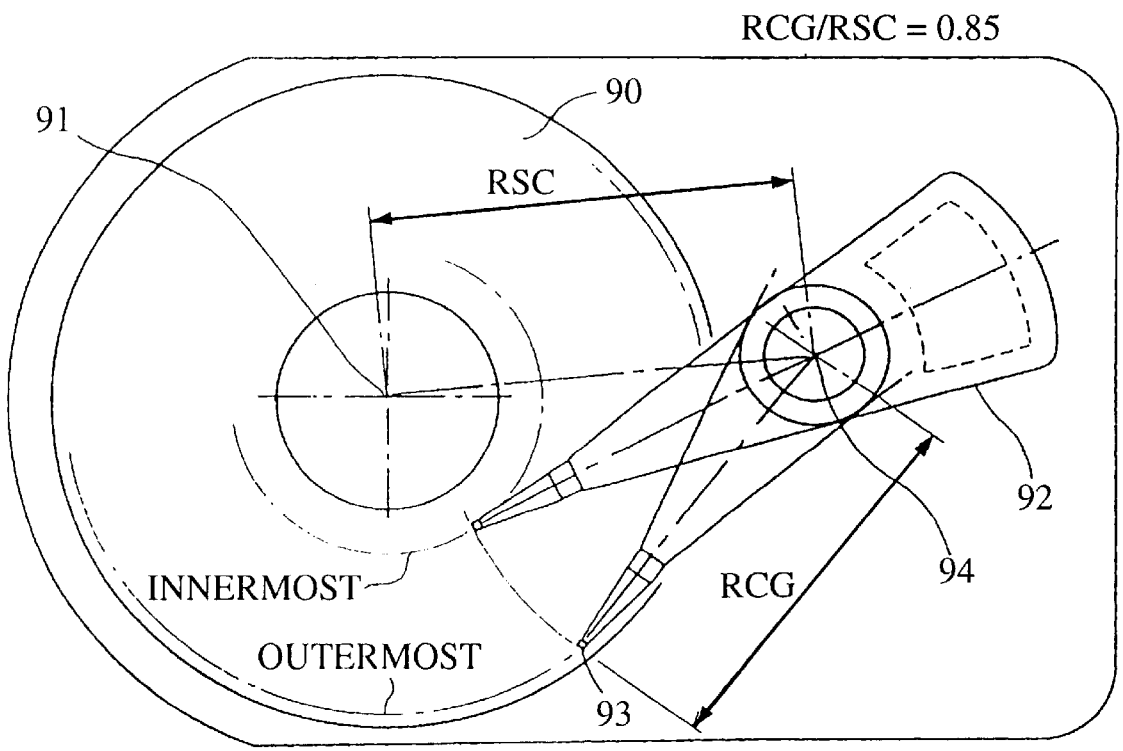
FIG. 57A is a view illustrating a construction of a conventional magnetic disk apparatus.
Figure 58:
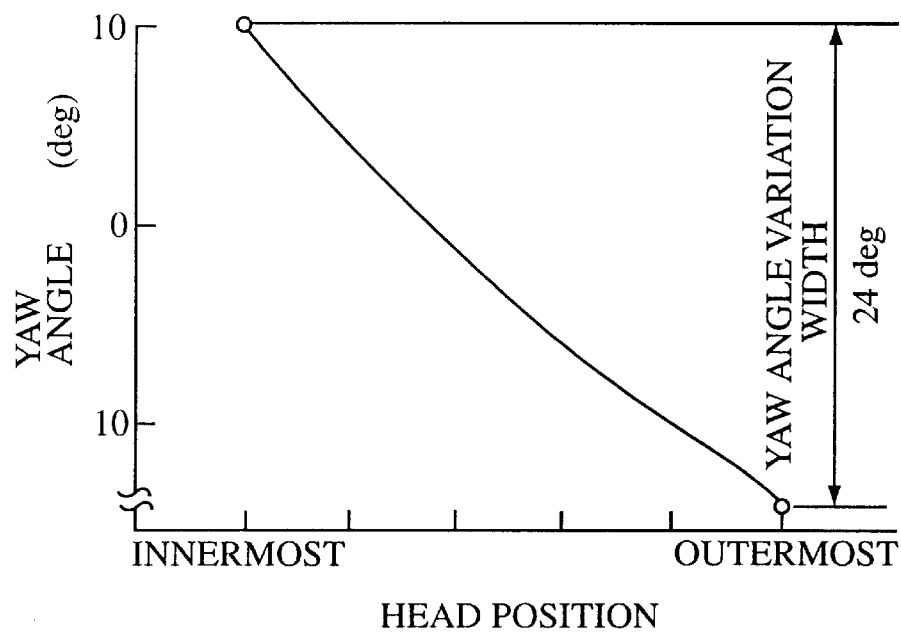
FIG. 58 is a view showing a yaw angle characteristic in the conventional magnetic disk apparatus.

FIGS. 56A and 56B are explanatory views showing an eighth example of modification of the circulation filter. FIG. 56A is a side view thereof. FIG. 56B is a front view thereof.

In the example of FIGS. 56A and 56B, the frame 44-1 of the filter 44 is formed with a recess 44-7. On the other hand, an upper frame 10-1 of the base 10 is provided with a protrusion 108.

Even in such a configuration, when inserting the filter 44, the frame 44-1 or the upper frame 10-1 deforms; the recess 44-7 of the filter 44 is fitted to the protrusion 108 of the base 10; and its position is fixed.

Thus, the filter can be readily set even in the base assuming the right-and-left separable configuration and is also readily replaced.

Other than the embodiments discussed above, the following modifications of the present invention are possible. First, in the above-discussed embodiments, the absolute value of the yaw angle is made small, and the spring arm is therefore obliquely attached to the arm. As a substitute for this method, a gimbals for supporting the magnetic head may be so attached as to be inclined to the spring arm, and similarly, the arm front end may be formed at a slant.

Second, the number of the magnetic disks housed is not limited to that in the embodiment but may be others such as 10, etc. Third, the MR element is used as the read head, while the inductive element is employed as the write head, but there is other head in which the read head and the write head are separated.

Thus, the present invention has been described by way of the embodiments but may be modified in many forms within the scope of the gist of the present invention. Those modifications are not excluded from the scope of the present invention.

As discussed above, according to the present invention, the distance between the front end of the head and the center of rotation of the actuator is set longer than the distance between the center of rotation of the magnetic disk and the center of rotation of the actuator, and, therefore, the fluctuations in the yaw angle of the head can be reduced. Accordingly, even when the read head and the write head are separated, the stable read/write operations are possible.

What is claimed is:

1. A magnetic disk apparatus comprising:

at least one magnetic disk;

rotating means for rotating said magnetic disk;

a magnetic head for writing and reading information to and from said magnetic disk;

a rotary type actuator having said magnetic head at a front end thereof, for moving said magnetic head to traverse tracks of said magnetic disk; and an enclosure including:
a one-piece unitary base to which both ends of fixing shafts of both said rotating means and said rotary type actuator are fixed, said base having an open side; and
a cover fitted in to said base at said open side;
said open side defining a separating plane between said base and said cover, said separating plane being formed obliquely to a long side of said magnetic disk apparatus, said separating plane being shorter in length than said long side of said magnetic disk apparatus, and said fixing shaft of said actuator being further from said separating plane than said fixing shaft of said rotating means; and said fixing shaft of said actuator being arranged to a position so that a rotational moment of the rotary actuator is generally parallel to said separating plane.

2. The magnetic disk apparatus according to claim 1, wherein said cover surrounds a half of said magnetic disk and an opposite half of said magnetic disk extends out from said cover through said open side of said base, said base surrounding said opposite half of said magnetic disk.

3. The magnetic disk apparatus according to claim 1, wherein the separating plane between said base and said cover is formed near where said magnetic head traverses said tracks.

4. The magnetic disk apparatus according to claim 1, wherein said magnetic head includes a write head constructed of an inductive element and a read head constructed of a magnetic reluctance element.

5. The magnetic disk apparatus according to claim 1, further comprising a circulation filter having a filter member and a flexible frame for supporting said filter member, said circulation filter serving to purify a gas in an interior of said enclosure, said circulation filter being sandwiched between an upper portion of said base and a lower portion of said base.

6. The magnetic disk apparatus according to claim 1, further comprising a window, formed in at least one of said base and said cover, for an insertion of a pin for moving said rotary type actuator during a servo write for writing a servo signal to said magnetic disk.

7. The magnetic disk apparatus according to claim 1, further comprising:

a first through-hole formed in said enclosure to fix said fixing shaft of said rotary type actuator;

a washer member provided along the periphery of said first through-hole and having a second through-hole smaller than said first through-hole; and a screw member having a head having its diameter larger than said second through-hole and a threaded portion penetrating said second and first through-holes and thus fastened to a screw hole of said fixing shaft of said rotary type actuator.

8. The magnetic disk apparatus according to claim 1, wherein said both ends of said fixing shafts of said rotating means and said actuator are directly attached to said base.

9. The magnetic disk apparatus according to claim 1, wherein said open side of said base and an open side of said cover adjoin at a plane that is parallel to a longitudinal axis of said rotating means.

10. The magnetic disk apparatus according to claim 1, wherein said open side of said base and an open side of said cover define a plane disposed obliquely to said long side of said enclosure.

\* \* \* \* \*